US012681858B2

(12) United States Patent
Thompson, III et al.

(10) Patent No.: US 12,681,858 B2
(45) Date of Patent: Jul. 14, 2026

(54) HIERARCHICAL MULTI-LAYER ACTION STORE FOR AGENT-BASED TASK EXECUTION

(71) Applicant: Microsoft Technology Licensing, LLC, Redmond, WA (US)

(72) Inventors: Ralph Donald Thompson, III, Sammamish, WA (US); Darrell Lewis-Sandy, Seattle, WA (US); Karthik Ramgopal, Atherton, CA (US); Shangjin Zhang, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 19/043,332

(22) Filed: Jan. 31, 2025

(65) Prior Publication Data

US 2026/0111363 A1     Apr. 23, 2026

Related U.S. Application Data

(60) Provisional application No. 63/709,935, filed on Oct. 21, 2024.

(51) Int. Cl.
*G06F 12/00* (2006.01)
*G06F 12/0811* (2016.01)
*G06F 12/0873* (2016.01)

(52) U.S. Cl.
CPC ...... *G06F 12/0811* (2013.01); *G06F 12/0873* (2013.01); *G06F 2212/1016* (2013.01)

(58) Field of Classification Search
CPC .. G06F 12/0811; G06F 12/0873; G06F 12/14; G06F 2212/1016
See application file for complete search history.

(56) References Cited

U.S. PATENT DOCUMENTS 10,049,332 B2     8/2018     Jones
11,875,123 B1     1/2024     Ben David
(Continued)

FOREIGN PATENT DOCUMENTS

WO        2020226749 A1     11/2020

OTHER PUBLICATIONS

Non-Final Office Action mailed on Nov. 14, 2025, in U.S. Appl. No. 18/753,942, 29 Pages.
(Continued)

*Primary Examiner* — Shawn X Gu
(74) *Attorney, Agent, or Firm* — Nicholson De Vos Webster & Elliott LLP

(57)        ABSTRACT

An example includes a processor, a first memory, and a second memory. The first memory includes an action store. The action store includes a hierarchical arrangement of memory layers and actions stored in one or more of the memory layers. The action store stores first mappings among actions and second mappings among actions and memory layers. The first mappings among actions are hierarchical and an action is executable by an agent. The second memory includes an instruction to cause the processor to create or update the first mappings, the second mappings, or the first mappings and the second mappings, in response to a signal received from the agent via a device. The signal indicates input including a task, feedback relating to an execution of one of the actions by the agent, and/or performance data associated with the action.

19 Claims, 27 Drawing Sheets

(56) References Cited

U.S. PATENT DOCUMENTS

| | | | |
|---|---|---|---|
| 11,914,950 B2 | 2/2024 | Asahara | |
| 2019/0012198 A1 | 1/2019 | Ni et al. | |
| 2020/0241788 A1 | 7/2020 | Narayanam | |
| 2020/0371927 A1* | 11/2020 | Chachad | G06F 21/79 |
| 2021/0173718 A1 | 6/2021 | Patel | |
| 2022/0086108 A1 | 3/2022 | Higgins | |
| 2022/0108068 A1 | 4/2022 | Datla | |
| 2022/0130379 A1 | 4/2022 | Sharifi | |
| 2022/0286531 A1 | 9/2022 | Vanantwerp | |
| 2022/0374723 A1 | 11/2022 | Blukis | |
| 2024/0126945 A1 | 4/2024 | Bellot | |
| 2024/0427629 A1* | 12/2024 | Wang | G06F 21/60 |
| 2025/0299133 A1 | 9/2025 | Sen | |
| 2025/0368219 A1 | 12/2025 | Thompson, III | |
| 2025/0371317 A1 | 12/2025 | Thompson, III | |
| 2025/0371318 A1 | 12/2025 | Thompson, III | |
| 2025/0371449 A1 | 12/2025 | Thompson, III | |

OTHER PUBLICATIONS

International Search Report and Written Opinion received for PCT Application No. PCT/US2025/038993, Nov. 17, 2025, 14 pages.

Dzhivelikian, et al., "Hierarchical Intrinsically Motivated Agent Planning Behavior with Dreaming in Grid Environments", Brain Informatics, vol. 9, No. 8, Apr. 2, 2022, 28 pages.

Feng, et al., "Large Language Model-based Human-Agent Collaboration for Complex Task Solving", Retrieved from https://arxiv.org/pdf/2402.12914, Feb. 20, 2024, 16 pages.

Saisubramanian, Sandhya, "User-Aligned Assessment of Agent Learning and Operation for Reliable Autonomy", AAAI 2024 Spring Symposium on User-Aligned Assessment of Adaptive AI Systems, Mar. 2024, 2 pages.

Shapiro, et al., "User-Agent Value Alignment", AAAI Technical Report SS-02-07, Retrieved from https://cdn.aaai.org/Symposia/Spring/2002/SS-02-07/SS02-07-002.pdf, 2002, 8 pages.

Wang, et al., "A Survey on Large Language Model based Autonomous Agents", arXiv:2308.11432v3, Retrieved from arxiv.org/pdf/2308.11432v3, Mar. 12, 2024, 42 pages.

Extended European Search Report Received in European Patent Application No. 25172894.5, mailed on Oct. 16, 2025, 10 pages.

"AutoGen, An Open-Source Programming Framework for Agentic AI," Retrieved from< https://microsoft.github.io/ autogen/>, Sep. 3, 2024, 2 pages.

"Dabble lab, Understanding AI Agent Swarms," Retrieved from <https://dabblelab.com/posts/2023-11-22-ai-agent-swarms>, Nov. 22, 2023, 4 pages.

"LangChain, Applications that can reason. Powered by LangChain," Retrieved from < https://www.langchain.com>, Sep. 3, 2024, 12 pages.

"LangChain, Design agents with control," Retrieved from <https://www.langchain.com/agents., Sep. 3, 2024, 7 Pages.

OpenAI Platform, "How Assistants work," Retrieved from <https://platform.openai.com/docs/assistants/overview/how-assistants-work>, Sep. 3, 2024, 1 page.

"Pydantic, Welcome to Pydantic," Retrieved from <https://docs.pydantic.dev/latest/>, Sep. 3, 2024, 7 pages.

Du et al., "AnyTool: Self-Reflective, Hierarchical Agents for Large-Scale API Calls," arXiv:2402.04253v1, Feb. 6, 2024, 17 Pages.

Fourney, et al., "AutoGenBench—A Tool for Measuring and Evaluating AutoGen Agents," Retrieved from <https://microsoft.github.io/autogen/blog/2024/01/25/AutoGenBench/>, Jan. 25, 2024, 8 pages.

Github, "Create Customized Software using Natural Language Idea (through LLM-powered Multi-Agent Collaboration)," <https://github.com/OpenBMB/ChatDev>, Sep. 3, 2024, 10 pages.

Github, "Framework for orchestrating role-playing, autonomous AI agents. By fostering collaborative intelligence, CrewAI empowers agents to work together seamlessly, tackling complex tasks", Retrieved from <https://github.com/crewAIInc/crewAI>, Sep. 3, 2024, 8 pages.

Github, "HAAS = Hierarchical Autonomous Agent Swarm— "Resistance is futile!"," Retrieved from <https://github.com/daveshap/OpenAI_Agent_Swarm>, Sep. 3, 2024, 9 pages.

GitHub, "VRSEN/agency-swarm: The only reliable agent framework built on top of the latest OpenAI Assistants API", Retrieved from <https://github.com/VRSEN/agency-swarm>, Sep. 3, 2024, 6 pages.

Khiyara, Shail., "Agent Swarms—an evolutionary leap in intelligent automation," Retrieved from :<https://www.cio.com/article/1297843/agent-swarms-an-evolutionary-leap-in-intelligent-automation.html>, Jan. 2024, 9 pages.

Ott et al., "Trajectory Optimization for Adaptive Informative Path Planning with Multimodal Sensing," arXiv:2404.18374v1, Apr. 29, 2024, 8 pages.

Qin et al., "Toolllm: Facilitating Large Language Models To Master 16000+ Real-World Apis," arXiv:2307.16789v2, Oct. 3, 2023, 24 pages.

"AutoGen User Guide: LLM Configuration, Retrieved from microsoft.github.io/autogen/docs/topics/llm_configuration" Feb. 1, 2024, 7 pages.

Mao, et al., "Generation-Augmented Retrieval for Open-Domain Question Answering," arXiv:2009.08553v4, Aug. 6, 2021, 12 pages.

Extended European Search Report received for EP Application No. 25172437.3, mailed on Oct. 6, 2025, 9 pages.

Extended European Search Report Received for EP Application No. 25172865.5, mailed on Oct. 6, 2025, 10 Pages.

Extended European search report received for European Application No. 25172885.3, mailed on Oct. 2, 2025, 09 pages.

* cited by examiner

Figure 2A:
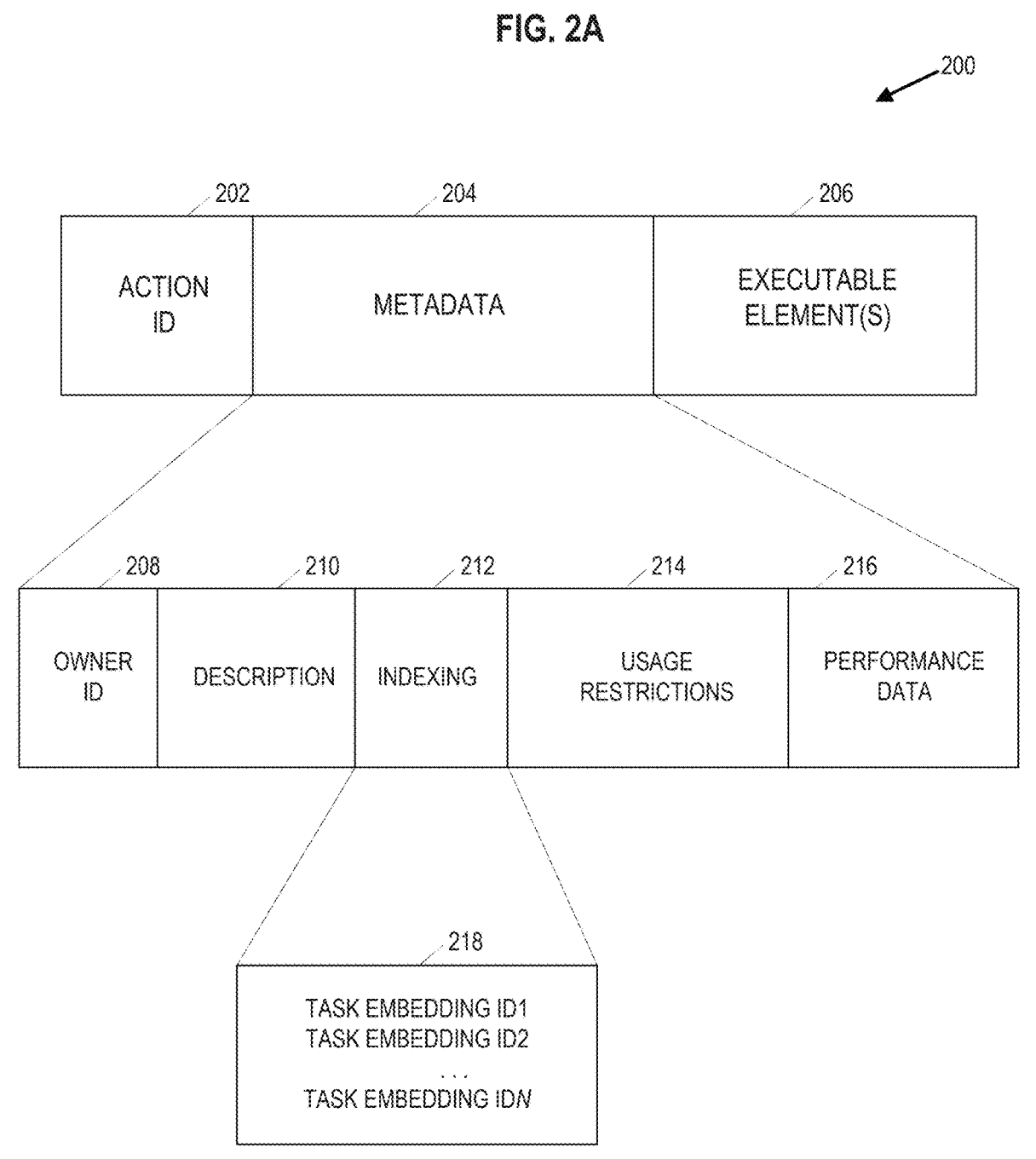

| ACTION ID | METADATA | EXECUTABLE ELEMENT(S) |
|-----------|----------|------------------------|
| 202 | 204 | 206 |

| OWNER ID | DESCRIPTION | INDEXING | USAGE RESTRICTIONS | PERFORMANCE DATA |
|----------|-------------|----------|---------------------|-------------------|
| 208 | 210 | 212 | 214 | 216 |

218

TASK EMBEDDING ID1
TASK EMBEDDING ID2
. . .
TASK EMBEDDING ID*N*

300

400

600

601A
601B
601C     601

AGENT LIBRARY FRONT END
602

Project/Task 604

AGENT SELECTION COMPONENT
606

User 608a

User 610a

User 612a

User 614a

Agent Front End
608

Agent Front End
610

Agent Front End
612

Agent Front End
614

AGENT BACK END
616

TASK MANAGEMENT COMPONENT
618

ACTION STORE
620

ACTION STORE MANAGEMENT COMPONENT
622

FIG. 8B

820

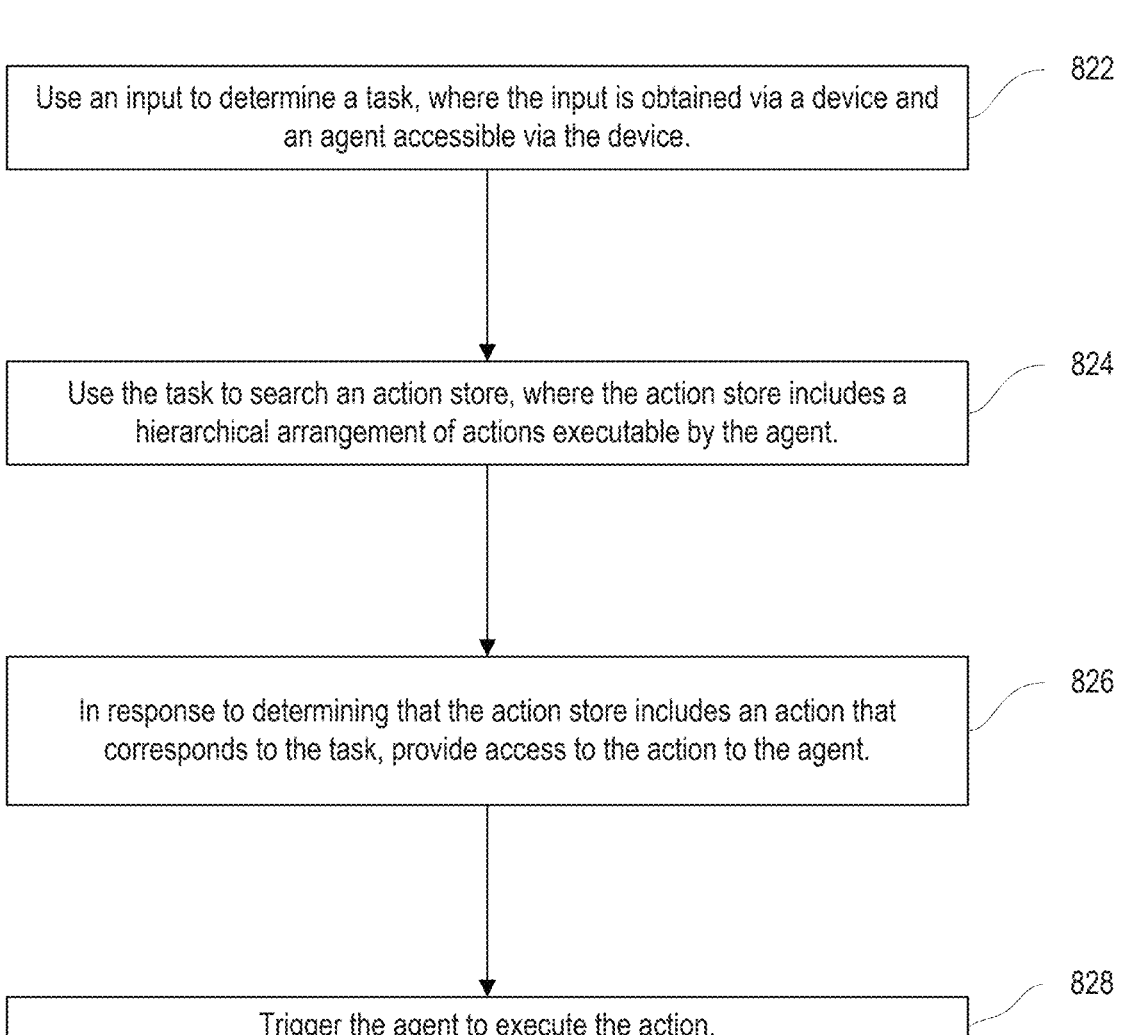

Use an input to determine a task, where the input is obtained via a device and an agent accessible via the device.

822

Use the task to search an action store, where the action store includes a hierarchical arrangement of actions executable by the agent.

824

In response to determining that the action store includes an action that corresponds to the task, provide access to the action to the agent.

826

Trigger the agent to execute the action.

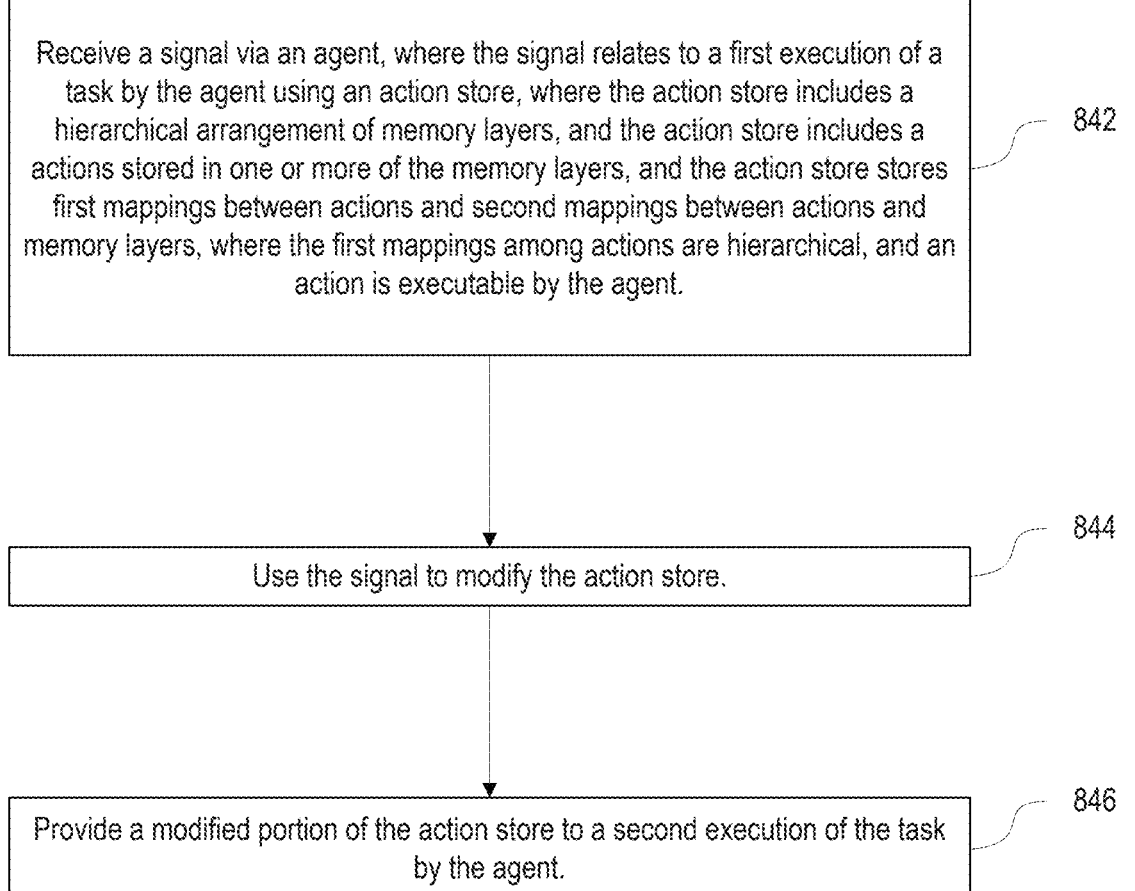

Receive a signal via an agent, where the signal relates to a first execution of a task by the agent using an action store, where the action store includes a hierarchical arrangement of memory layers, and the action store includes a actions stored in one or more of the memory layers, and the action store stores first mappings between actions and second mappings between actions and memory layers, where the first mappings among actions are hierarchical, and an action is executable by the agent.

842

Use the signal to modify the action store.

844

Provide a modified portion of the action store to a second execution of the task by the agent.

FIG. 13A
1300
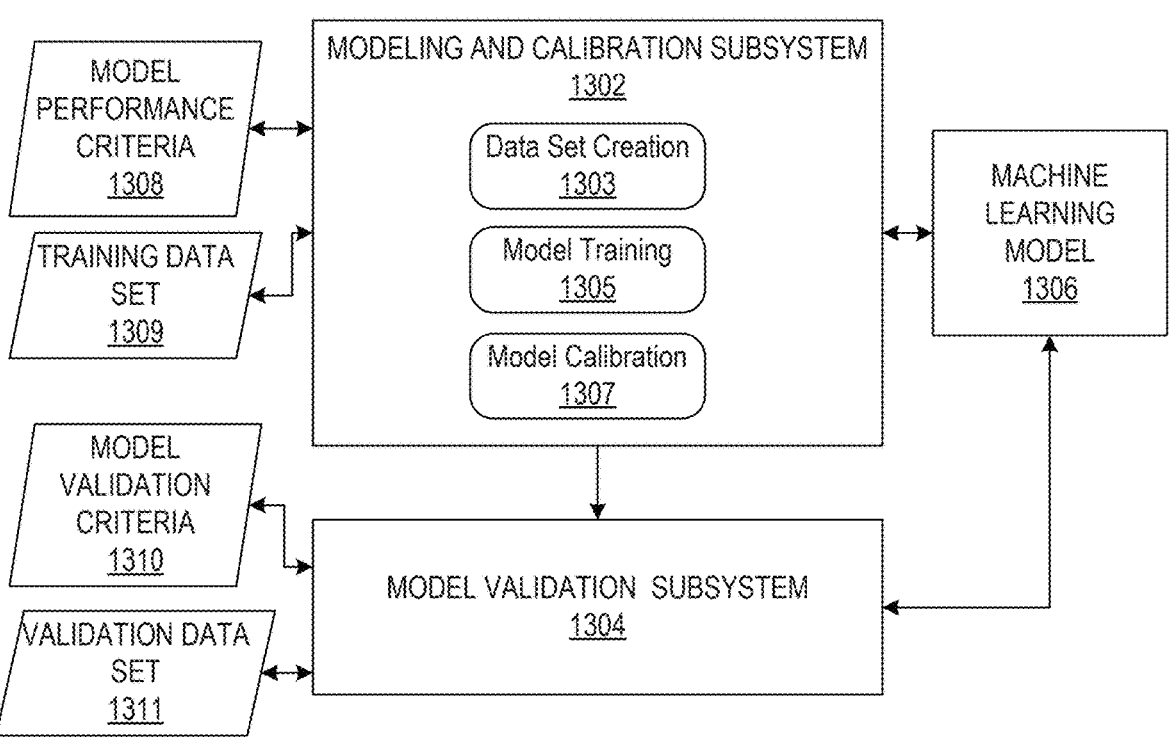

FIG. 13B
1312
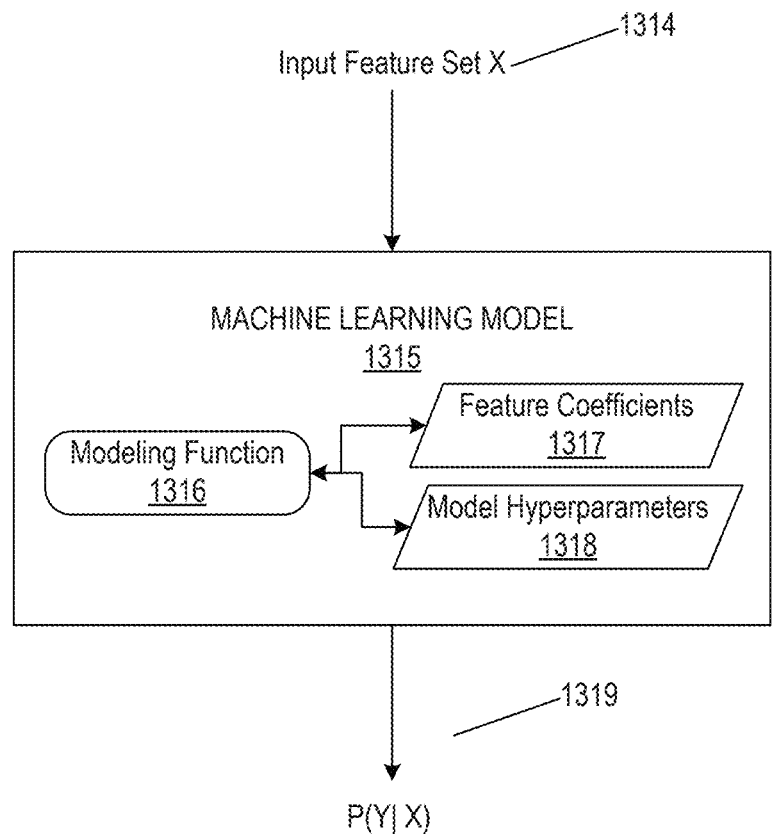
Input Feature Set X —— 1314
MACHINE LEARNING MODEL
1315
Modeling Function
1316
Feature Coefficients
1317
Model Hyperparameters
1318
—1319
P(Y| X)
Where Y is an output (e.g., a label or score)
and P(Y|X) indicates a likelihood of an output Y
given an input X
*To Data Storage or Requesting Process,*
*System, Device, Framework, or Service*

FIG. 13C
1320
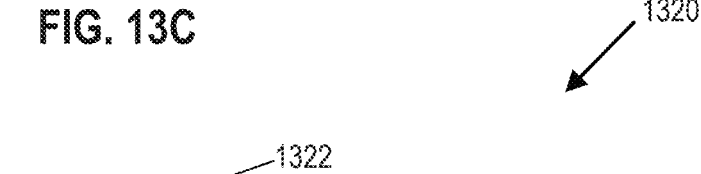
Input Feature Set X —— 1322
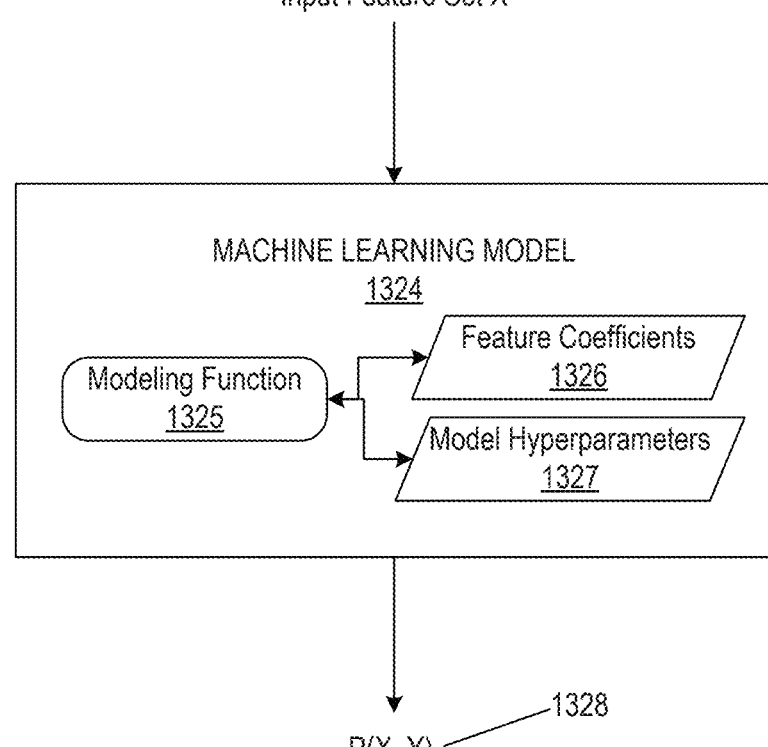
MACHINE LEARNING MODEL
1324
Modeling Function
1325
Feature Coefficients
1326
Model Hyperparameters
1327
P(X, Y) —— 1328
Where Y is an output and P(X,Y) indicates a
likelihood of cooccurrence of an input X and an
output Y
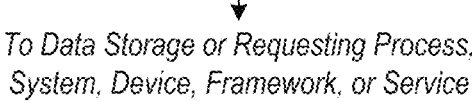
*To Data Storage or Requesting Process,
System, Device, Framework, or Service*

1340

TRANSFORMER MODEL
1342

Encoder
1344

Embedded
Subsequences
1350

Decoder
1354

Multi-head
Attention
1345

Encoder
Output
Representation
1352

Masked
Multi-head
Attention
1355

Add & Norm
1346

Add & Norm
1356

Feed Forward
1347

Multi-head
Attention
1357

Add & Norm
1348

Add & Norm
1358

Feed Forward
1359

Add & Norm
1360

Output
Probabilities
1362

Model Output 1364

*To Data Storage or Requesting Process,*
*System, Device, Framework, or Service*

HIERARCHICAL MULTI-LAYER ACTION STORE FOR AGENT-BASED TASK EXECUTION

CROSS-REFERENCE TO RELATED APPLICATION

This application claims the benefit of and priority to U.S. Provisional Patent Application No. 63/709,935, filed Oct. 21, 2024, which is incorporate herein by this reference in its entirety.

TECHNICAL FIELD

Technical fields to which this disclosure relates include automated agents. Other technical fields to which this disclosure relates include the construction and application of large language model (LLM)-based agents.

COPYRIGHT NOTICE

BACKGROUND

Automated agents include hardware and/or software components that are capable of performing user-level tasks and actions without or with minimal direct human instruction. Agents differ from daemons and other computer programs that run as background processes in the level of complexity of the tasks they execute and the degree to which the agents are capable of interacting with human users.

A device or system may include one or more autonomous and/or semi-autonomous agents. For example, a vehicle may include an autonomous agent that controls the vehicle in response to sensor signals, without asking a human operator whether to, e.g., step on the brake or turn the steering wheel. A semi-autonomous agent of the vehicle may automatically load a map with a navigation plan to get the human driver home to a known destination but then wait for the human driver to confirm the plan and start the vehicle before starting down the road.

BRIEF DESCRIPTION OF THE DRAWINGS

The disclosure will be understood more fully from the detailed description given below and from the accompanying drawings of various examples of the disclosure. The drawings are for explanation and understanding only and should not be taken to limit the disclosure to the specific examples shown.

FIG. 2A is a schematic diagram of an example of a data structure for an action in accordance with some examples of the present disclosure.

FIG. 8B is a flow diagram of an example method for agent-based task execution using an action store in accordance with some examples of the present disclosure.

FIG. 8C is a flow diagram of an example method for action store management in accordance with some examples of the present disclosure.

FIG. 13A, FIG. 13B, FIG. 13C, FIG. 13D, FIG. 13E are block diagrams of examples of machine learning models that are usable by and/or included in an agent system in accordance with some examples of the present disclosure.

DETAILED DESCRIPTION

Figure 1:
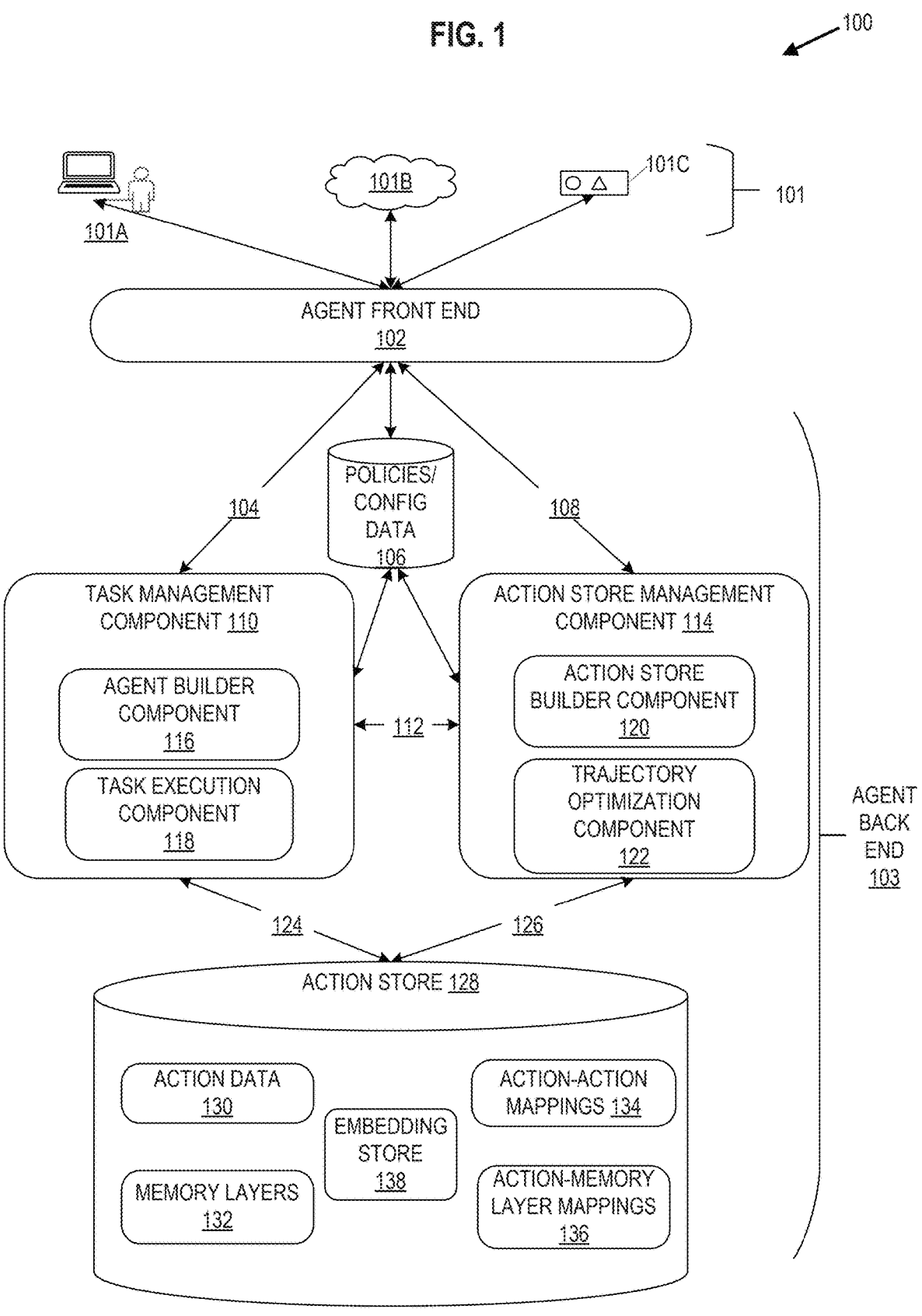
FIG. 1 is a component-based flow diagram of an example method for agent-based task execution using an action store in accordance with some examples of the present disclosure.

A generative artificial intelligence (GAI) model, generative machine learning model (GMLM), or generative model is capable of using artificial intelligence technology, e.g., machine learning models, e.g., neural networks, to machine-generate digital content based on model inputs and the previously existing data with which the model has been trained. A generative language model is a particular type of GAI model that is capable of generating content in response to model input. The model input includes a task description, also referred to as a prompt or instruction. The task description includes one or more instructions (e.g., natural language or multimodal instructions, such as "please generate a summary of these search results," "please generate a caption for this image," or a video recording of, for instance, a demonstration of how to perform a task) and/or examples of digital content, such as text or multimodal content (e.g., digital images, videos, articles, audio, or other content produced using a particular language, format, writing style, or tone). In some examples, portions of the task description are in the form of natural language text, such as a question or statement. In some examples, a task description or prompt includes non-text forms of content, such as digital images, video, and/or audio.

A large language model (LLM) is a type of generative language model that is trained in an unsupervised way or self-supervised way on massive amounts of unlabeled data, such as publicly available texts extracted from the Internet, using deep learning techniques. In some examples, an LLM is capable of performing multiple different tasks across multiple different domains. A language model (LM) is similar in function and/or architecture to an LLM except that the LM is often trained on a much smaller dataset, e.g., to perform a domain-specific task. A language model or large language model is configurable to perform one or more natural language processing (NLP) tasks, such as generating content, classifying content, answering questions in a conversational manner, and translating content from one language to another.

GMLMs, and more specifically, large language models (LLMs), have demonstrated the ability to perform relatively simple tasks (e.g., single-step tasks or tasks that do not include any sub-tasks) using a conversational natural language question and answer format. However, using LLMs to build autonomous or semi-autonomous agents that are capable of performing more complex tasks (e.g., multi-step tasks or tasks that have one or more sub-tasks) is much more technically challenging. This is because complex tasks especially require the agents to perform consistently and generate output in a user-expected and reliable manner, but the inherent nature of LLMs is that the output of the LLMs can be unpredictable, particularly if the task is ambiguous or not well-defined. The risk of unpredictable output by LLMs is a deterrent to the widespread use of LLMs to build autonomous or semi-autonomous agents.

Another technical challenge that often limits the performance and usability of GMLMs for agent-based applications is that they lack self-awareness. That is, the GMLM's knowledge base is limited to its training data, and the GMLM has no way of "knowing" that other relevant information exists outside the realm of its training data. In these cases, the GMLM is likely to engage in "AI hallucination," through which the GMLM generates a response to the request using the training data and inputs it has been provided. Such responses often include inaccurate, unreliable, or nonsensical output due to AI hallucination. As a result, the GMLM often does not perform well for very specialized tasks or newly emerging tasks. This is often especially true for LLMs, which are usually trained on large web-based corpora that do not reflect the specific context and goals of a particular agent. Fine-tuning the LLM or carefully designing the agent prompts or architectures is sometimes helpful mitigate this issue. However, these approaches are time consuming and resource intensive, and are therefore not well-suited for dynamic or real-time environments.

Another technical challenge is that, in non-GMLM task-oriented software applications, the representation of data and data relationships, such as relationships between tasks (also referred to as requests or intents) and actions (also referred to as skills), is often accomplished using a structured approach, such as a taxonomy, which are structurally complex and resource-intensive to maintain. Currently available tools for building task-oriented applications with GMLMs do not provide a standardized way to represent data relationships. This lack of uniformity in data representation for GMLMs hinders data integration across modeling frameworks and software tools, making it challenging to implement agent-based task execution within a heterogenous ecosystem of machine learning models such as GMLMs and/or other software tools.

Various examples described herein seek to mitigate these and/or other technical challenges. For instance, examples provide task management components that query an action store (also referred to as a skill registry in some examples) for dynamic task-based agent configuration. Examples provide action store management components that enable dynamic creating, configuring, and updating of the action store based on, e.g., task execution output, performance data, and/or feedback.

As described in more detail below, examples include an action store that is hierarchical, and multi-layer, as well as a pre-processing task management component, and a post-processing action store management component. The hierarchical, multi-layer action store is indexed for efficient retrieval of actions from the action store in order to supply agents with actions (e.g., executable elements) needed to perform tasks responsively as those tasks are requested by entities, such as users, other agents, processes, components, devices, or systems. The action store is a type of database that stores actions. Creating and managing the action store is not straightforward and in various examples is achieved in a manner that is particularly efficient through the use of memory layers and a hierarchical arrangement of actions in the action store. As a result the action store is usable by one or more agents to perform tasks with high performance.

In various examples there is an apparatus for constructing and managing an action store for use by agents when executing tasks. The apparatus comprises a processor and a first memory comprising an action store. The action store is a type of database or data store. The action store comprises a plurality of memory layers. By using a plurality of memory layers it is possible to differentially control accessibility to individual ones of the memory layers to facilitate security. By using a plurality of memory layers it is possible to differentially control priority of querying individual ones of the memory layers to control how agents retrieve actions. The plurality of memory layers are in a hierarchical arrangement such as a stack or other hierarchical data structure.

The action store is designed to facilitate data-driven (e.g., trial and error, observation and feedback) approaches for managing the action store, which are facilitated by a hierarchical data structure and multi-layer memory of actions, memory layers, first mappings among actions, and second mappings among actions and memory layers. The hierarchical data structure stores first mappings among actions and second mappings among actions and memory layers. The first mappings specify hierarchical relationships or dependencies between or among actions, e.g., in a tree structure. The multi-layer memory includes multiple different layers of memory into which different actions and/or different versions of actions are stored such that different actions are stored in different memory layers and/or different versions of an action are stored in different memory layers. The second mappings specify relationships between actions and memory layers in which the actions are stored. An example is shown in FIG. 2C. An action comprises an executable element capable of being executed by an at least semi-autonomous agent. In an example, an action is software executed by a physical robot in the environment. In another example, an action is software executed by a digital agent being operated by a human.

In various examples the apparatus for constructing and managing the action store has a second memory comprising an instruction that, when executed by the processor, is to cause the processor to create or update the first mappings, the second mappings, or the first mappings and the second mappings, in response to at least one signal received from the agent via a device. In an example, a human user operating a digital agent deployed on a computer being operated by the human sends a signal which is received by the second memory. In another example, a physical robot sends a signal which is received by the second memory. The second memory creates or updates mappings in the action store in response to the signal thus giving data-driven (e.g., trial and error, observation and feedback) management of the action store. The signal contains information about results of execution of one or more actions.

The pre-processing component performs task management for an agent including configurating and executing tasks. In some examples, the pre-processing component converts entity requests to tasks and queries the action store to identify actions that are used to accomplish the identified task. In some examples, the pre-processing component uses one or more GMLMs to perform one or more aspects of the pre-processing.

The post-processing component performs action store management including maintaining and updating the action store. For instance, the post-processing component incorporates signals received during task execution into the action store, for example by adding new actions to the action store, removing actions from the action store, assigning actions to memory layers, combining multiple sub-actions into a single action, dividing an action into multiple sub-actions, adding, removing, or updating mappings between actions; adding, removing, or updating mappings between actions and memory layers; and/or moving actions from one memory layer to another memory layer. In some examples, the post-processing component uses one or more trajectory optimization methods to perform one or more aspects of the post-processing.

Some examples relate to the structure and management of an action store for an agent-based task execution system. Examples include data-driven (e.g., trial and error, observation and feedback) approaches for managing the action store. In some examples, data-driven approaches as described are facilitated by a hierarchical data structure and multi-layer memory.

Some examples address the problem of identifying and/or creating actions in the action store that correspond to requested tasks. Examples provide querying approaches that facilitate the use of GMLMs to solve this problem without needing to fine-tune the GMLMs themselves.

Some examples address the problem of task interpretation and/or clarification. Examples provide iterative approaches that use the action store and one or more GMLMs to interpret or clarify tasks by decomposing ambiguous or higher-level tasks into groups or series of well-defined or lower-level tasks.

Examples of tasks that are capable of being requested by an entity (such as a user, device, network, model, or another agent) include hardware-centric and/or software-centric tasks. These and/or other tasks are performed by one or more autonomous or semi-autonomous automated agents, in various examples.

An example of a task that relates to network security is detecting and resolving a denial of service attack. An example of a task that relates to devices for managing network traffic is load balancing. An example of a task that relates to embedded control systems is the control of a robotic device such as a robotic vacuum cleaner or autonomous vehicle. An example of a task that relates to application security or access control is detecting and disabling fraudulent accounts. An example of a task that relates to content distribution systems is controlling the routing of digital content on a network. Examples of tasks that relate to agent-based task management include controlling which agents are invoked in response to different inputs and coordinating the execution of multiple different agents involved in a task. Examples described herein are capable of configuring and controlling agents to perform these and many other types of tasks.

Some examples address the problem of learning new tasks. In some examples, task learning occurs when the action store does not contain any actions that map to a requested task or in response to feedback signals received during a task execution. Some examples use a multi-layer memory to maintain different versions of different actions at different memory layers so that if an action is not found at one layer, another layer is queried. Some examples improve fault tolerance of an agent by enabling the agent to perform a task, even if in a sub-optimal way, instead of failing to perform the task at all. In some examples, the agent learns an optimal way of performing that same task based on feedback and/or performance metrics, and incorporate that learning into a subsequent execution of the task, such as even the very next execution of the task. Some examples use the multi-layer memory to persist learnings obtained from one task execution for subsequent executions.

Some examples address the problem of controlling the level of autonomy assigned to an agent. In some examples, the action store stores metadata including mutability characteristics of actions, which are used to identify actions that are capable of giving self-mutable capabilities to agents. Some examples employ a policies/configuration data store to maintain associations between agents and permitted levels of agent autonomy, such that at the time of agent configuration, the policies/configuration data is compared to the action metadata in the action store, to determine whether an action is properly assignable to an agent.

In various examples there is a computer-implemented method comprising using an input to determine a task, wherein the input is obtained via a device and an at least semi-autonomous agent. Using input from a device such as a user's computer where a semi-autonomous agent is deployed, gives ease of use to end users. In some examples, the input is user input, or observations from sensors at the device, or results of a process executing at the user device, or at a physical robot where the device is a physical robot such as a humanoid robot or a self-driving vehicle. The task is used to search an action store, wherein the action store comprises a hierarchical arrangement of actions and an action is executable via the at least semi-autonomous agent. Using an action store with a hierarchical arrangement of actions enables efficient searching of the action store. Using an action store with a hierarchical arrangement of actions gives a compact action store. In response to determining that the action store comprises an action that corresponds to the task, providing access to the agent to execute the action.

Thus, the agent is able to access an appropriate action in an efficient manner. The agent is triggered to execute action.

In various examples there is a computer-implemented method comprising receiving a signal via an agent, wherein the signal relates to a first execution of a task by the agent using an action store. In a non-limiting example, the task is a security task such as detecting and blocking malicious access to a cloud service and the semi-autonomous agent is security software executing on a user computing device. In the non-limiting example, the signal relates to first execution of the detecting and blocking malicious access to the cloud service by the security software.

The action store comprises a hierarchical arrangement of memory layers. Using a hierarchical arrangement of memory layers facilitates updating of the action store in a data driven fashion. The action store comprises a plurality of actions stored in one or more of the memory layers; and the action store stores first mappings between actions, and second mappings between actions and memory layers, where the first mappings among actions are hierarchical. Having the first mappings being hierarchical enables a compact storage giving efficiency. Having second mappings between actions and memory layers facilitates efficient searching for actions that are applicable to different agents or contexts. An action is executable by the agent. In the non-limiting example the signal is an observation of whether or not malicious access to the cloud service occurred in a specified time period.

The signal is used to modify at least a portion of the action store, such as by deleting an action which failed to give a successful outcome or moving an action which gave a successful outcome into a persisted memory layer, thus enabling data driven update of the action store. In an example, an action is to add a two factor authentication procedure to an account access process for accessing the cloud service. The signal is a successful outcome i.e., no malicious access to the cloud service in the specified time. At least the modified portion of the action store is provided to a second execution of the task by the at least semi-autonomous agent. In this way the agent learns since the changes in the action store result in changes in the actions executed by the agent.

In some examples, agent refers to a semi-autonomous or autonomous software system that is able to consume information and/or signals from its environment, execute logic, reasoning, and learning processes, and perform actions to achieve a specific goal or set of goals with minimal human guidance/intervention. In some examples, agents have multiple levels of autonomy. Some agents have the capacity to perform tasks requiring complex understanding, reasoning, learning, and adaptability. Some agents are capable of processing and interpreting natural language and/or multi-modal digital content, determine relevant context, formulate plans, and learn from interactions or data inputs. Some agents dynamically adapt their processing capabilities in response to changing environments or goals. Some agents are capable of interacting with human users and other systems, including other agents or groups of agents. Unlike simpler automated systems, agents are data-driven and are capable of utilizing machine learning and/or deep learning techniques to improve their performance over time, making them suitable for a wide range of applications including digital assistance, personalized learning, and sophisticated problem-solving scenarios.

In some examples, entity refers to users, other types of entities, such as companies, organizations, institutions, associations, cohorts, or groups of entities, and/or to technological entities such as devices, networks, systems, components, processes, models, or agents. Any aspects of any examples that are described in the context of users are applicable to other types of entities in other examples. In some examples, any entity has one or more associated agents that are dynamically configured for a particular role or task using the approaches described herein.

In some examples, terminology such as "real time" or "dynamic" refers to a time delay introduced by the use of computer technology, e.g., by back end data processing and/or network transmission, where the time delay is the difference in time, as measured, e.g., by a system clock, between the occurrence of an online event and the use of data processed in response to the event, such as for display, feedback, and/or control purposes. In some examples, real time or dynamic refers to a time interval between a user input to a computer system and a presentation of output by the computer system. In some examples, dynamic indicates that one or more system components, data structures or data stores, e.g., agents, actions, databases, vector stores, memory layers, etc., are updated, reconfigured, or refreshed within a time interval that is less than the time interval between two different inputs to a computer system. In some examples, an agent accesses a first action al and execute the first action al to prepare and present a response r1 to a first input i1 (e.g., a user interaction, sensor signal, etc.) with a computer system at a time t1. In some examples, the computer system obtains feedback f1 related to the response r1 at a time t2 which is greater than or equal to the time t1. At a time t3, the first action al is modified or updated by the computer system based on the feedback f1. If the computer system receives a second input i2 at a time t4, and time t4 is greater than or equal to the time t3, then the first action al is considered to have been updated dynamically, in some examples. Agents, actions, data stores, and/or memories are dynamically updated or reconfigured in some examples.

In some examples, learning, machine learning, or training refers to machine learning-based processes executed to improve agent performance of tasks and achievement of goals by agents. Examples of machine learning-based processes include processes used to configure, train, pre-train, or fine tune machine learning models, such as but not limited to supervised machine learning, semi-supervised machine learning, unsupervised machine learning, prompt engineering, reinforcement learning, in context learning, retrieval-augmented generation (RAG), retrieval-augmented fine tuning (RAFT), Chain-of-Thought reasoning, and/or Bayesian-style inference learning. In some examples, RAG or RAFT are be used to perform domain-specific fine tuning of a pre-trained machine learning model using, e.g., samples of digital content that represent the desired domain-specific knowledge. In some examples using RAG, digital content is stored in and retrieved from a data store, e.g., a database such as a vector database, using queries that are formulated to measure the similarity between the digital content in the vector database and the query, question, or request being asked. In some examples, embedding-based retrieval is used to match vector representations of digital content stored in a vector database with a vector representation of a query, question, or request. With in-context learning, the retrieved content is used as input to an LM or LLM, which generates a response to the input including the RAG content. In some examples, the RAG content is paired with an expected output to produce a training input-output pair, which is used to fine tune the LM or LLM. Approaches such as RAFT are usable to customize an LM or LLM according to a particular entity's preferences for performing a task. In some examples, RAFT is used to retrieve context data from multi-layer memory structures and the retrieved context data is used to fine tune a machine learning model. Additional examples of machine learning models and machine learning-based processes are described with reference to FIG. 13A, FIG. 13B, FIG. 13C, FIG. 13D, FIG. 13E.

In some examples, dialog, chat, or conversation refer to one or more conversational threads involving a user of a computing device and an application. In some examples, a dialog or conversation has an associated user identifier, session identifier, conversation identifier, or dialog identifier, and an associated timestamp. In some examples, thread refers to one or more rounds of dialog involving the user and an application. In some examples, a round of dialog refers to a user input and an associated system-generated response, e.g., a reply to the user input that is generated at least in part via a generative artificial intelligence model. Any dialog or thread includes one or more different types of digital content, including natural language text, audio, video, digital imagery, hyperlinks, source code, and/or multimodal content such as web pages.

Certain aspects of the disclosed technologies are described in the context of generative artificial intelligence models that receive text input and output text. However, the disclosed technologies are not limited to generative models that receive text input and produce text output. In some examples, aspects of the disclosed technologies are used to receive input and/or generate output that includes non-text forms of content, such as digital imagery, videos, multimedia, audio, hyperlinks, source code, and/or platform-independent file formats.

Certain aspects of the disclosed technologies are described in the context of electronic dialogs conducted via a network with an application system, such as a message- or chat-based application system or a search interface of an online system such as a social network system. However, aspects of the disclosed technologies are not limited to message- or chat-based systems or social network services, but are usable to improve various types of applications, machines, devices, and systems.

The disclosure will be understood more fully from the detailed description given below, which references the accompanying drawings. The detailed description of the drawings is for explanation and understanding, and should not be taken to limit the disclosure to the specific examples described.

In some examples, components with the same name but different reference numbers in different figures have the same or similar functionality such that a description of one of those components with respect to one figure is applicable to other components with the same name in other drawings.

Also, in the drawings and the following description, components shown and described in connection with some examples are capable of being used with or incorporated into other examples. In some examples, a component illustrated in a certain drawing is not limited to use in connection with the example to which the drawing pertains, but is usable with or incorporated into other examples, including examples shown in other drawings.

FIG. 1 is a component-based flow diagram of an example method 100 for agent-based task execution using an action store in accordance with some examples of the present disclosure.

The method 100 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some examples, the method 100 is performed by the computing system components shown in FIG. 1, FIG. 3, FIG. 4, one or more components of computing system 900 of FIG. 9, or agent system 1280 of FIG. 12. Although shown in a particular sequence or order, unless otherwise specified, the order of the processes is modifiable. In some examples, the processes are performed in a different order, and/or some processes are performed in parallel. Additionally, one or more processes are omitted in some examples. Thus, not all processes are required in every example. Other process flows are possible.

In FIG. 1, the method 100 is represented by arrows connecting components of a computing system, including components of an environment 101, an agent front end 102, and an agent back end 103. In the example of FIG. 1, the components of the agent front end 102 and/or agent back end 103 (collectively, agent system 102, 103) are implemented using one or more computing devices, such as an application server or server cluster. In some examples, the one or more computing devices include a secure environment (e.g., secure enclave, encryption system, etc.) for the processing of data. In other examples, one or more components of the agent system 102, 103 are implemented on a client device, such as a user system 1210, described herein with reference to FIG. 12. In some examples, some or all of agent system 102, 103 is implemented directly on a user's device or within an embedded system, thereby avoiding the need to communicate with servers over a network such as the Internet.

Referring to FIG. 9, in some examples, portions of the agent front end 102 are included in the automated agent 902, while portions of the agent back end 103 are included in the distributed multi-agent system 905, such as communication service 908, adaptive learning service 910, multi-layer memory structure 911, AI services 914, data resources 916, and/or tools 918.

The environment 101 includes one or more user devices 101A, a network 101B, and/or one or more sensing devices 101C. Examples of user devices 101A include computing devices, such as laptop computers, smart phones, mobile computing devices, smart appliances, wearable devices, game controls, vehicle controls, robotic devices, etc. Examples of networks 101B include wireless, optical, and/or wired communication networks. A non-exhaustive list of examples of sensing devices 101C includes motion sensors, load cells, force sensors, light sensors, temperature sensors, physiological sensors, energy sensors, and network sensors.

The agent front end 102 is or includes an application layer, presentation layer, and/or data layer of an agent-based task-oriented computing system. The agent front end 102 manages and facilitates electronic or electromagnetic communications between the environment 101 and the agent back end 103. In some examples, responsive to receiving input via one or more components of the environment 101, the agent front end 102 provides portions of the input to task management component 110, policies/config data 106, and/or action store management component 114 and provides portions of output produced by task management component 110, policies/config data 106, and/or action store management component 114 to the environment 101. Such output includes digital data such as multimodal content and/or instructions such as control signals.

In some examples, the output provided by the agent front end 102 to the environment 101 includes digital content for presentation via a graphical or multimodal user interface at one or more user devices 101A (e.g., search results, recommendations, access control instructions, user interface elements), control signals for processing by one or more components of the network 101B (e.g., network traffic routing instructions, load balancing instructions, network security instructions), or control signals for processing by one or more components of the sensing devices 101C (e.g., navigation instructions for a robotic device or vehicle, articulation or manipulation instructions for a component of a robotic device or vehicle, or operational instructions for a robotic device or vehicle, such as instructions to start, stop, or temporarily suspend the deployment of a component of the device or vehicle).

The agent back end 103 provides functionality that receives inputs from the agent front end 102, executes tasks in response to inputs, and provides output to the agent front end 102. The agent back end 103 includes policies/config data 106, a task management component 110, an action store management component 114, and an action store 128.

The policies/config data 106 includes one or more data stores (e.g., databases) that store data that is usable by agent front end 102, task management component 110, and/or action store component 114 to configure, control, or constrain the tasks performed by the agent system 102, 103. In some examples, the policies/config data 106 stores priority data that prioritizes certain memory layers of the action store 128 over others for querying by the task management component 110 in response to a given task, requesting entity, or execution context. Alternatively or in addition, the policies/config data 106 stores policies expressed as, for instance, logic, rules, or threshold conditions, which are usable by action store component 114 to determine whether and/or how to update the action store 128 in response to input from the environment and/or performance metrics associated with an execution of a task.

The task management component 110 is communicatively coupled to agent front end 102, policies/config data 106, action store management component 114, and action store 128. Task management component 110 builds or configures agents to execute tasks in response to inputs from the environment 101 and monitors the agent-based task executions. Task management component 110 includes an agent builder component 116 and a task execution component 118.

In response to a given set of one or more inputs from the environment 101, the agent builder component 116 configures the agent system 102, 103 to execute one or more tasks. The agent builder component 116 transforms inputs from the environment 101 to tasks, uses the action store 128 to map the tasks to actions stored in the action store 128, and outputs actions corresponding to the tasks for execution by the task execution component 118. In some examples, an action output by the agent builder component 116 is represented visually as an action graph. An action graph includes an action that corresponds to a task, one or more sub-actions, and dependencies or relationships between or among the action and sub-actions. An action graph also or alternatively is referred to as a workflow, in some examples. Functionality included in an example of the agent builder component 116 is described in more detail with reference to FIG. 3.

The task execution component 118 initiates and monitors the execution of tasks, which are expressed as actions output by the agent builder component 116, in accordance with policies/config data 105. The task execution component 118 receives signals, such as user feedback and/or values of performance metrics, during execution of an action and causes action store management component 114 to log those signals in the action store 128 for subsequent processing by action store management component 114.

The action store management component 114 creates, maintains, and/or updates the action store 128 or actions stored therein, in response to tasks executions, feedback, performance data, and/or changes in policies/config data 106. In some examples, user feedback and/or performance data logged during an execution of an action initiates the creation of a new action or an update to the configuration of an action in action store 128 by the action store management component 114.

The action store management component 114 includes an action store builder component 120 and a trajectory optimization component 122. The action store builder component 120 creates and updates actions in response to, for example, output of trajectory optimization component 122. In some examples, the action store builder component 120 adds a new action to the action store, modify the relationships between actions and sub-actions, or modify the assignments of actions to memory layers in response to output of trajectory optimization component 122.

The trajectory optimization component 122 executes one or more trajectory optimization algorithms during or at the conclusion of a task execution to determine whether action store 128 should be updated based on the results of the task execution including any feedback or performance data associated with the task execution. A trajectory optimization algorithm is a type of optimization algorithm that is usable to design or re-design a trajectory to minimize or maximize the value of a performance metric while satisfying a set of constraints. As applied in some examples of action store management, the structure of an action (e.g., a visualization of the action as a graph) is analogous to a trajectory, the performance metric is specified by policies/config data 106, a current value of the performance metric is obtained or computed by task execution component 118 using, e.g., input and/or feedback from the environment 101 during a task execution, and the set of constraints includes dependencies between sub-actions.

Output produced by trajectory optimization component includes, for instance, an instruction to create a new action in the action store, remove an action from the action store, or to modify the structure of an action. In some examples, an instruction produced by trajectory optimization component causes action store builder component 120 to combine multiple sub-actions into a single action, to divide an action into a group of sub-actions, or to create a different version of an action that is customized for a specific entity or usage context. The output of the trajectory optimization component 122 is provided to action store builder component 120. Functionality included in some examples of the agent builder component 116 is described in more detail with reference to FIG. 4.

The action store 128 includes one or more data stores (e.g., graph databases, vector stores). The action store 128 includes action data 130, memory layers 132, action-action mappings 134, action-memory layer mappings 136, and an embedding store 138. The action data 130 includes a data record that stores information for each action. An illustrative example of an action data record is described with reference to FIG. 2A.

The memory layers 132 include definitions of logical and/or physical memory layers. The memory layers 132 are configured to facilitate low-latency access to task-relevant actions by task management component 110. Illustrative examples of memory layers 132 are described with reference to FIG. 5A-FIG. 5C and FIG. 11A-FIG. 11B.

The action-action mappings 134 include relationships between or among actions and sub-actions, such as action-specific dependencies, which include one-to-one, one-to-many, and/or many-to-many relationships. In some examples, the same sub-action is used to perform multiple different actions and some actions include no sub-actions, a single sub-action or multiple different sub-actions. The action-action mappings 134 are expressed programmatically using graph edges or keys, in some examples. Illustrative examples of action-action mappings 134 are described with reference to FIG. 2B.

The action-memory layer mappings 136 include relationships between or among actions and memory layers. Different memory layers are associated with different rules or thresholds regarding priority or accessibility to different entities or agents, in some examples. These rules or thresholds are specified in policies/config data 106, in some examples. Thus, the creation or modification of action-memory layer mappings 136 by action store management component 114 controls the priority or accessibility of different actions by different entities or agents, in some examples. The action-memory layer mappings 136 are expressed programmatically using, e.g., graph edges or keys, in some examples. Illustrative examples of action-memory layer mappings 136 are described with reference to FIG. 2C.

The embedding store 138 stores embeddings. In some examples, embedding refers to a machine learning model-generated numerical representation of an input to the machine learning model. In some examples, an embedding encodes information, e.g., a set of features associated with an entity and/or attribute, relative to an embedding space, where the embedding space represents a set of training data with which the machine learning model has been trained. In some examples, an embedding is expressed programmatically as a vector, where each dimension of the vector includes a numerical value that is an integer or a real number (e.g., a floating-point number). The numerical value assigned to a given dimension of the vector conveys information about the data represented by the embedding, relative to the embedding space, also referred to as a vector space. The embedding space (or vector space) includes all of the possible values of each dimension of the vector. The embedding space is defined by the way in which the machine learning model used to generate the vector has been trained and configured, including the training data used to train the model.

The embedding store 138 includes task embeddings and/or action embeddings. In some examples, when a new action is created, an embedding of the action description and/or action metadata is created and stored in embedding store 138. Similarly, when a new task is determined by task management component 110, an embedding of the task is created and stored in embedding store 138, in some examples. Task embeddings and action embeddings are created using the same embedding space, in some examples. For instance, task embeddings and action embeddings are both generated by the same GMLM, in some examples.

The embedding store 138, including the task embeddings and action embeddings, facilitates the use of embedding-based retrieval to identify actions in the action store 128 that are capable of performing tasks requested by the environment 101. Embedding-based retrieval (EBR) is a method of searching for similar digital content. Embedding-based retrieval involves converting digital data, e.g., text, source code, multimodal content, sets of features, etc., to embeddings and then using a similarity algorithm, such as nearest-neighbor search or cosine similarity, to identify embeddings that are similar to one another. Terms such as similar, match or map as used herein refer to an exact match, in some examples, or an inexact match, in other examples. Examples of similar, match or map refer to a machine-determined predicted or estimated degree of similarity or compatibility between data items that satisfies (e.g., meets or exceeds) a threshold level of similarity or compatibility, where the threshold level of similarity or compatibility is variable based on the requirements of a particular design or implementation. The threshold level of similarity is capable of being set lower or higher for different types of similarity, matching or mapping.

In operation, the agent front end 102 receives input from the environment 101. The agent front end 102 exchanges communications 104 with task management component 110 to determine and execute one or more tasks in response to the input.

The task management component 110 exchanges communications 124 with action store 128 to identify actions to be included in the task execution. The task management component 110 is capable of exchanging communications 112 with action store management component 114 during or after task execution, such as feedback and/or performance metric updates to be added to action store 128 as a result of a task execution.

The agent front end 102 is capable of exchanging communications 108 with action store management component 114 to initiate the creation or updating of the action store 128 in response to input from the environment 101. The communications 108 also or alternatively includes information from action store management component 114 to agent front end 102, such as communications of action store updates that the agent front end 102 is capable of presenting to the environment 101. In some examples, agent front end 102 updates a user interface to reflect new actions added to action store 128 or actions removed from action store 128, in response to communications 108.

The action store management component 114 exchanges communications 126 with action store 128 to create, read, update, or remove records from action store 128 in response to input from the environment 101 and/or task executions. In some examples, communications 126 include instructions to create, modify or delete, or to modify access levels pertaining to, one or more of action data 130, memory layers 132, action-action mappings 134, action-memory layer mappings 136, or embedding store 138.

The examples shown in FIG. 1 and the accompanying description are provided for illustration purposes. This disclosure is not limited to the described examples.

FIG. 2A is a schematic diagram of an example of a data structure 200 for an action in accordance with some examples of the present disclosure. The data structure 200 provides a logical and/or physical organization of data relating to an action. In some examples, the data structure 200 is implemented as a data record stored in a database, such as a key-value store, a graph database, a vector database, or another type of database.

Action refers to any type of action (function, skill, tool, task, etc.) that is capable of being performed (e.g., executed via one or more computing devices) by an agent, in some examples. A complete set of actions that a particular agent is capable of performing is referred to as that agent's action space, in some examples. Illustrative examples of actions include: execution of local code (e.g., built-in or plug-in Python function) (this type of action is referred to as a tool, in some examples); providing an instruction to a machine learning model, e.g., prompting a GMLM; executing a task (e.g., a group or series of related tasks); invocation of a remote service, such as an API or data management system (this type of action is referred to as a skill, in some examples); sending a request to another agent, group of agents, or human user. In some examples, actions are represented as GMLM-compatible function definitions (e.g., OPENAI or Pydantic JSON serialization). In some examples, an action is represented as a function that takes structured inputs and produces structured outputs, and includes a description of its purpose.

A skill represents a category of actions including complex operations that typically require external interactions beyond the local context of the agent. Unlike tools, which are simple and localized functions executable within the agent's immediate processing environment, skills involve calling external services or APIs, interacting with other agents or human users, and/or managing or manipulating external data systems, in some examples. Skills are defined by clear intent, with well-defined inputs and outputs. Skills encompass a wide range of functionalities, from querying databases and invoking web services to complex problem-solving tasks that require the synthesis of information from multiple sources, in some examples. The definition and execution of skills includes the technical specifications, the operational context, and the logical flow of the agent's tasks.

Tool refers to a category of actions characterized by simple, localized operations that an agent is capable of performing within its immediate execution context or environment, in some examples. Tools represent basic functions or routines that do not typically require external interaction or complex processing beyond the agent's current scope of work, in some examples. Illustrative examples of such functions include generating microprompts, executing internal or plugin functions, code generation for specific tasks (e.g., lambda functions), and basic data manipulation or computation.

In the data structure 200, each unit or element of the data structure (e.g., a field, column, node, dimension) stores digital data related to a particular action. In the example of FIG. 2A, the data structure 200 includes an action identifier (ID) 202, action metadata 204, and one or more executable elements 206. The action ID 202 uniquely identifies an action as distinguished from other actions.

The metadata 204 includes information that defines or describes the action associated with the action ID 202. For instance, the metadata 204 includes an owner identifier 208, a description 210, indexing 212, usage restrictions 214, and performance data 216. The owner identifier 208 identifies an entity that is associated with the action. In some examples, the owner ID is an entity that created the action, such as a user, another agent, or another type of entity.

The description 210 includes digital content that describes the action. The description 210 includes, in some examples, natural language text and/or multimodal digital content such as digital images, video, and/or audio. Alternatively or in addition, the description 210 includes an embedding of such digital content and/or other components of the action data record, or an identifier of the action embedding, where the action embedding is stored in the embedding store.

The indexing 212 includes an index of task embeddings with which the action is associated. For instance, the indexing 212 contains task embedding identifiers 218 for all of the tasks to which the action relates. The task embeddings themselves are stored in an embedding store (e.g., the embedding store 138 described with reference to FIG. 1), in some examples. The indexing 212 facilitates querying of the action store by the task management component during task execution to identify actions that are applicable to requested tasks, in some examples.

The indexing 212 is initialized using domain knowledge and updated based on task executions, in some examples. The embedding store is pre-populated with task embeddings of tasks that are pre-defined based on domain knowledge, such as a taxonomy, in some examples. The pre-populated embedding store is capable of being used to initialize the indexing 212. In some examples, the indexing 212 is configured for embedding-based retrieval (EBR), retrieval-augmented generation (RAG), and/or other querying techniques.

The usage restrictions 214 include information that is usable by the task management component to determine whether an action is permitted to be used by a certain agent or to perform a particular task. In some examples, the usage restrictions 214 include a flag that indicates whether the action includes one or more self-mutable capabilities that enable an agent to evaluate and modify its own configuration.

The performance data 216 includes information related to the performance of the action during task executions, such as cost (e.g., in terms of resource allocation), execution time, accuracy, efficiency, user feedback, signals from the environment, relevance of output generated by the action to a requested task, precision, recall, etc.

The executable elements 206 of an action include digital items that are executable by one or more computing devices, e.g., by task execution component 118, to complete the action in accordance with the description 210, in response to input from the environment 101. In some examples, executable elements 206 include code snippets, functions, plug-ins, API or RPC calls, GMLM instructions (e.g., prompts or microprompts), queries, inter-process communications, etc.).

The examples shown in FIG. 2A and the accompanying description are provided for illustration purposes. This disclosure is not limited to the described examples.

Figure 2B:
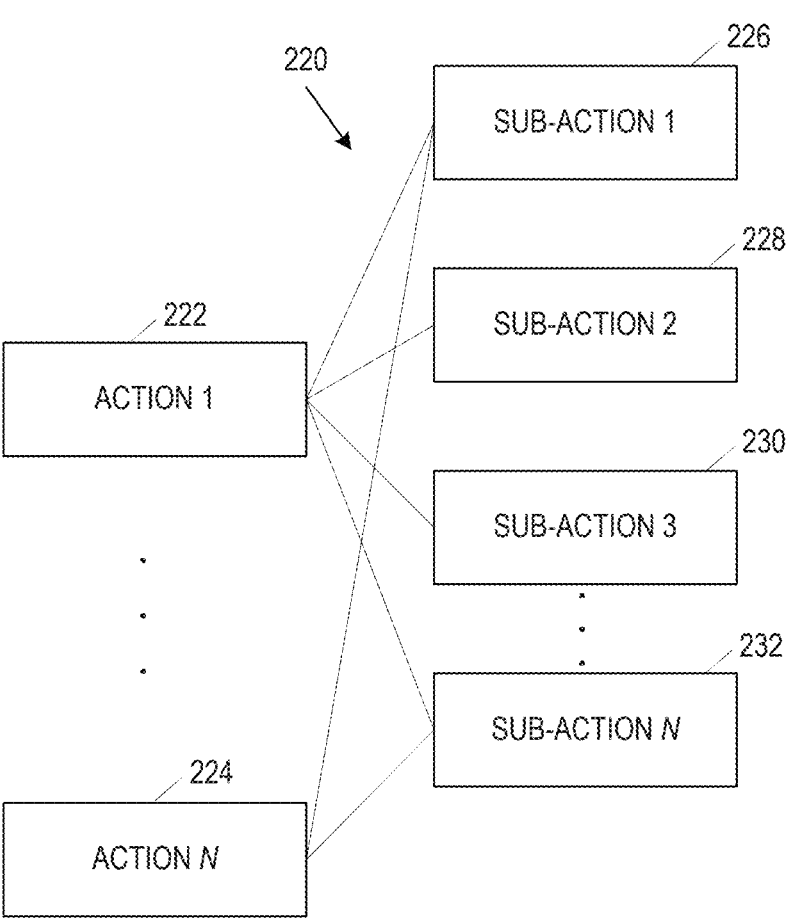
FIG. 2B is a schematic diagram of an example of action mappings in accordance with some examples of the present disclosure.
Figure 2C:
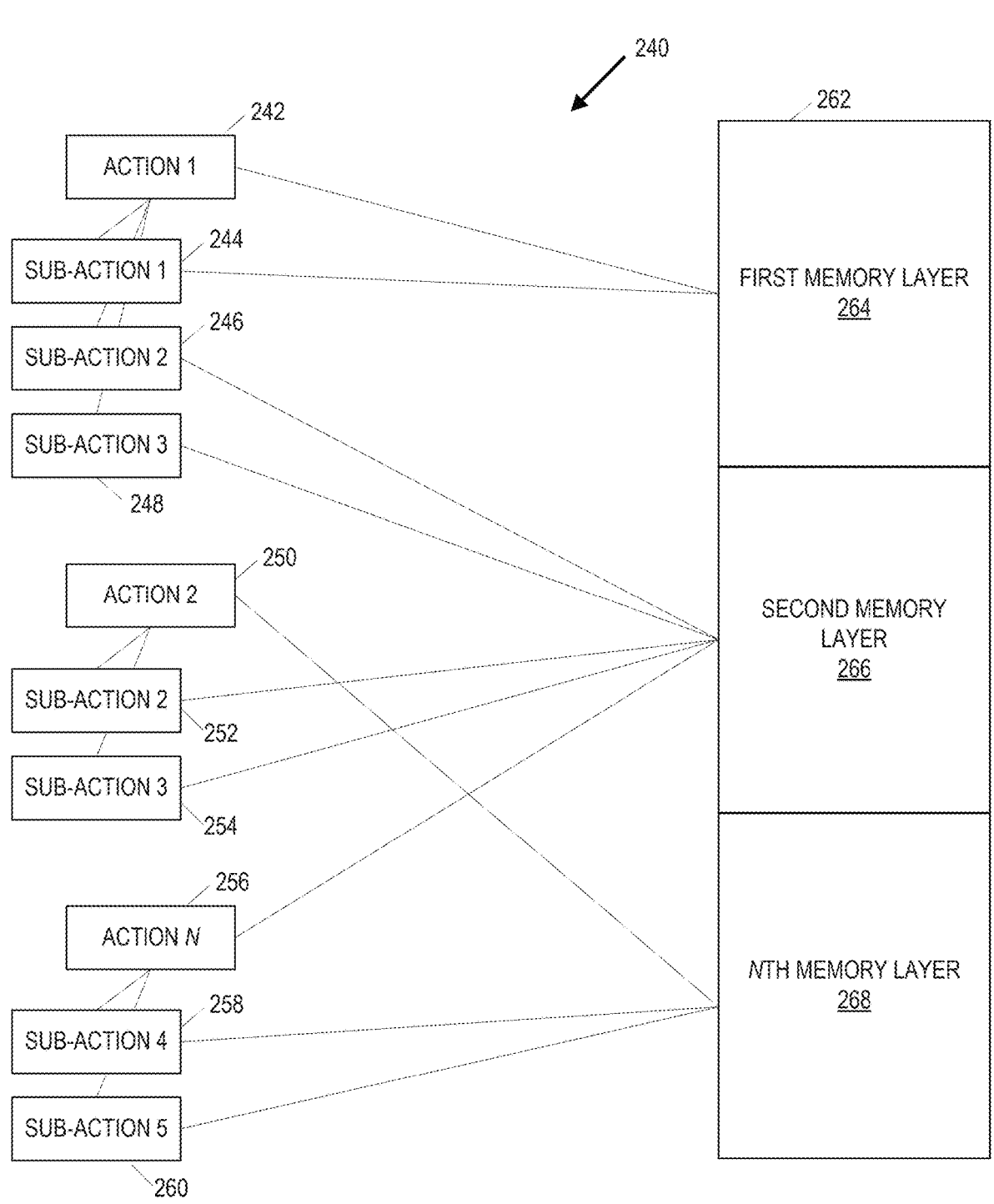
FIG. 2C is a schematic diagram of an example of action to memory layer mappings in accordance with some examples of the present disclosure.

FIG. 2B is a schematic diagram of an example of action-action mappings in accordance with some examples of the present disclosure. The action-action mappings 220 are usable to define an action as a group or sequence of sub-actions. As such, the action-action mappings 220 enable the action store to create, maintain, and update actions of any degree of complexity from single-function to multi-function actions and even actions that involve multiple different agents. The action-action mappings 220 also facilitate agent configuration and task execution by the task management component to help conserve computing resources. In some examples, the task management component only needs to query the top level of the action hierarchy (e.g., the root nodes) to identify actions that are capable of performing requested tasks in their entirety. In some examples, the task management component uses an iterative, hierarchical querying method, or an optimized path query to selectively query subsequent levels of the action hierarchy only when the previously-queried levels do not contain any actions related to a requested task.

The example of FIG. 2B includes N actions and N sub-actions, where, in each instance, N is a positive integer and N is capable of having a different value in different instances or contexts such that the number of actions does not need to be the same as the number of sub-actions. FIG. 2B shows illustrative actions 222, 224, illustrative sub-actions 226, 228, 230, 232, and action-action mappings 220. The actions, sub-actions, and action-action mappings are implemented using, e.g., graph database structures (e.g., nodes, edges, and paths) and/or key-value stores, in some examples.

The action-action mappings 220 indicate hierarchical relationships between or among actions and sub-actions. FIG. 2B shows an action hierarchy with two levels; however, any action hierarchy is capable of including any number of levels. In some examples, a sub-action 226, 228, 230, 232 is itself mapped to one or more other sub-actions, and so on. Also or alternatively, any level of the hierarchy is capable of containing any number of actions or sub-actions. Any action is capable of having zero or more mappings with other actions or sub-actions. In some examples, an action is an action and is also sub-action of another action. In some examples, action 222 is a sub-action of action 224 for some tasks. The example of FIG. 2B shows action 1 222 having a mapping to each of the sub-actions 226, 228, 230, 232, and action 224 having a mapping with each of the sub-actions 226 and 232. In other examples, the number of action-action mappings 220 for a given action is different for other actions. In some examples, the number of action-action mappings 220 for a given action is updated over time, e.g., based on output of the trajectory optimization component described with reference to FIG. 1.

The examples shown in FIG. 2B and the accompanying description are provided for illustration purposes. This disclosure is not limited to the described examples.

FIG. 2C is a schematic diagram of an example of action to memory layer mappings in accordance with some examples of the present disclosure.

In some examples, memory layer refers to a logical and/or physical unit, location, or portion of memory that has a specific purpose. Conversational memory (referred to as working memory, in some examples) is capable of storing information collected as an agent interacts with users and other agents. In some examples, the conversational memory has different levels of access to messages that have been exchanged during an agent's session, such as raw dialog histories, summaries of messages, or EBR-based search of relevant messages given a query. Experiential memory (referred to as episodic, procedural, or long-term memory, in various examples) includes persistent storage that is structured and often indexed (e.g., for EBR) and provided with, e.g., CRUD operations (create, read, update, delete), query, and search operations to support, for example, the context for a task that an agent is currently working on, the learnings from the agent's execution of that task into an episode for trajectory optimization, the long-term factual data and models constructed by an agent over its lifetime, and/or the shared context for a group of agents collectively executing a task.

The example of FIG. 2C illustrates a hierarchical and multi-layer structure of an action store. The structure includes actions, sub-actions, memory layers, action-action mappings, and action-memory layer mappings 240. Each of the N illustrative actions 242, 250, 256 includes a number of sub-actions and the corresponding action-action mappings between the action and associated sub-actions. For instance, action 242 is represented as a graph in which each of the sub-actions 244, 246, 248 are linked with the action 242. Action 250 is represented as a graph in which each of the sub-actions 252, 254 are linked with the action 250. Action 256 is represented as a graph in which each of the sub-actions 258, 260 are linked with the action 256.

The multi-layer memory 262 includes N memory layers, including a first memory layer 264, a second memory layer 266, and an Nth memory layer 268. The memory layers 264,

266, 268 are arranged according to a hierarchy or priority. In some examples, the hierarchy or priority is defined in, e.g., policies/config data 106 described with reference to FIG. 1. The hierarchy or priority data indicates a priority order for search functions, such that some memory layers are queried before other memory layers, in some examples. First memory layer 264 includes a short-term or working memory that is queried first during a task execution, and second memory layer 266 includes a long-term or experiential memory into which learnings from a task execution are stored, in some examples. Alternatively or in addition, the hierarchy or priority indicates threshold access levels by which access to the memory layers by different agents is controlled. In some examples, first memory layer 264 and second memory layer 266 are local memories that are only accessible to a specific, associated agent while the Nth memory layer 268 is a collective memory that is accessible to multiple different agents.

The example of FIG. 2C shows that different components of an action are mappable to different memory layers. In some examples, component-level mapping is done for efficiency and/or conservation of memory resources, e.g., so that the same action or sub-action is not stored in multiple memory layers. In some examples, action 242 and sub-action 244 are mapped to first memory layer 264 while sub-action 246 and sub-action 248 are mapped to second memory layer 266. In some examples, an initial execution of a task includes action 242 and sub-action 244, and based on feedback from the initial execution, sub-action 246 and sub-action 248 are added to action 242 (e.g., as a specific user preference as to how the agent is to perform action 242).

In another example, action 250 is mapped to the Nth memory layer 268 while sub-action 252 and sub-action 254 are mapped to the second memory layer 266. In some examples, a first execution of a task includes only action 250 (e.g., obtained from a collective memory) and based on feedback and/or performance signals from the particular environment in which the first execution took place, learnings from the first execution include adding sub-action 252 and sub-action 254 to action 250 and adding mappings between each of the sub-actions 252, 254 and the second memory layer 266.

In other examples, action 256 is mapped to second memory layer 266 while each of sub-actions 258, 260 are mapped to the Nth memory layer. In some examples, an agent learns from a first execution that a task is capable of being effectively performed by action 256 using sub-actions 258, 260 obtained from a global or 'corporate' memory layer 268. In some examples, the task is ambiguous on the first execution but as a result of performance metrics associated with the first execution the agent determines that the task is performed effectively using the action 256 including the sub-actions 258, 260, where the sub-actions 258, 260 are accessible to the agent not via a local memory layer but via a shared or remote memory layer that is accessible to multiple different agents or entities. Examples of how actions, memory layers, and mappings of the action store are updated based on task executions are described with reference to FIG. 5A, FIG. 5B, and FIG. 5C. Additional examples of memory layers and action stores (e.g., data registries) are described with reference to FIG. 10, FIG. 11A, and FIG. 11B.

The examples shown in FIG. 2C and the accompanying description are provided for illustration purposes. This disclosure is not limited to the described examples.

Figure 3:
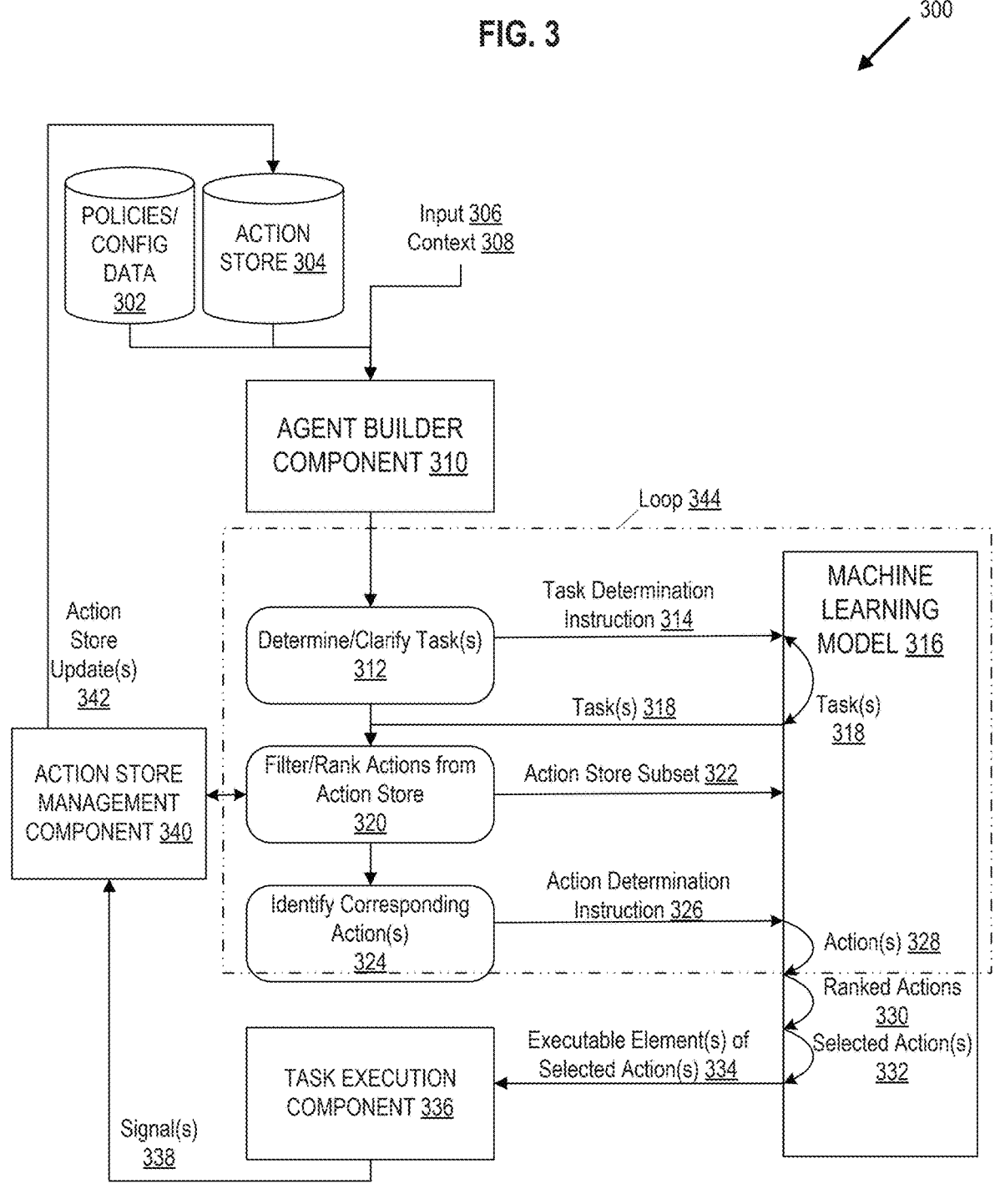
FIG. 3 is a component-based flow diagram of an example method for agent-based task execution in accordance with some examples of the present disclosure.

FIG. 3 is a component-based flow diagram of an example method for agent-based task execution in accordance with some examples of the present disclosure.

The method 300 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some examples, the method 300 is performed by the computing system components shown in FIG. 1, FIG. 3, FIG. 4, one or more components of computing system 900 of FIG. 9, or agent system 1280 of FIG. 12. Although shown in a particular sequence or order, unless otherwise specified, the order of the processes is modifiable. In some examples, the processes are performed in a different order, and/or some processes are performed in parallel. Additionally, one or more processes are omitted in some examples. Thus, not all processes are required in every example. Other process flows are possible.

In the example of FIG. 3, an agent builder component 310 configures an agent to perform a task by using an action store 304 and one or more machine learning models 316 to identify one or more actions that are capable of completing the requested task. In some examples, the one or more identified actions include a single action that completely performs the task or an action graph that contains multiple actions each of which performs a different portion of the task. The action builder component 310 and/or the machine learning model 316 provides the task-aligned actions, or at least the executable elements of such actions, to task execution component 336 for execution.

In operation, some examples of agent builder component 310 perform operations 312, 320, 324 iteratively, as indicated by loop 344, until a one-to-one mapping of tasks to actions is determined. In some examples, agent builder component 310 receives input 306 and context 308 from, e.g., agent front end 102 or directly from an environment (e.g., environment 101).

Illustrative examples of the input 306 include selections from a user interface, communications from a network, and/or signals from one or more sensing devices. Illustrative examples of the context 308 include metadata associated with the input 306, such as session information, user account information, entity profile data, interaction history data. Illustrative examples of other inputs to agent builder component 310 include policies/config data 302 and action store 304, described with reference to FIG. 1 and FIG. 2A-FIG. 2C. Machine learning model 316 includes one or more machine learning models, such as GMLMs. In some examples, the same machine learning model is used in the performance of all of operations 312, 320, 324 while in other examples, different machine learning models are used to perform different operations 312, 320, 324. Examples of machine learning models that are usable to perform portions of operations 312, 320, 314 are described with reference to FIG. 13A-FIG. 13E.

At determine/clarify tasks operation 312, the agent builder component 310 provides a task determination instruction 314 to machine learning model 316 to cause the machine learning model 316 to convert the input 306, and context 308, if available, to one or more tasks 318. In some examples in which the machine learning model 316 is a GMLM, the task determination instruction 314 is configured to provide the input 306 and context 308 to the machine learning model 316 as model inputs along with an instruction that instructs the machine learning model 316 to classify the model inputs, into one of a plurality of classes where each class is a task, using the GMLM's training data alone or in combination with structured data such as task embeddings, a task vocabulary or taxonomy.

In other examples, the machine learning model 316 is a binary or multi-class classifier implemented using, e.g., a logistic regression model, and the task determination instruction 314 provides the input 306 and context 308 to the machine learning model 316 as a feature set or embedding (in other words, the determine/clarify task(s) operation 312 converts the input 306 and context 308 to a feature set or embedding to be used as model input and then provides the model input to the machine learning model 316).

The determine/clarify task(s) operation 312 is capable of executing iteratively. In some examples, if the initial input 306 and/or context 308 is ambiguous or lacking information needed to fill one or more parameters of the task determination instruction 314, the determine/clarify task(s) operation 312 requests additional input 306 and/or context 308 from, e.g., agent front end 102, until the one or more parameters of the task determination instruction 314 are filled.

In response to one or more iterations of task determination instruction 314, machine learning model 316 determines and outputs one or more task(s) 318. Illustrative examples use an embedding-based retrieval technique to identify task(s) that correspond to different combinations of input 306 and/or context 308. In some examples, task embeddings are pre-generated and stored in an embedding store (e.g., embedding store 138) using, for example, domain knowledge, dialog histories, and/or structured data such as a taxonomy, so that when a combination of input 306 and/or context 308 is received by agent builder component 310, such combination is converted to an embedding using the same embedding space as used to create the task embeddings, and matched to task embeddings in the embedding store.

The task(s) 318 determined by machine learning model 316 are used to identify corresponding actions in the action store 304. In some examples, the filter/rank actions from action store operation 320 uses the task(s) 318 or the corresponding task embeddings to search the action store 304 for actions whose associated action embeddings match the task embeddings. If no actions in the action store are found that correspond to the task(s) 318, the filter/rank actions from action store operation 320 sends a communication to action store management component 340 to initiate the creation of a new action in the action store, in some examples.

In response to task(s) 318, the filter/rank actions from action store operation 320 provides an action store subset 322 to machine learning model 316. The action store subset 322 includes a filtered portion of the action store 304; e.g., only those actions that correspond to the task(s) 318. Filtering the actions enables the machine learning model 316 to identify actions more efficiently and with reduced risk of AI hallucination, in some examples. Alternatively or in addition, the operation 320 uses policies/config data 302 to filter the action store 304, so that the action store subset 322 includes only those actions that the particular agent is permitted to execute and/or only those actions that satisfy one or more performance criteria. However, in some examples, the action store subset 322 includes the entire action store 304 instead of a filtered subset that contains less than all of the actions in the action store 304.

The identify corresponding action(s) operation 324 provides an action determination instruction 326 to machine learning model 316. The action determination instruction 326 is configured to cause the machine learning model 316 to use the action store subset 322 and the tasks(s) 318 to identify one or more action(s) that correspond to the task(s) 318. In some examples, the action determination instruction 326 includes an instruction to cause the machine learning model 316 to generate a set of requirements for performing one or more of the task(s) 318 and then identify one or more action(s) from the action store subset 322 that is capable of satisfying each of the requirements generated by the machine learning model 316.

In some examples, the action determination instruction 326 includes an instruction to cause the machine learning model 316 to determine, for a given task 318, whether there exists, in the action store subset 322, one or more single actions that completely perform that task 318. In some examples, the action determination instruction 326 includes a first instruction to cause the machine learning model 316 to generate a set (e.g., one or more) of actions 328, each of which is capable of completely performing the task 318, a second instruction to cause the machine learning model 316 to rank the actions in the set of actions 328 according to one or more ranking criteria to produce ranked actions 330, and a third instruction to cause the machine learning model 316 to select the top k actions from the set of ranked actions to produce selected action(s) 332, where k is a positive integer whose value is configurable based on the requirements or design of a particular implementation. In any case where multiple instructions are described, any of the multiple instructions are capable of being combined into fewer instructions or divided into a greater number of instructions to achieve greater efficiency, lower latency, reduce AI hallucination, or improve some other performance metric.

If, in response to an action determination instruction 326 that instructs the machine learning model 316 to determine whether there is a single action in the action store 304 that is capable of completely performing a task 318, the machine learning model 316 determines that no such action exists in the action store 304, the loop 344 returns to determine/ clarify task(s) operation 312 for further clarification of the task 318, in some examples. In these examples, the task determination instruction 314 instructs the machine learning model 316 to perform a task decomposition process which divides the task 318 into a set (e.g., one or more) of sub-tasks, and then to perform the identify corresponding action(s) operation 324 for each sub-task. A task decomposition process is capable of being performed iteratively via loop 344 until there is a one-to-one correspondence between tasks (or sub-tasks, as the case may be) and actions contained in the action store 304.

The machine learning model 316 or the agent builder component 310 outputs the selected action(s) 332 corresponding to the task(s) 318, or at least the executable element(s) 334 of the selected action(s), to task execution component 336 for an execution of the task(s) 318. The executable elements 334 are capable of being extracted from the corresponding action data records in the action store 304 by machine learning model 316 or task execution component 336. In some examples, the output of machine learning model 316 includes one or more action subgraphs, where nodes or elements of the subgraphs contain or reference corresponding executable elements.

The task execution component 336 performs an execution of the actions determined by machine learning model 316 to correspond to the task(s) 318, e.g., in accordance with the respective action subgraphs and applicable policies/config data 302. During the execution, the task execution component 336 receives one or more signals 338 pertaining to one or more of the actions or its execution. In some examples, the signal(s) 338 include feedback from the environment 101, performance data associated with the execution or one or more actions involved in the execution, and/or communications from one or more other agents. In some examples, an evaluation agent of a multi-agent system evaluates instances of machine learning model output for compliance with one or more evaluation criteria (e.g., spam, inappropriate content, AI hallucination, etc.) and provides signals to the task execution component 336.

The task execution component is capable of communicating one or more of such signals 338 to action store management component 340. In response to signal(s) 338, action store management component 340 communicates one or more action store updates 342 to action store 304. In some examples, action store update(s) 342 include feedback and/ or performance data for a particular action, which is logged in the data record for that action in the action store 304. As a result, the next time the action store 304 is queried, e.g., on a subsequent execution of a task 318, the feedback and/or performance data from the earlier execution is available to the agent builder component 310.

The examples shown in FIG. 3 and the accompanying description are provided for illustration purposes. This disclosure is not limited to the described examples.

Figure 4:
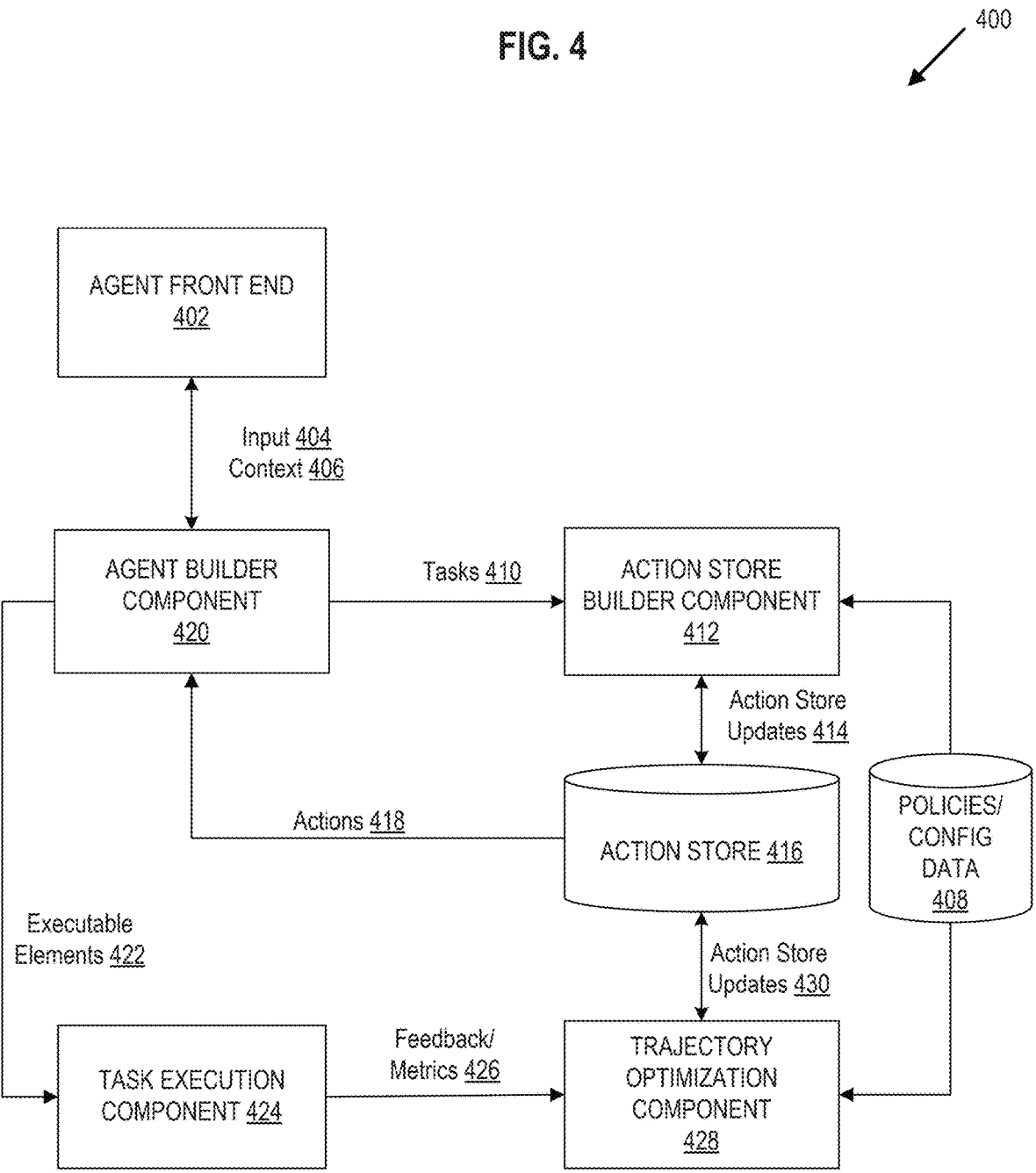
FIG. 4 is a component-based flow diagram of an example method for action store management in accordance with some examples of the present disclosure.

FIG. 4 is a component-based flow diagram of an example method 400 for action store management in accordance with some examples of the present disclosure.

The method 400 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some examples, the method 400 is performed by the computing system components shown in FIG. 1, FIG. 3, FIG. 4, one or more components of computing system 900 of FIG. 9, or agent system 1280 of FIG. 12. Although shown in a particular sequence or order, unless otherwise specified, the order of the processes is modifiable. In some examples, the processes are performed in a different order, and some processes are performed in parallel. Additionally, one or more processes are omitted in some examples. Thus, not all processes are required in every example. Other process flows are possible.

The example of FIG. 4 illustrates processes for maintaining and updating an action store. From time to time during execution of an agent system (e.g., as described with reference to FIG. 1, FIG. 9, FIG. 10, FIG. 12) an agent builder component 420 receives input 404 and/or context 406 via one or more agent front ends 402. The agent builder component 420 converts input 404 and/or context 406 to tasks 410, determines actions 418 in the action store 416 that correspond to the tasks 410, and provides executable elements 422 associated with the actions 418 to task execution component 424, for instance as described with reference to FIG. 3.

If the agent builder component 420 identifies a new task, e.g., a task 410 that does not have a corresponding action in the action store 416, agent builder component 420 provides the task 410 to action store builder component 412, in some examples. In response to such a task 410, the action store builder component 412 initiates one or more action store updates 414 and provide such updates 414 to action store 416. In some examples, agent front end 402 provides an interactive chat-style onboarding procedure through which a user defines or configures a new task. In response to such an onboarding procedure, action store builder component 412 initializes or updates the action store 416 or at least a portion of the action store 416 with action store updates 414 obtained via the onboarding procedure or otherwise associated with that particular user.

One or more action store updates 430 is initiated via one or more task executions, in some examples. Task execution component 424 is capable of providing feedback and/or performance metrics 426 to a trajectory optimization component 428. Trajectory optimization component 428 applies one or more trajectory optimization techniques to one or more actions based on feedback/metrics 426. In some examples, trajectory optimization component 428 converts the output of the one or more trajectory optimization techniques to one or more action store updates 430, and provides such updates 430 to action store 416.

In response to feedback and/or metrics 426 for a particular action represented by an action graph, trajectory optimization component 428 generates a set (e.g., one or more) of alternative action graphs and then apply an optimization algorithm to current action graph and each of the alternative action graphs, where the optimization algorithm seeks to optimize the value of one or more optimization parameters (e.g., to minimize the value output by a cost function). Via the optimization algorithm, the trajectory optimization component 428 obtains a score (such as an estimated cost) for each of the current action graph and alternative action graphs. The trajectory optimization component 428 uses these scores to rank the current action graph and alternative action graphs, for instance so that the lowest-cost action graph is ranked the highest and the highest-cost action graph is ranked the lowest. If the lowest-cost action graph is one of the alternative action graphs and not the current action graph, the trajectory optimization component 428 provides the alternative action graph with the lowest cost to the action store 416 as an action store update 430 (e.g., to replace the current action graph, or to be stored in a different memory layer, such as an experiential memory layer, for use on a subsequent task execution).

In some examples, updates to policies/config data 408 trigger one or more action store updates 414 or action store updates 430. If configuration data in the policies/config data 408 is updated, e.g., to change the access level or priority of memory layers for query purposes, such configuration updates are propagated to the action store 416 via one or more action store updates 414, 430, in some examples. Alternatively or in addition, if policy data in the policies/config data 408 is updated, e.g., to change a self-mutability flag associated with a mutability characteristic of a particular action, such policy updates are propagated to the action store 416 via one or more action store updates 414, 430.

The examples shown in FIG. 4 and the accompanying description are provided for illustration purposes. This disclosure is not limited to the described examples.

Figure 5A:
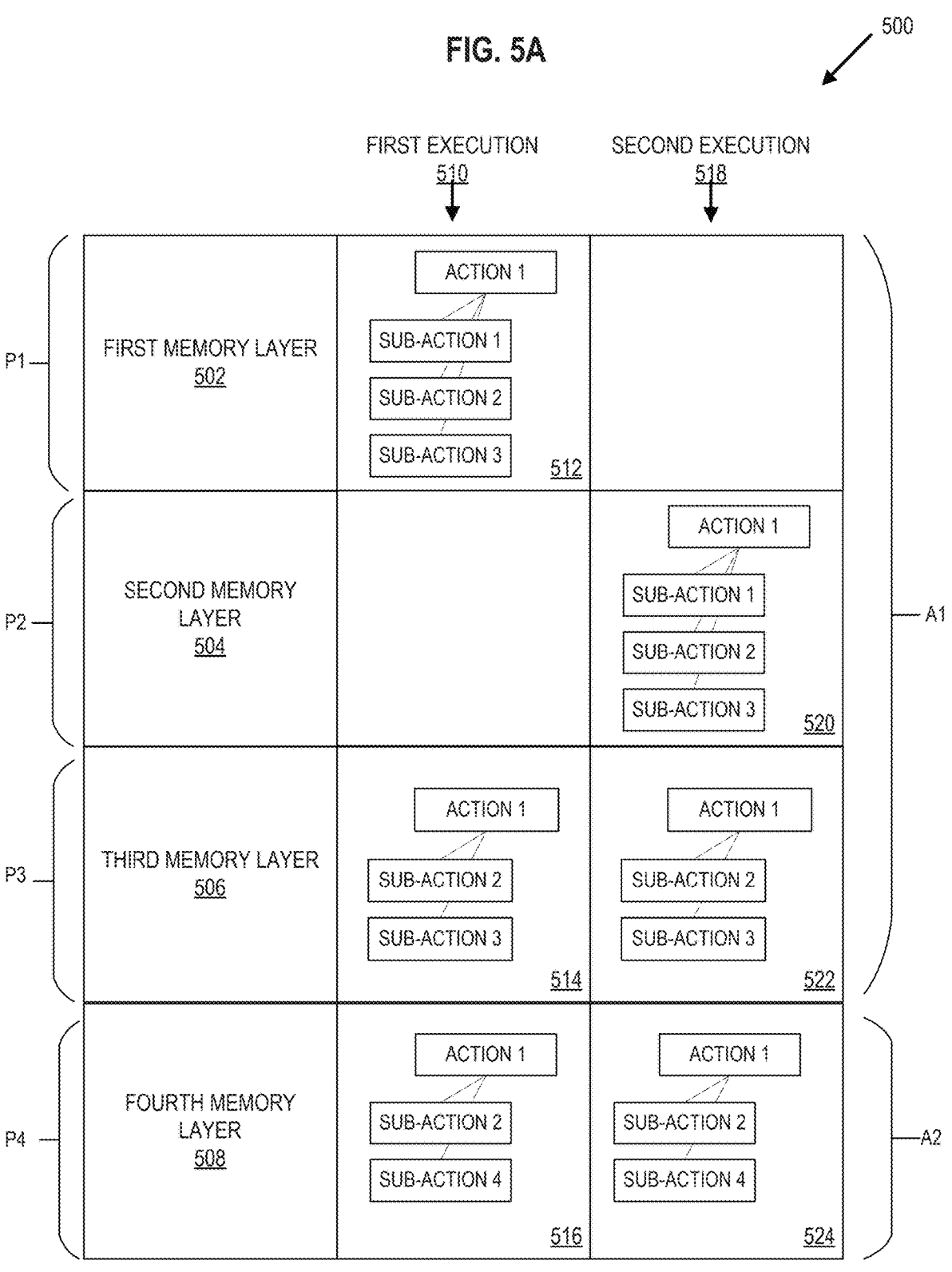
FIG. 5A, FIG. 5B, and FIG. 5C are schematic diagrams of examples of learned action store updates in accordance with some examples of the present disclosure.
Figure 5B:
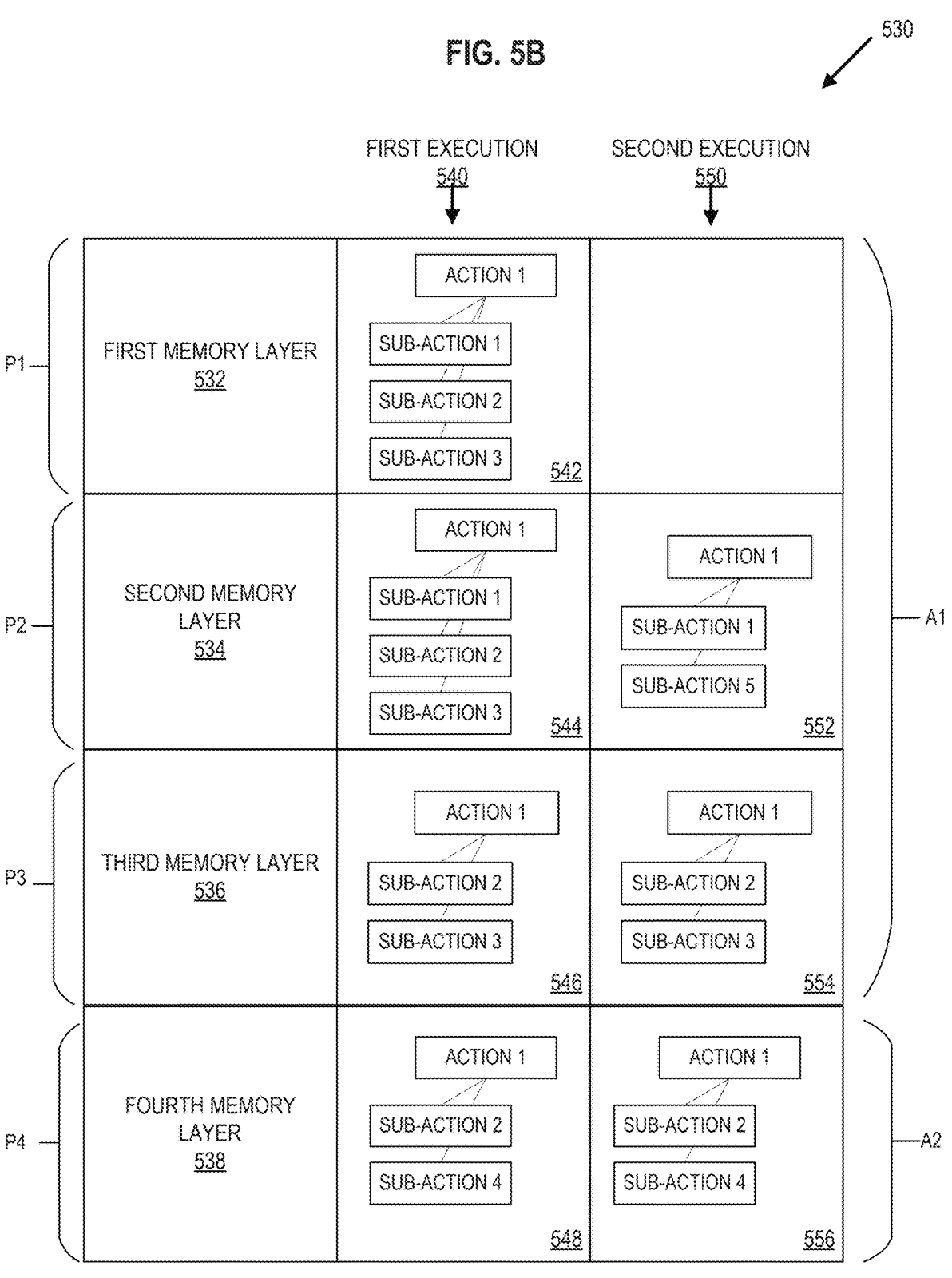
Figure 5C:
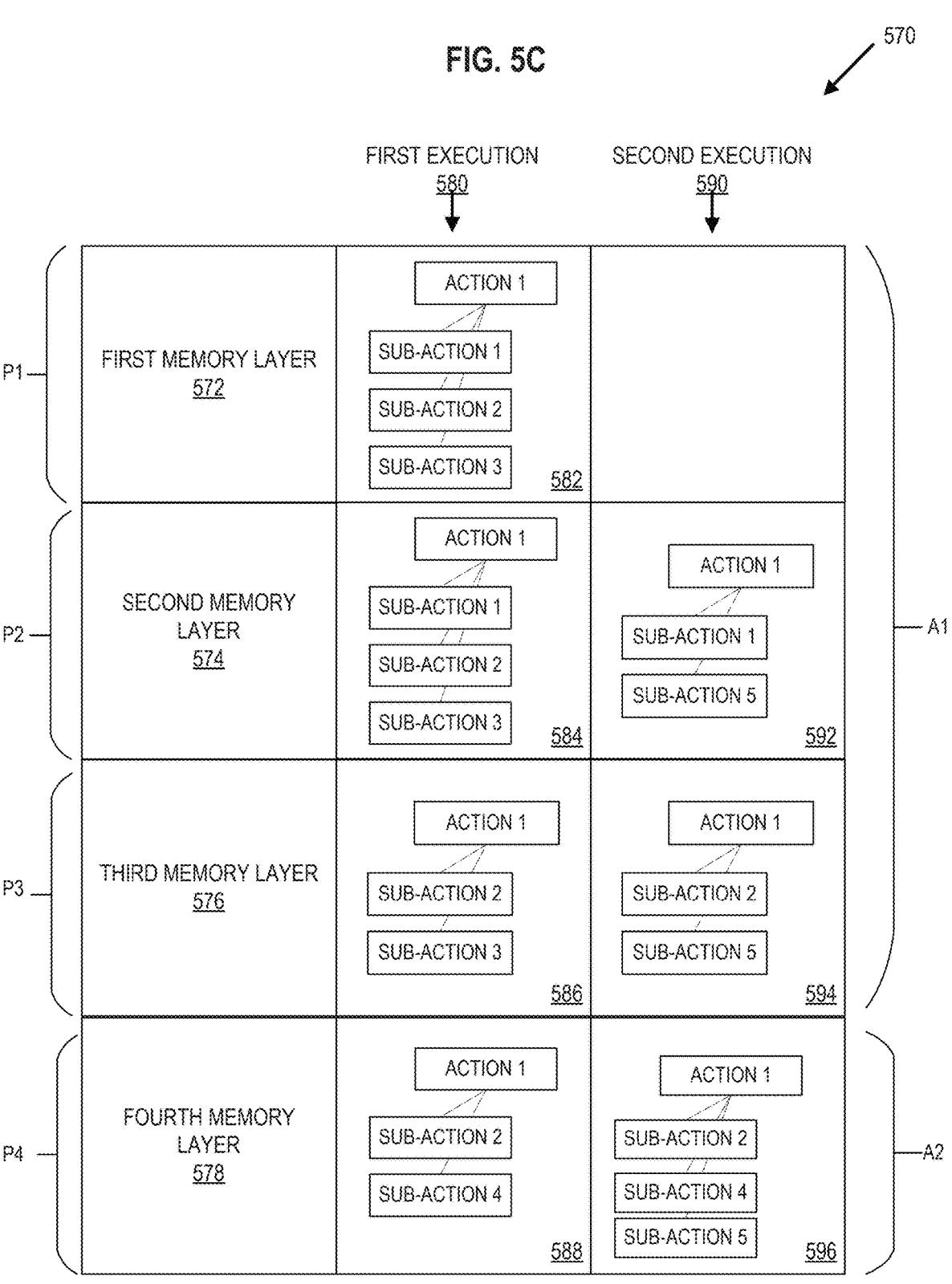

FIG. 5A, FIG. 5B, and FIG. 5C are schematic diagrams of examples of learned action store updates in accordance with some examples of the present disclosure. In each of FIG. 5A, FIG. 5B, and FIG. 5C, each of the memory layers is associated with a priority (e.g., P1, P2, P3, P4) and an access level (e.g., A1, A2). In some examples, the priority indicates the order in which the memory layers are to be queried (e.g., P1 is higher priority than P2, causing P1 to be searched before P2, and so on). In some examples, the access level restricts access to one or more of the memory layers only to certain agents (e.g., A1 indicates that only a certain user-specific agent is permitted to access the associated memory layer(s) while other agents are excluded from accessing those memory layers; A2 indicates that more than one agent is permitted to access the associated memory layer(s) such that more than one agent is permitted to access those layers.

In each of FIG. 5A, FIG. 5B, and FIG. 5C, four memory layers and two executions are shown for illustration purposes only. Any action store is capable of having any number of memory layers less than, greater than, or equal to four (and greater than or equal to one). Here, and throughout the disclosure, the labels "first" and "second" are for purposes of differentiation, only; e.g., a first execution need not be the very first execution in a sequence or series of executions and the second execution need not immediately follow the first execution but merely be subsequent to or different from the first execution.

In each of FIG. 5A, FIG. 5B, and FIG. 5C, each action is represented by an action graph that includes multiple sub-actions, for illustration purposes only. Any action is capable of including only a single action or any number of sub-actions, depending on the requested task.

FIG. 5A shows an example of an action store update that includes an update to a second memory layer 504 responsive to one or more signals (e.g., feedback, such as automated observations by a device, computing system, or model, such as performance metrics, and/or user feedback). In FIG. 5A, on a first execution 510 of a task, a fourth memory layer 508 is populated with an action 516 related to a requested task, a third memory layer is populated with an action 514 related to the requested task, and a second memory layer 504 is not populated with an action that is related to the requested task. In some examples, the action 516 is a global definition of a task-related action, and the action 514 is a corporate or group-based definition of the same task-related action (e.g., a company or team within the company has a different way of performing the task than the broader, global population). The action 514 includes sub-action 2 and sub-action 3 while the action 516 contains the same sub-action 2 but a different sub-action 4.

In some examples where the access level A1 is associated with both the first memory layer 502 and the third memory layer 506, the first execution 510 is initialized with a version of action 1 that is action 514; thus, action 514 is initially loaded into the first memory layer 502 (e.g., working memory). During the first execution 501, feedback is received, indicating to include sub-action 1 in the action 1. Thus, during the first execution 510, sub-action 1 is added to the action 512. The feedback is received in an automated manner from observations of outcome of the first execution 501. In various examples the feedback is referred to as a signal. In various examples, the signal (also referred to as feedback) is received from an at least semi-autonomous agent via a device. For example, the semi-autonomous agent is in the environment 101 and is a person operating a computer where "device" refers to a computer. In another example, the feedback is from a fully autonomous physical agent in the environment 101 such as a physical robot or self-driving vehicle. In another example, the feedback is from a fully autonomous digital agent in the environment. In another example, the feedback is from sensors in the environment and is sensed observations of the outcome of one or more actions performed by an agent. In some examples, fully autonomous means having the ability to operate independently without human intervention. A fully autonomous system is capable of making decisions and executing actions based on its programming or training and the data it collects, in some examples.

After the first execution 510, an action store management process stores the updated version of action 1, e.g., action 512, in the second memory layer 504 (e.g., experiential memory), as action 520. As a result, the updated version of action 1, action 520, is available to initialize the second execution 518. On the second execution 518, the first memory layer 502 is clear, such that the next memory layer in priority order (P2, second memory layer 504) is queried to obtain the updated version of action 1, action 520). No changes are made to the third memory layer 506 (e.g., action 522 is the same as action 514) or fourth memory layer 508 (e.g., action 524 is the same as action 516), in accordance with, e.g., policies/config data 106.

FIG. 5B is a schematic diagram of an example of learned action store updates in accordance with some examples of the present disclosure.

The example of FIG. 5B is similar to the example of FIG. 5A, in that different versions of an action 1 are stored in different memory layers having different search priorities and access levels. However, in FIG. 5B, the first memory layer 532 is initialized with action 542 as a result of a query of the second memory layer 534 retrieving action 544. For instance, as a result of a previous learning that the structure shown in the action 544 is successful for performing action 1, the first memory layer 532 is populated with that same structure for the action one on the first execution 540.

Also, on the second execution 550, the action graph for the action 1 is updated in the second memory layer 534 such that the version of action 1, action 552, in the second memory layer 534 on the second execution 550 is different from the version of action 1, action 544, in the second memory layer 534 on the first execution 540. In some examples, the trajectory optimization process determines that sub-action 2 and sub-action 3 are combinable into a more efficient or less computationally costly sub-action 5, and as a result, updates the second memory layer 534 to store this learning at or prior to the second execution 550.

Fourth memory layer 538 includes action 548 on first execution 540 and action 556 on second execution 550, where the action graph is the same for both action 548 and action 556. Third memory layer 536 includes action 546 on first execution 540 and action 554 on second execution 550, where the action graph is the same for both action 546 and action 554.

FIG. 5C is a schematic diagram of an example of learned action store updates in accordance with some examples of the present disclosure.

The example of FIG. 5C is similar to the examples of FIG. 5A and FIG. 5B, in that different versions of an action 1 are stored in different memory layers having different search priorities and access levels. However, in FIG. 5C, after trajectory optimization has updated the second memory layer at or prior to a second execution 590, it is determined (e.g., via policies/config data 106) that the learnings at the second memory layer 574 should be propagated to the third memory layer 576 and the fourth memory layer 578. As such, the third memory layer 576 contains a first version of action 1, action 586, on first execution 580, and a second version of action 1, action 594, on second execution 590, where the action 594 has replaced sub-action 3 with sub-action 5. In the fourth memory layer 578, a first version of action 1, action 588, is stored on first execution 580, and a second version of action 1, action 596, is stored on second execution 590, where the second version of action 1, action 596, has added sub-action 5 to the previous version of action 1, action 588.

On first execution 580, first memory layer 572 and second memory layer 574 contain similar versions of action 1, e.g., action 582 and action 584 have the same action graph. On second execution, the second memory layer 574 is updated, e.g., as the result of feedback, performance data, and/or trajectory optimization, such that action 592 includes only sub-actions 1 and 5 while the prior version of action 1, action 584, contained sub-actions 1, 2, and 3.

The examples shown in FIG. 5A, FIG. 5B, and FIG. 5C and the accompanying descriptions are provided for illustration purposes. This disclosure is not limited to the described examples.

Figure 6:
FIG. 6 is a component-based flow diagram of an example method for configuring and/or operating a multi-agent system in accordance with some examples of the present disclosure.

FIG. 6 is a component-based flow diagram of an example method 600 for configuring and/or operating a multi-agent system in accordance with some examples of the present disclosure.

The method 600 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some examples, the method 600 is performed by the computing system components shown in FIG. 1, FIG. 3, FIG. 4, one or more components of computing system 900 of FIG. 9, or agent system 1280 of FIG. 12. Although shown in a particular sequence or order, unless otherwise specified, the order of the processes is modifiable. In some examples, the processes are performed in a different order, and/or some processes are performed in parallel. Additionally, one or more processes are omitted in some examples. Thus, not all processes are required in every example. Other process flows are possible.

In FIG. 6, a multi-agent system interacts with one or more components of an environment 601 via an agent library front end 602. The agent library front end 602 interacts with one or more agents via an agent selection component 606 and one or more agent front ends 608, 610, 612, 614. In the example of FIG. 6, each agent front end has an associated profile 608a, 610a, 612a, 614a (e.g., a profile associated with a type of entity).

Each or any of the agent front ends 608, 610, 612, 614 is capable of being implemented in a similar manner as agent front end 102. Agent back end 616 is capable of being implemented in similar manner as agent back end 103. As such, each or any of the agent front ends 608, 610, 612, 614 is capable of interacting with task management component 618, action store 620, and/or action store management component 622 of agent back end 616 in a similar manner as described with reference to FIG. 1, FIG. 3, and/or FIG. 4.

In operation, agent library front end 602 is capable of receiving one or more inputs and/or context from one or more user devices 601A, networks 601B, and/or sensing devices 601C of environment 101. In response to such inputs and/or context, agent library front end 602 determines a project or task and provides the project/task 604 to agent selection component 606.

Agent selection component 606 selects from among the available agents (e.g., via agent front ends 608, 610, 612, 614, one or more agents capable of performing the project or task. The agent selection component 606 employs any suitable search technique, such as facet-based searching of the entity profiles pages, embedding-based retrieval (EBR), retrieval-augmented generation (RAG), or other suitable method, to identify prospective agents for performing the project/task 604 and provide the prospective agent(s) to agent library front end 602.

In response to a presentation of the prospective agents, the environment 101 generates a signal indicating a selection of one of the agents to perform the project/task 604. In some examples, a user device in the environment 101 receives user input selecting one of the agents. In other examples, a physical robot, or digital robot, or other automated entity in the environment 101 selects one of the agents using rules or other criteria, in a fully automated manner. In response to such a selection, the selected agent initiates the performance of the project/task 604 via the agent front end corresponding to the selected agent and the agent back end 616. In some examples, the agent building, task execution, and action store management processes described with reference to, e.g., FIG. 1, FIG. 3, and/or FIG. 4 is initiated in response to a selection of an agent via agent library front end 602. Once an agent is selected, the environment 601 interacts directly with the applicable agent front end associated with the selected agent. In some examples, an entity in the environment 601 such as a physical robot or a user device interacts directly with the applicable agent front end. Action store 620 is updated in response to feedback, performance data, and/or other signals received via any of the agent front ends 608, 610, 612, 614, the agent selection component 606, the agent library front end 602, and/or the environment 601, in some examples.

In FIG. 6, four agent front ends are shown for illustration purposes only. The multi-agent system is capable of including any number of agent front ends, and the number of agent front ends is not limited to four. Similarly, in FIG. 6 and other figures, the environment is capable of including any number of user devices, networks, sensing devices, and/or other electronic components.

The examples shown in FIG. 6 and the accompanying description are provided for illustration purposes. This disclosure is not limited to the described examples.

Figure 7A:
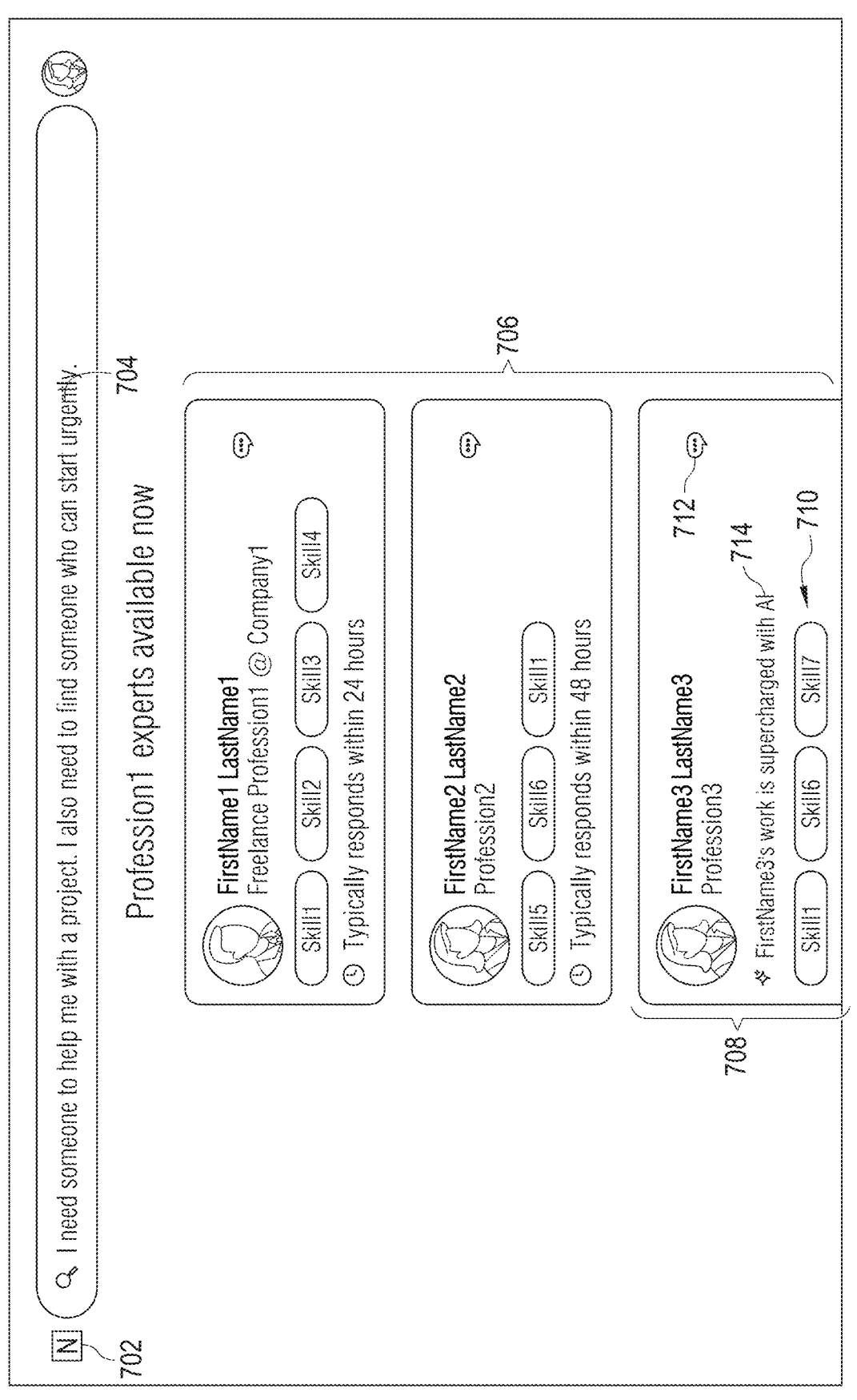
FIG. 7A, FIG. 7B, FIG. 7C, FIG. 7D illustrate examples of processes for agent configuration, including example depictions of graphical user interface elements, in accordance with some examples of the present disclosure.
Figure 7B:
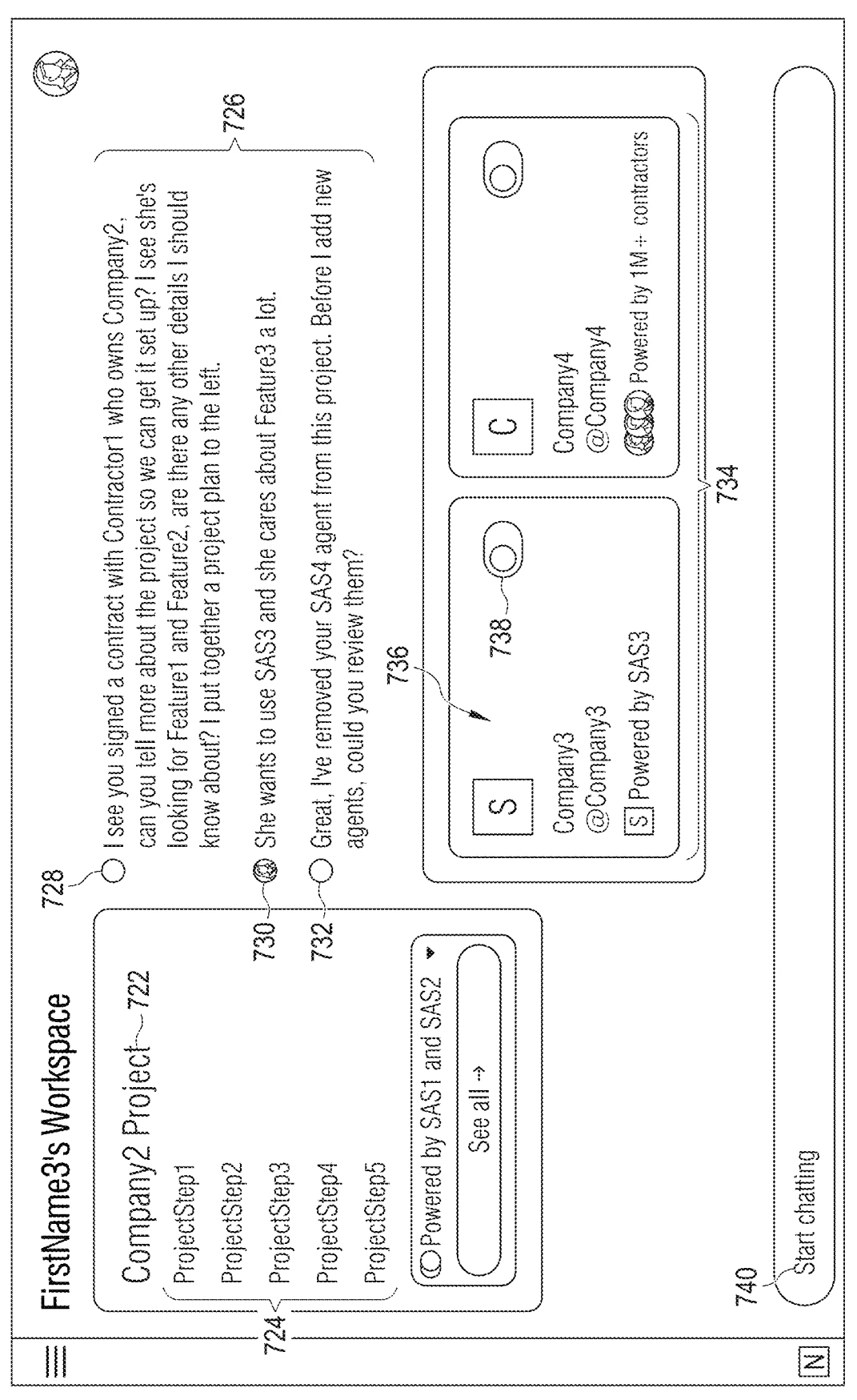
Figure 7C:
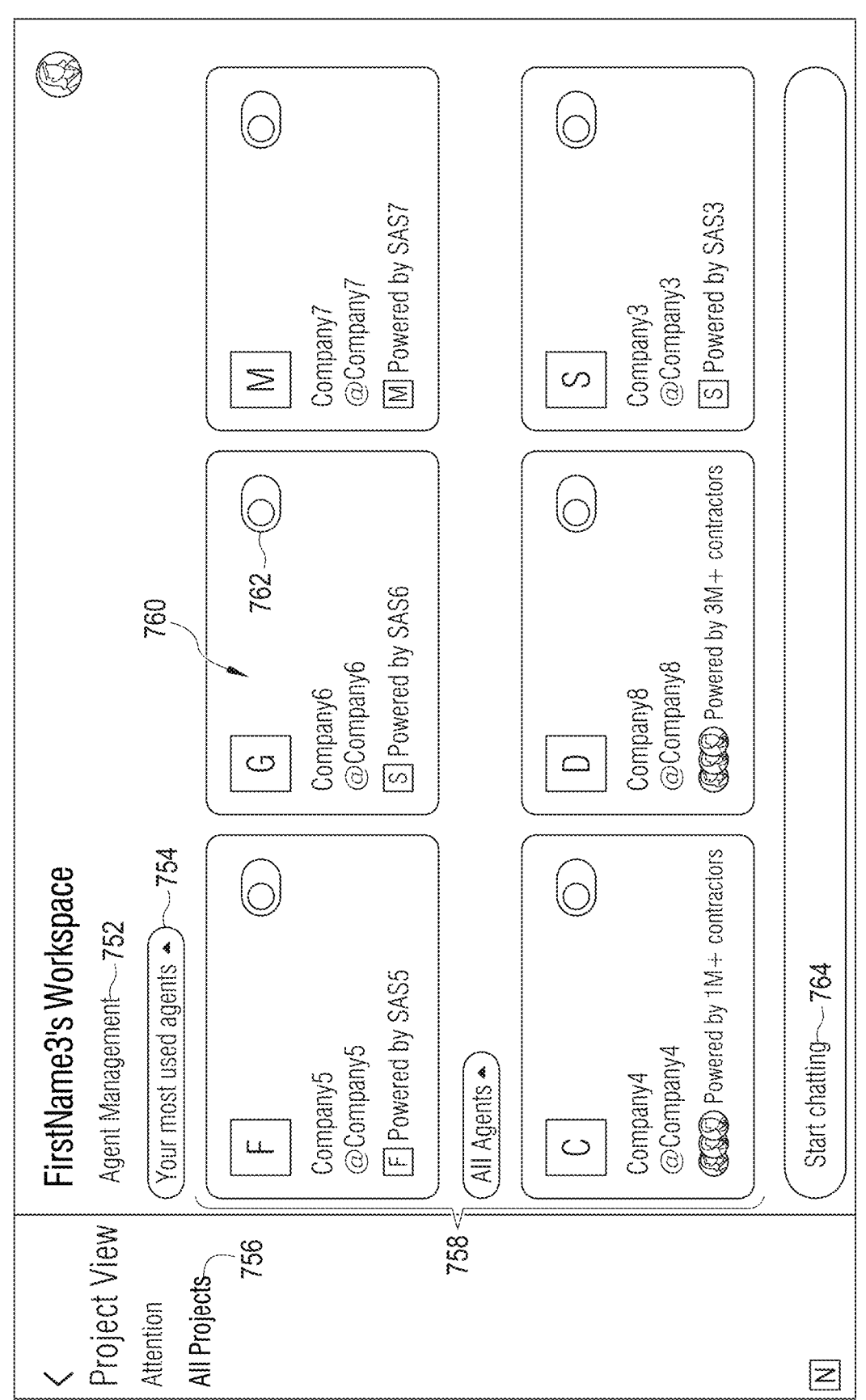
Figure 7D:
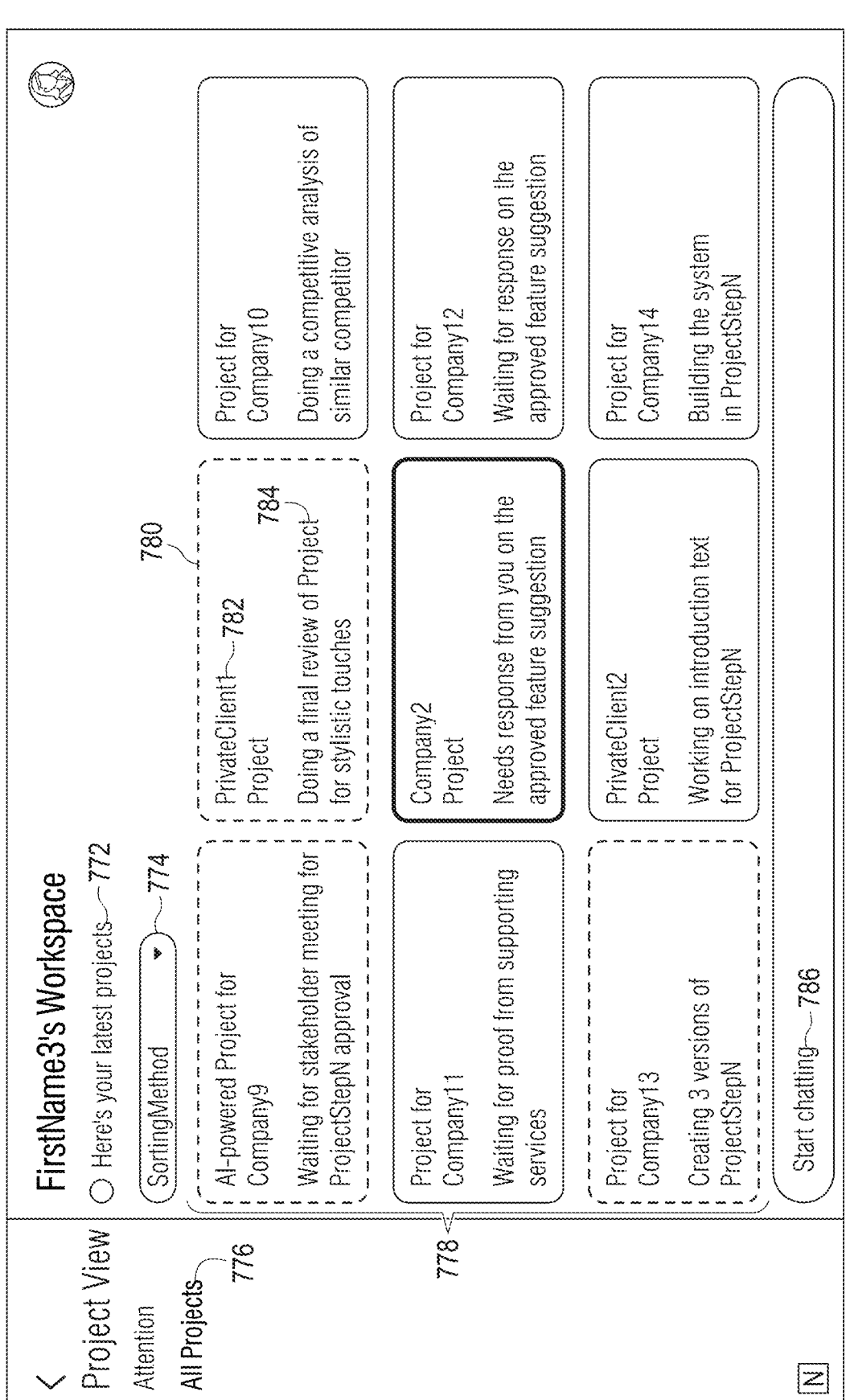

FIG. 7A, FIG. 7B, FIG. 7C, FIG. 7D illustrate examples of processes for agent configuration, including example depictions of graphical user interface elements, in accordance with some examples of the present disclosure. The user interfaces shown in FIG. 7A, FIG. 7B, FIG. 7C, FIG. 7D are presented by an agent system, in some examples. The user interface of FIG. 7A is presented via an agent library front end 602 and any one or more of the user interfaces of FIG. 7B, FIG. 7C, FIG. 7D is presented via an agent front end such as any of agent front ends 102, 608, 610, 612, 614, in some examples.

In the user interface examples shown in FIG. 7A, FIG. 7B, FIG. 7C, FIG. 7D, certain data that would normally be displayed via the user interface is anonymized for the purpose of this disclosure. In a live example, the actual data and not the anonymized version of the data would be displayed. For instance, the text "CompanyName" would be replaced with a name of an actual company and "FirstName LastName" would be replaced with a user's actual name.

The user interface elements shown in FIG. 7A, FIG. 7B, FIG. 7C, FIG. 7D are presented to a user by an application system, such as automated agent 902. In some examples, portions of the user interface elements are implemented as one or more web pages that are stored, e.g., at a user device, a server or in a cache of a user device, and then loaded into a display of a user device via the user device sending a page load request to the server or fetching data from the cache.

The graphical user interface control elements (e.g., fields, boxes, buttons, etc.) shown in the screen captures are implemented via software used to construct the user interface screens. While the screen captures illustrate examples of user interface components, e.g., visual displays, buttons, input boxes, etc., this disclosure is not limited to the illustrated examples, or to visual displays, or to graphical user interfaces.

In FIG. 7A, a user interface 700 illustrates an example of a display screen that is capable of being presented to a user via, e.g., agent library front end 602. The user interface 700 includes a search input box 702. A user has provided input 704 into the search input box 702, indicating a need for assistance with website creation. In response to the input 704, the user interface 700 presents an agent list 706 including service providers. In some examples, agent list 706 is generated by agent selection component 606 described with reference to FIG. 6. Each agent/service provider in the list includes one or more skills related to the search criteria of website creation. For instance, agent profile 708 indicates that the associated agent/service has agent skills 710 including web design, design strategy, and UX design, and further includes an agent description 714 indicating that the agent/service provider is supplemented with AI-based task execution capabilities. The agent profile 708 also includes a chat element 712 by which the user who entered the input 704 is capable of interacting directly with the agent/service provider.

In FIG. 7B, a user interface 720 illustrates an example of a display screen that is capable of being presented to a service provider selected from, e.g., the agent list 706 of FIG. 7A. The user interface 720 includes a project description 722, a task list 724, a dialog 726 including dialog element 728 generated by an AI-based agent using task execution techniques described herein, dialog element 730 input by the selected service provider, and dialog element 732 generated by the AI-based agent in response to the input at dialog element 730. The task list 724 and/or dialog 726 is executable as part of, e.g., a task determination/clarification process such as described with reference to FIG. 3.

In response to the dialog 726, the user interface 720 displays a list of available action-specific agents 734 that map to tasks in the task list 724. The list of available action-specific agents is capable of being generated via an action determination process such as described with reference to FIG. 3. Each action specific agent includes an agent description 736 and an agent selection element 738. In some examples, the agent selection element 738 is capable of being implemented as a toggle element by which the service provider selects or unselects a particular action-specific agent for use in connection with the project description 722 and task list 724.

The user interface 720 further provides a chat input box 740 by which the AI-backed service provider is capable of engaging in a dialog with one or more AI-based agents. In some examples, the service provider provides feedback via chat input box 740 and the feedback is used to generate action store updates, e.g., as described with reference to FIG. 4.

In FIG. 7C, a user interface 750 illustrates another example of a display screen that is capable of being presented to a service provider selected from, e.g., the agent list 706 of FIG. 7A. The user interface 750 includes an agent management function 752, an agent sort function 754, and selectable view criteria 756. In response to a selection by the service provider of the view criteria 756 and sort function 754, the user interface 750 displays an agent list 758 of action-specific agents. The agent list 758 includes a history of action-specific agents that the service provider has used. Each agent in the agent list 758 includes an agent description 760 and an agent selection element 762. Whereas the user interface 720 provides the service provider with the ability to toggle action-specific agents on and off for a particular project or task, the user interface 750 enables the service provider to enable or disable action-specific agents across multiple tasks or projects. The user interface 750 also provides a chat input box 764 by which the AI-backed service provider is capable of engaging in a dialog with one or more AI-based agents. In some examples, the service provider provides feedback via chat input box 740 that is used to generate action store updates, e.g., as described with reference to FIG. 4.

In FIG. 7D, a user interface 770 illustrates another example of a display screen that is capable of being presented to a service provider selected from, e.g., the agent list 706 of FIG. 7A. The user interface 770 includes a project management function 772, a project sort function 774, and view criteria 776. In response to the project management function 772 and the view criteria 776, the user interface 770 displays a project list 778 of projects that are active for the service provider via the agent system. The project list 778 includes a number of projects such as project 780. Each project, e.g., project 780, includes a project title, e.g., project title 782, and a project status, e.g., project status 784. The user interface 770 also provides a chat input box 786 by which the AI-backed service provider engages in a dialog with one or more AI-based agents, in some examples. The service provider provides feedback via chat input box 786, and the feedback is used to generate action store updates, e.g., as described with reference to FIG. 4, in some examples.

The examples shown in FIG. 7A, FIG. 7B, FIG. 7C, FIG. 7D and the accompanying description are provided for illustration purposes. The illustrative examples are applicable to a smaller form factor such as smart phones, tablet computers, or wearable devices, and/or the user interfaces are adaptable to other forms of electronic devices, such as desktop computers and/or laptop devices, or vice versa. This disclosure is not limited to the described examples.

Figure 8A:
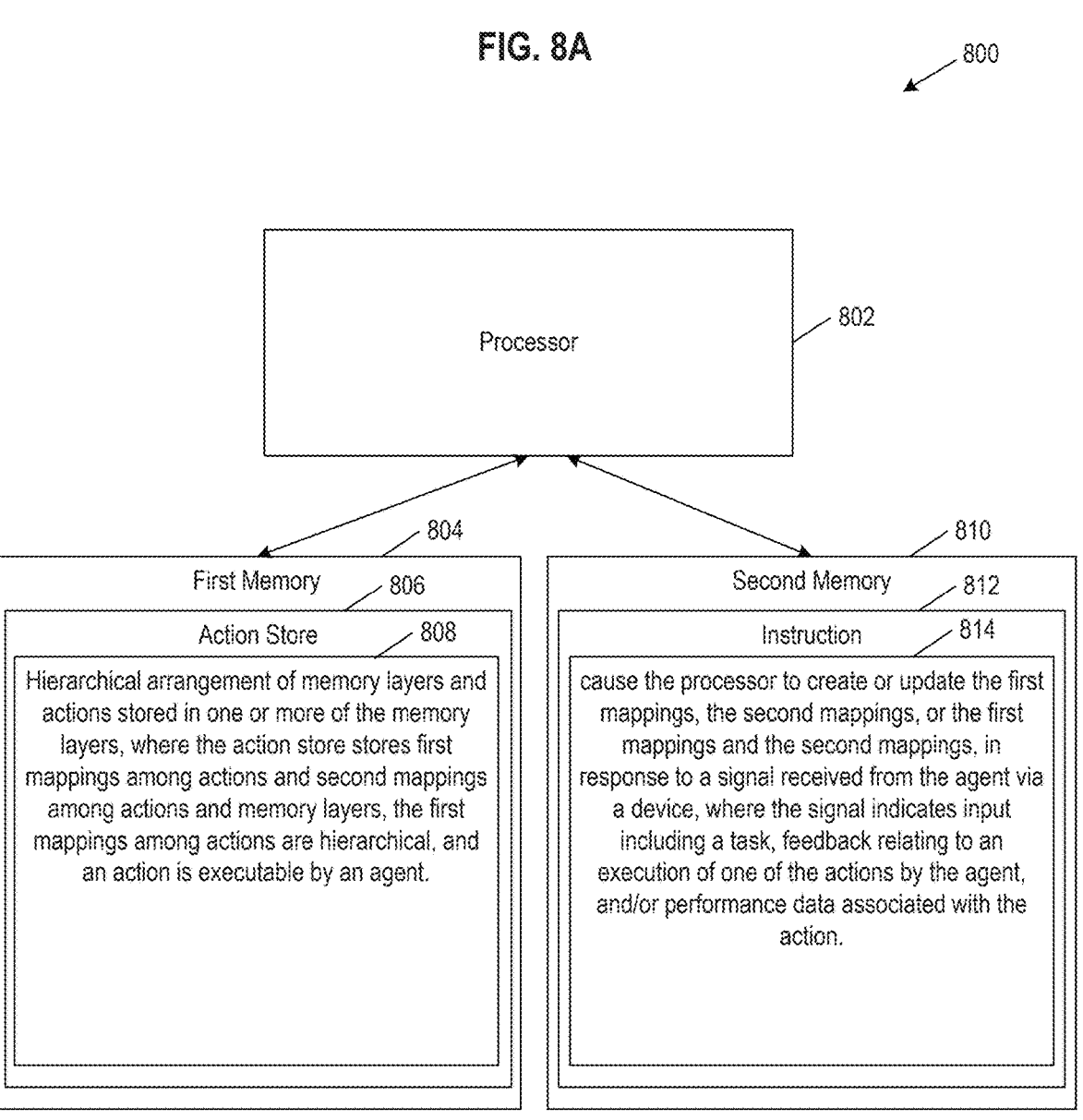
FIG. 8A is a schematic diagram of an apparatus for action store management in accordance with some examples of the present disclosure.

FIG. 8A is a schematic diagram of an apparatus for action store management in accordance with some examples of the present disclosure.

The apparatus 800 includes processing logic that includes hardware (e.g., processing device, circuitry, dedicated logic, programmable logic, microcode, hardware of a device, integrated circuit, etc.), software (e.g., instructions run or executed on a processing device), or a combination thereof. In some examples, the apparatus 800 includes computing system components shown in FIG. 1, FIG. 3, FIG. 4, one or more components of computing system 900 of FIG. 9, or agent system 1280 of FIG. 12.

The apparatus 800 includes a processor 802, first memory 804 operably coupled to the processor 802, and second memory 810 operably coupled to the processor 802. Illustrative examples of processor 802 are described with reference to FIG. 14. Illustrative examples of memory 804, 810 are described with reference to FIG. 11A, FIG. 11B, and FIG. 14.

The first memory 804 includes an action store 806. Illustrative examples of action store 806 are described with reference to FIG. 1, FIG. 3, FIG. 4, and FIG. 6. The action store 806 includes a hierarchical arrangement of memory layers and a plurality of actions stored in one or more of the memory layers. The action store stores first mappings among actions and second mappings among actions and memory layers. The first mappings among actions are hierarchical and an action is executable by an agent. Illustrative examples of hierarchical arrangements of memory layers, actions, and mappings are described with reference to FIG. 1, FIG. 2A, FIG. 2B, FIG. 2C, FIG. 5A, FIG. 5B, and FIG. 5C.

The second memory includes an instruction 812. Illustrative examples of instructions 812 are described with reference to FIG. 14. The instruction 812 is to cause the processor

802 to create or update the first mappings, the second mappings, or the first mappings and the second mappings, in response to a signal received from the agent via a device. The signal indicates input including a task, feedback relating to an execution of one of the actions by the agent, and/or performance data associated with the action. Illustrative examples of updates based on signals, tasks, and actions are described with reference to FIG. 3 and FIG. 4.

In some examples, the action includes metadata and the metadata includes an indication of a security level associated with action, or a performance metric associated with the action, or the indication of the security level and the performance metric; and the instruction is to control access to the action according to the indication of the security level and a rule, or the performance metric and the rule; or the security level, the performance metric, and the rule.

In some examples, the first memory 804 is indexed by computing an embedding of the action and mapping the embedding to the action stored in the action store. In some examples, the memory layers include a first layer storing a first action and a second layer storing a second action, where a first security policy is associated with the first layer, a second security policy, different from the first security policy, is associated with the second layer, and where the instruction is to cause the processor to control access to the first layer according to the first security policy and control access to the second layer according to the second security policy.

In some examples, the instruction 812 is to cause the processor 802 to move the first action from the first layer to the second layer, move the second action from the second layer to the first layer, combine a plurality of actions into the first action, and/or expand the first action into a plurality of actions.

The examples shown in FIG. 8A and the accompanying description, above are provided for illustration purposes. This disclosure is not limited to the described examples.

FIG. 8B is a flow diagram of an example method for agent-based task execution using an action store in accordance with some examples of the present disclosure.

The method 820 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some examples, the method 820 is performed by the computing system components shown in FIG. 1, FIG. 3, FIG. 4, one or more components of computing system 900 of FIG. 9, or agent system 1280 of FIG. 12. Although shown in a particular sequence or order, unless otherwise specified, the order of the processes is modifiable. In some examples, the processes are performed in a different order, and/or some processes are performed in parallel. Additionally, one or more processes are omitted in some examples. Thus, not all processes are required in every example. Other process flows are possible.

At operation 822, the processing device uses an input to determine a task, where the input is obtained via a device and an agent accessible via the device. Illustrative examples of inputs and task determinations are described with reference to FIG. 3.

At operation 824, the processing device uses the task to search an action store, where the action store includes a hierarchical arrangement of actions executable by the agent. Illustrative examples of searching an action store and hierarchical arrangements of actions are described with reference to FIG. 2B, FIG. 2C, and FIG. 3.

At operation 826, in response to determining that the action store includes an action that corresponds to the task, the processing device provides access to the action to the agent. Illustrative examples of providing access to actions to an agent are described with reference to FIG. 1, FIG. 3 and/or FIG. 4. At operation 828, the processing device triggers the agent to execute the action. Illustrative examples of triggering an agent to execute an action are described with reference to FIG. 1, FIG. 3 and/or FIG. 4.

In some examples, the processing device provides the input and a first instruction to a machine learning model, where the first instruction is to cause the machine learning model to determine the task; and receives the task from the machine learning model in response to the first instruction.

In some examples, the processing device provides the task and a second instruction to the machine learning model, where the second instruction is to cause the machine learning model to identify the action that corresponds to the task using embedding-based retrieval retrieval-augmented generation, or embedding-based retrieval and retrieval-augmented generation; and receives the identified action from the machine learning model in response to the second instruction. In some examples, the second instruction is to instruct the machine learning model to determine requirements for performing the task and to determine whether the action is capable of performing the requirements.

In some examples, the processing device, in response to determining that the action is not capable of performing the requirements, provides the task and a third instruction to the machine learning model, where the third instruction is to cause the machine learning model to iteratively decompose the task into sub-tasks until the action is capable of performing the sub-tasks.

In some examples, the processing device provides the task and a fourth instruction to the machine learning model, where the fourth instruction is to cause the machine learning model to identify a plurality of actions that correspond to the task, rank the plurality of actions according to a first criterion associated with the task, and select the action from the ranked plurality of actions according to a second criterion associated with the task; and receives the selected action from the machine learning model in response to the fourth instruction. In some examples, the processing device, in response to determining that a value of a performance metric associated with a first version of the action stored in a first layer of a multi-layer memory meets or exceeds a performance criterion, provides access to the agent to execute the first version of the action from the first layer of the multi-layer memory.

In some examples, the agent is a fully autonomous physical robot or self-driving vehicle. In some examples, the processing device determines a mutability characteristic of the action, where the mutability characteristic is an indication of ability of the agent to self-mutate by executing the action; and the processing device uses the mutability characteristic to control the access to the action by the agent.

The examples shown in FIG. 8B and the accompanying description, above are provided for illustration purposes. This disclosure is not limited to the described examples.

FIG. 8C is a flow diagram of an example method for action store management in accordance with some examples of the present disclosure.

The method 840 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some examples, the method 840 is performed by the computing system components shown in FIG. 1, FIG. 3, FIG. 4, one or more components of computing system 900 of FIG. 9, or agent system 1280 of FIG. 12. Although shown in a particular sequence or order, unless otherwise specified, the order of the processes is modifiable. In some examples, the processes are performed in a different order, and/or some processes are performed in parallel. Additionally, one or more processes are omitted in some examples. Thus, not all processes are required in every example. Other process flows are possible.

At operation 842, the processing device receives a signal via an agent, where the signal relates to a first execution of a task by the agent using an action store, where the action store includes a hierarchical arrangement of memory layers, and where the action store includes a plurality of actions stored in one or more of the memory layers, and where the action store stores first mappings between actions and second mappings between actions and memory layers, where the first mappings among actions are hierarchical and an action is executable by the agent. At operation 844, the processing device uses the signal to modify the action store. Illustrative examples of using signals to modify an action store are described with reference to FIG. 1 and FIG. 4.

At operation 846, the processing device provides the modified portion of the action store to a second execution of the task by the agent. Illustrative examples of first and second executions are described with reference to FIG. 5A, FIG. 5B, and FIG. 5C.

In some examples, the processing device uses the signal to create or update the first mappings, the second mappings, or the first mappings and the second mappings.

In some examples, the processing device, in response to the signal, moves the action from a first layer of the memory layers to a second layer of the memory layers and/or moves the action from the second layer to the first layer.

In some examples, the processing device uses the signal and a trajectory optimization mechanism to combine a plurality of actions into the action or expand the action into a plurality of actions. In some examples, the task includes detecting and blocking malicious access to a cloud service and the agent is fully autonomous security software executing on a user computing device. In some examples, the agent is a fully autonomous physical robot or self-driving vehicle.

The examples shown in FIG. 8C and the accompanying description, above are provided for illustration purposes. This disclosure is not limited to the described examples.

Figure 9:
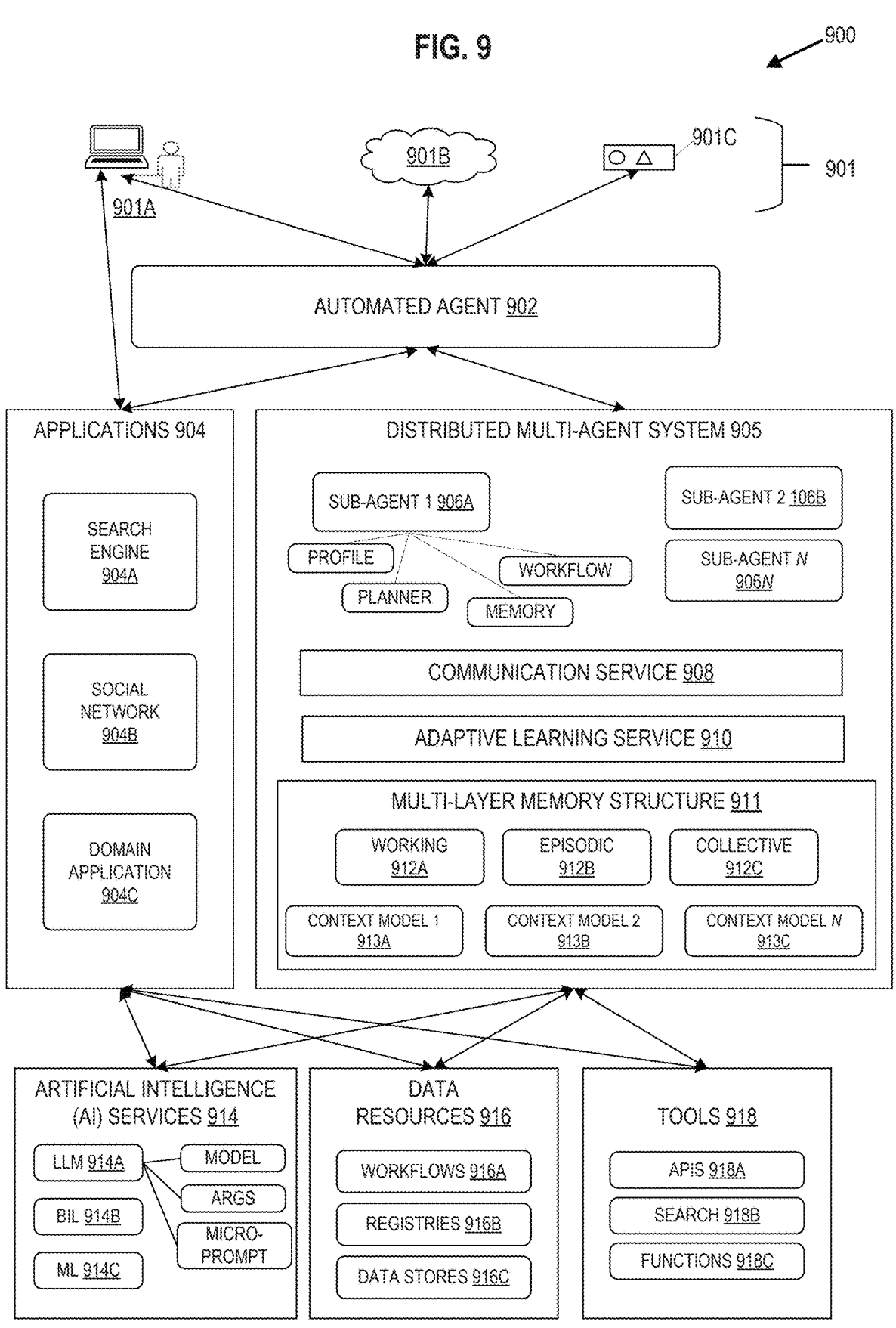
FIG. 9 is a component-based flow diagram of an example method for configuring and/or operating an agent using components of an agent system in accordance with some examples of the present disclosure.

FIG. 9 is a flow diagram of an example component-based method for configuring and/or operating an agent using components of an agent system in accordance with some examples of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some examples, the method is performed by components of distributed multi-agent system 905, such as components or flows shown in FIG. 9 that are not specifically shown in other figures and/or components or flows shown in other figures that are not specifically shown in FIG. 9. Although shown in a particular sequence, arrangement, or order, unless otherwise specified, the order and/or arrangement of the components and/or processes is modifiable. In some examples, the illustrated examples should be understood only as examples, and the illustrated processes are capable of being performed in a different order, and some processes are capable of being performed in parallel. Additionally, one or more processes are omitted in various examples. Thus, not all processes are required in every example. Other process flows are possible.

In FIG. 9, an example computing system 900 is shown, which includes an automated agent 902. The automated agent 902 is in communication with various elements of an environment 901, including a user device 901A, a network 901B, and/or one or more sensing devices 901C. Examples of user devices 901A include computing devices, such as laptop computers, smart phones, mobile computing devices, smart appliances, wearable devices, game controls, vehicle controls, etc. Examples of networks 901B include wireless, optical, and wired communication networks. Examples of sensors include motion sensors, load cells, force sensors, temperature sensors, and network sensors.

In some examples, the user device 901A is in communication with one or more applications 904 directly and/or via the automated agent 902. The automated agent 902 is supported by and in communication with one or more of the applications 904 and/or a distributed multi-agent system 905. In some examples, responsive to receiving input via one or more components of the environment 901, the automated agent 902 is dynamically configured or reconfigured to perform a task or a series of tasks, via one or more components of the distributed multi-agent system 905.

In the example of FIG. 9, the components of the computing system 900 are implemented using an application server or server cluster. In some examples, the computing system 900 includes a secure environment (e.g., secure enclave, encryption system, etc.) for the processing of data. In other examples, one or more components of the computing system 900 are implemented on a client device, such as a user system 1210, described herein with reference to FIG. 12. In some examples, some or all of computing system 900 is implemented directly on a user's device or within an embedded system, thereby avoiding the need to communicate with servers over a network such as the Internet.

In some examples, the distributed multi-agent system 905 is in bidirectional communication with one or more applications 904, e.g., directly or via a computer network. In some examples, the one or more applications 904 include user interface functionality that is considered part of or is in communication with automated agent 902 and/or distributed multi-agent system 905. Illustrative, nonlimiting examples of applications that are included in the applications 904 in some examples include search engines 904A, social networks 904B, and/or domain applications 904C. Some examples include other applications alternatively or in addition to search engines 904A, social networks 904B, and domain applications 904C. In some examples, search engines 904A include general-purpose search engines such as Internet search engines and/or domain-specific search engines, e.g., search engines designed specifically for job searching or entity profile searching. In some examples, social networks 904B include general purpose social networks and/or domain-specific social networks such as professional or job-related social networks. Examples of domain applications 904C include user-facing applications such as job posting services, content distribution services, recruiting tools, ecommerce systems, email and messaging systems, enterprise applications, etc. Other examples of domain applications include embedded systems such as device control systems, e.g., navigation systems and robotic systems, as well as other types of sensor-based systems such as augmented reality and mixed reality systems.

In the example of FIG. 9, the distributed multi-agent system 905 includes a plurality of sub-agents 906A, 906B, . . . , 906N, a communication service 908, an adaptive machine learning service 910, and a multi-layer memory structure 911. Any reference to N herein refers to an Nth element of a device, component, system, or process, where N is a positive integer and the value of N is variable depending on the context. For example, in FIG. 9, the computing system 900 includes N applications 904, N sub-agents 906, N memory layers, N context models, N artificial intelligence services 914, N data resources 916, and N tools 918, where N is capable of having the same value or different values for each or any reference to N.

The sub-agents 9906A, 9906B, . . . , 906N cooperate and coordinate with each other to perform tasks on behalf of the user. In some examples, each sub-agent 906A, 906B, . . . , 906N has an assigned role or function, such as a profile sub-agent, a planner sub-agent, a workflow sub-agent, a memory sub-agent, or any other sub-agent that is capable of communicating with the automated agent 902 in executing tasks and fulfilling user requests or goals.

Any sub-agent 906A, 906B, . . . , 106N includes or is defined by a combination of computer code, data, memory, AI services 914, data resources 916, and/or tools 918, which are arranged or configured to perform a specific task or action. In some examples, a sub-agent 906A, 906B, . . . , 106N has or includes an associated agent profile, planner, workflow, and memory. The sub-agent's memory is allocated to the sub-agent via the multi-layer memory structure 911. The sub-agent's profile is capable of being pre-defined or configured dynamically using data obtained from one or more data resources 916. In some examples, the sub-agent's profile references one or more registries 916B, which identify one or more of the workflows 916A, memories 912, AI services 914 and/or tools 918 that are accessible to the sub-agent and are usable by the sub-agent to perform the task identified in the sub-agent's profile.

Portions of each or any of the sub-agents 906A, 906B, . . . , 106N communicate with each other and/or adaptive machine learning service 910, multi-layer memory structure 911, artificial intelligence services 914, data resources 916, tools 918, and with the automated agent 902, via a communication service 908. Communication service 908 facilitates data exchange and message passing among the components of the distributed multi-agent system 905 and/or components of the computing system 900. Examples of communication service 908 include asynchronous messaging capabilities, which, in some examples, include a publish and subscribe messaging protocol. In some examples, communication service 908 is implemented using, e.g., an agent framework or GAI application having containerized endpoints such as REST (representational state transfer) or gRPC (remote procedure call) that is capable of messaging. In some examples, use of asynchronous messaging is helpful for error handling by, for example, preventing infinite loops and enabling agent processes to be stopped at any time.

In some examples, the automated agent 902 or any sub-agent 906A, 906B, . . . , 106N accesses and interfaces with an adaptive machine learning service 910. In some examples, a sub-agent invokes adaptive machine learning service 910 to determine whether a task, request, goal, or objective has been fulfilled and/or to determine whether to dynamically modify a task, workflow or plan. In some examples, adaptive machine learning service 910 includes or interfaces with one or more machine learning models including a Bayesian inference learning mechanism. In some examples, a Bayesian model is constructed that predicts a user's likely responses to output produced by the automated agent 902, using historical examples of the user's online activity to generate a prior probability distribution. In some examples, the automated agent 902 uses predictions of user behavior obtained via the Bayesian model to determine how to perform a task, which output to present to the user, and/or how to present output to the user. After the automated agent 902 performs a task and/or presents output to the user, based on the predictions obtained from the Bayesian model, the automated agent 902 monitors the user's actual response to the task performed and output produced by the automated agent 902. The user's actual response is used to update the Bayesian model, e.g., to generate a posterior probability distribution of the user's likely response. On the iteration or use of the sub-agent, the posterior probability distribution becomes the prior distribution from which updated predictions of user behavior are obtained.

In some examples, the automated agent 902 or any sub-agent 906A, 906B, . . . , 106N is implemented as a stateful, LM- and/or LLM-based multi-actor application with built-in persistent memory. Some examples use LMs and/or LLMs in different contexts. Some examples use LMs to enable agents to perform discrete tasks. References to LLM herein are representative of some examples; in other examples, LMs are used alternatively or in addition to the LLMs.

Examples of tools that are usable to construct the automated agent 902 or any sub-agent 906A, 906B, . . . , 106N include directive acyclic graph (DAG)-based frameworks and cycle-based frameworks such as LANGGRAPH. In some examples, portions of multi-layer memory structures described herein are implemented using the persistent memory features of LANGGRAPH or other frameworks that enable the integrating of persistent memory with application processes and workflows.

Examples of the automated agent 902 or any sub-agent 906A, 906B, . . . , 106N include semi-autonomous cognitive artificial intelligence that learns through interactions with human users. Some examples are data-driven and include hierarchical planners, automatic prompt engineering, code generation, and API discovery. Some examples use a layered memory system implemented using persistent memory structures that is integrated into agents and workflows. In some examples, document databases, document-oriented databases, column-oriented data stores, or document stores, such as NOSQL document stores, are used to implement portions of the multi-layered memory structures. In some examples, portions of the multi-layer memory structure are accessed, referenced, read from or written to using an abstract interface using, e.g., JSON path expressions. Examples operate asynchronously and are distributed, as described in more detail herein.

In some examples, task or action refers to an atomic action or operation that an agent or sub-agent is configured to perform, either alone or in combination with other tasks. Workflow refers to an arrangement, sequence, or series of tasks that can be used by an agent to respond to a request or complete a goal or objective, from which an agent selects one or more specific tasks to complete a request, goal, or objective. In some examples, given the same or similar request, goal, or objective, a workflow includes multiple different tasks that are selectable to complete the request, goal, or objective, depending upon the applicable context data. In some examples, a workflow provides an agent with multiple different options for how to complete a request, goal, or objective and the agent uses the currently provided context data to select from among those options in a given instance.

Workflows are capable of being generalized or task-specific. Examples of generalized workflows include workflows that build or update a context model, workflows that build or update an agent profile, and workflows that read and write data to and from portions of multi-layer memory structures (e.g., to store user feedback in procedural memory). Another example of a generalized workflow is a workflow that obtains the inputs required to invoke an agent, e.g., to obtain relevant context, interaction history, learned preferences, etc., to parameterize an action (e.g., a specific task of a workflow performed by an agent). The parameterization of actions enables the actions to be configured and customized dynamically using the most current relevant information. In some examples, when an action is invoked, a workflow is executed that obtains the relevant context, historical data, and learned preferences from memory and parameterizes the action with that information. Other examples of generalized workflows include workflows for performing adaptive machine learning processes to build context models (e.g., models of users and environments), updating semantic memory, and translating interaction experiences into procedural memory.

In some examples, plan refers to a specific arrangement, sequence, or series of tasks that have been selected by an agent from among one or more available workflow options to complete a task, goal, or objective. Given the same or similar request, goal, or objective, an agent selects one set of tasks to complete the request, goal, or objective in a first context and a different set of tasks to complete the same or similar request, goal, or objective in a second, different context, in some examples. A plan is capable of including a specific ordering of tasks, i.e., instructions as to which task the agent is to perform first, second, third, etc.

In some examples, the automated agent 902 or any sub-agent 906A, 906B, . . . , 106N accesses and interfaces with one or more layers of multi-layer memory structure 911. In the example of FIG. 9, multi-layer memory structure 911 includes a plurality of layers, such as a working memory 912A, an episodic memory 912B, and a collective memory 912C. In other examples, other types of memory layers are used and/or the number of memory layers is configurable depending upon the requirements of a particular design or implementation.

In some examples, each of automated agent 902 and every sub-agent 906A, 906B, . . . , 906N has its own multi-layer memory structure 911 (e.g., keyed off the agent's unique agent identifier).

In some examples, the different layers of multi-layer memory structure 911 store and manage different types of context models 913A, 913B, . . . , 913N according to their respective scope, duration, relevance, and/or other criteria. In some examples, the working memory 912A stores context models 913A, 913B, . . . , 913N that are related to the current dialog or task, the episodic memory 912B stores context models 913A, 913B, . . . , 913N that are related to previous dialogs or tasks, and the collective memory 912C stores context models 913A, 913B, . . . , 913N that are related to general or domain knowledge.

A context model refers to a representation of the state or situation of the automated agent 902, the user, the application 904, or the dialog between the user and the automated agent 902, or a combination of any of the foregoing, at a particular instance, timestamp, or time interval associated with operation of the computing system 900 or automated agent 902, which is created with and/or includes context data. In some examples, a context model includes various types of information, such as preferences, policies, profile data, historical user activity data, sensor data, network data, model parameters, and/or any other data that is usable to configure an agent, workflow, plan, or task. Some examples create, initialize and/or update a context model for a user associated with an automated agent 902 by extracting information from the user's online profile (e.g., a profile page and/or the user's online activity history on a social network). In some examples of physical devices that are controlled by the automated agent 902, a context model includes sensor data collected via sensors associated with the physical devices and control signals generated by components of the devices.

Examples of context data include data logged during a user's use of an automated agent 902 and/or one or more applications 904, such as data input, output, or interacted with, the timestamp at the user's login in to the application, and actions taken by the user during the login session, including implicit and/or explicit user interactions with the application's user interface elements. Alternatively or in addition, context data refers to historical data logged during the user's prior uses of one or more applications and/or aggregate data that represents usage statistics across a group or population of users of the application. In some examples, context data includes implicit signals such as a count of the number of times content has been presented to the user, the number of times users interacted with content provided by the system, or the latency in the user's response to content. In some examples, context data includes explicit signals such as explicit reactions (e.g., thumbs-up, thumbs-down, comments, shares, follows) and/or other explicit or implicit feedback signals. In some examples, context data is used to dynamically configure agents, workflows, tasks, and plans.

The number of context models is not limited and is configurable depending upon the requirements of a particular design or implementation. Any portions of any one or more of context models 913A, 913B, 913C are capable of being stored in any one or more of the memory layers 912A, 912B, 912C. In some examples, a first context model including data from device 901A is stored in working memory 912A while a second context model including data from network 901B and/or one or more sensors 901C is in episodic memory 912B and a third context model including data from one or more automated agents 902 or sub-agents 906A, 906B, . . . , 906N is stored in collective memory 912C.

In some examples, a first context model including a first combination of data obtained from device 901A, network 901B, and/or sensors 901C over a first time interval is stored in working memory 912A while a second context model including a second combination of data obtained from device 901A, network 901B, and/or sensors 901C over a second time interval is stored in episodic memory 912B and a third context model including a third combination of data obtained from device 901A, network 901B, and/or sensors 901C over a third time interval is stored in collective memory 912C, where the first, second, and third context models, combinations of data, and/or time intervals are respectively different.

Also or alternatively, different portions of the multi-layer memory structure 111 are capable of being used to store context data for different automated agents 902 and/or sub-agents 906A, 906B, . . . , 906N. In some examples, different portions of the working memory 912A and/or episodic memory 912B are used to store context data for different automated agents 902 and/or different portions of the collective memory 912C are used to store context data and/or output generated by one or more sub-agents 906A, 906B, . . . , 906N. In some examples, if an action performed by a first sub-agent 906A, 906B, . . . , 906N is dependent upon output of an action of a second sub-agent 906A, 906B, . . . , 906N, collective memory 912C is used to store the output of the second-sub-agent in a memory layer that is accessible by the first sub-agent.

Any one or more of automated agent 902, applications 904 and/or portions of distributed multi-agent system 905 is capable of interfacing or communicating with any one or more of artificial intelligence (AI) services 914, data resources 916, and/or tools 918 either directly or via a communication service 908 that provides artificial intelligence (AI) services 914 and data resources 916 to the automated agent 902. Any of the AI services 914, data resources 916, and/or tools 918 is capable of being a component of the distributed multi-agent system 905 or a separate component, such as a hosted service.

The AI services 914 include various types of machine learning models and/or algorithms that are capable of enhancing the capabilities and performance of the automated agent 902, such as but not limited to one or more large language models (LLMs) 914A, Bayesian inference learning (BIL) models 914B, and machine learning (ML) models 914C, or any other AI service that are capable of providing, for instance, natural language understanding, natural language generation, dialog management, task execution, intent classification, entity extraction, information extraction, code generation, embedding generation models, similarity prediction, scoring, and/or any other function related to the operation of the automated agent 902 or any sub-agent.

A large language model 914A has an associated model type, architecture, and configuration, associated arguments, and associated micro-prompts, where the arguments are placeholders for information, such as context data, to be inserted into the micro-prompts. Micro-prompts are LLM prompts that are tailored for domain- or task-specific (e.g., fine-tuned) language models. In some examples, a micro-prompt includes a particular combination or arrangement of instructions, constraints, examples, and/or parameters or arguments that is configured specifically to cause a particular domain- or task-specific language model to produce a particular type of output while avoiding or reducing the risk of AI hallucination. In some examples, a micro-prompt is configured to cause a language model to perform a specific atomic action such as to generate a query to access one or more layers of a layered memory structure, or to map data retrieved from a layered memory structure to arguments of another prompt.

In some examples, a language model or large language model type, architecture, and configuration includes one or more neural network-based machine learning models. In some examples, a large language model 914A is constructed using a neural network-based deep learning model architecture. In some examples, the neural network-based architecture includes one or more input layers that receive model inputs, generate one or more embeddings based on the model inputs, and pass the one or more embeddings to one or more other layers of the neural network. In other examples, the one or more embeddings are generated based on the model input by a pre-processor, the embeddings are input to the neural network model, and the neural network model generates output based on the embeddings.

In some examples, the neural network-based machine learning model architecture includes one or more self-attention layers that allow the model to assign different weights to portions of the model input. Alternatively or in addition, the neural network architecture includes feed-forward layers and residual connections that allow the model to machine-learn complex data patterns including relationships between different portions of the model input in multiple different contexts. In some examples, the neural network-based machine learning model architecture is constructed using a transformer-based architecture that includes self-attention layers, feed-forward layers, and residual connections between the layers. The exact number and arrangement of layers of each type as well as the hyperparameter values used to configure the model are determined based on the requirements of a particular design or implementation of the distributed multi-agent system 905.

In some examples, the neural network-based machine learning model architecture includes or is based on one or more generative transformer models, one or more generative pre-trained transformer (GPT) models, one or more bidirectional encoder representations from transformers (BERT) models, one or more language models (LMs), one or more large language models (LLMs), one or more XLNet models, and/or one or more other natural language processing (NL) models. In some examples, the neural network-based machine learning model architecture includes or is based on one or more predictive text neural models that receive text input and generate one or more outputs based on processing the text with one or more neural network models. Examples of predictive neural models include, but are not limited to, Generative Pre-Trained Transformers (GPT), BERT, and/or Recurrent Neural Networks (RNNs). In some examples, one or more types of neural network-based machine learning model architectures include or are based on one or more multimodal neural networks capable of outputting different modalities (e.g., text, image, sound, etc.) separately and/or in combination based on textual input. Accordingly, in some examples, a multimodal neural network implemented in the agent system is capable of outputting digital content that includes a combination of two or more of text, images, video or audio.

In some examples, a large language model 914A is trained on a large dataset of digital content such as natural language text, images, videos, audio files, or multi-modal data sets. For example, training samples of digital content such as natural language text extracted from publicly available data sources are used to train one or more generative models used by the agent system. The size and composition of the datasets used to train one or more models used by the agent system are variable according to the requirements of a particular design or implementation of the agent system. In some examples, one or more of the datasets used to train one or more models used by the agent system includes hundreds of thousands to millions or more different training samples.

In some examples, one or more models used by the agent system include multiple generative models trained on differently sized datasets. In some examples, an agent system includes a comprehensive but low capacity generative model that is trained on a large data set. In some examples, the same generative model includes a less comprehensive but high capacity model that is trained on a smaller data set, and the high capacity model is used to generate outputs based on examples obtained from the low capacity model. In some examples, reinforcement learning is used to further improve the output of one or more models used by the agent system. In reinforcement learning, ground-truth examples of desired model output are paired with respective inputs, and these input-example output pairs are used to train or fine tune one or more models.

In some examples, prompt refers to one or more instructions that are readable by a GAI model, such as a large language model 914A, along with the input to which the GAI model is to apply the instructions, and a set of parameter values that constrain the operations of the GAI model during the processing of the prompt and generating and outputting a response to the prompt. In some examples, the prompt input includes user input and/or context data. In some examples, the prompt input is specified explicitly in the prompt or as a reference that is processed at execution time. In some examples, the prompt instructions include one or more statements, questions, conditions, constraints, or prompt examples. Some instructions include prompt examples, which are illustrative examples of the types of output to be produced by the GAI model and/or examples of the types of processing steps the large language model is to perform in order to generate output.

In some examples, the parameter values contained in the prompt are specified by the GAI model and are adjustable in accordance with the requirements of a particular design or implementation. Examples of parameter values include the maximum length or size of the prompt and the temperature, or degree to which the model produces deterministic output versus random output. The way in which the elements of the prompt are organized and the phrasing used to articulate the prompt elements is capable of significantly affecting the output produced by the GAI model in response to the prompt. In some examples, a small change in the prompt content or structure is capable of causing the GAI model to generate a very different output.

Zero-shot prompt refers to a type of large language model prompt that does not include any prompt examples, e.g., the prompt only includes an input and a task description that does not include any examples to guide the large language model as to how to perform the task. An example of a zero-shot prompt is "classify the user input [input1] into action_a, action_b, or action_c," where [input1] is a placeholder for the user input and/or associated context data and action_a, action_b, and action_c are possible intents into which the large language model is capable of classifying input1. A few-shot prompt includes examples along with an instruction to cause the large language model to follow the examples provided when processing an input. An example of a few-shot prompt is "'software engineering'→job_search; 'fill'→job_candidate_search; what is the intent of [input1]?" where 'software engineering'→job_search and 'fill'→job_candidate_search are examples of how to classify inputs into search categories, and input1 includes user input and/or context data.

In some examples, a chain-of-thought prompt refers to a type of large language model prompt that includes an input and a prompt example that includes the types of steps the large language model is to perform, such as intermediate steps or reasoning. In some examples, the chain-of-thought prompt includes a series of steps that illustrate to the large language model a process for how to select functions or logical groupings of functions to be included in a plan.

The data resources 916 include various types of data or information that are capable of being used by the automated agent 902, any sub-agent 906A, 906B, . . . , 906N, any of the AI services 914, or any of the tools 918. Examples of data resources 916 include but are not limited to workflows 916A, registries 916B, data stores 916C, and/or any other data resource that provides knowledge, facts, rules, policies, preferences, or any other information related to the applications 904, the user, the environment 901, and/or the domain of the automated agent 902.

Registries 916B include, e.g., files, lookup tables, or databases that store information about which AI services 914, data resources 916, and/or tools 918 are accessible to a particular automated agent 902. In some examples, different automated agents 902 have different associated registries 916B and the contents of the same type of registry is different for different automated agents (e.g., the contents of respective workflow registries is different for different agents). Data stores 916C include but are not limited to embedding data stores or vector stores (e.g., data stores that store embeddings, i.e., compressed or vector representations of data) and/or other kinds of searchable data stores.

The data resources include, alternatively or additionally, entity profile data (e.g., profile data for a device, robot, vehicle, network, etc., company profiles, job postings, etc.), activity data (e.g., historical interaction data such as search histories, chat histories, and/or interaction histories associated with the user's use of applications 904), digital content, including documents and other content items that are accessible via Internet search engines, such as web pages and multimedia content, taxonomies, data stores, services, or artificial intelligence models, entity graphs and knowledge graphs, applications 904, such as other vertical applications and/or external applications which are in communication with the automated agent 902, and metrics, such as performance metrics associated with an AI service, such as a large language model, or any of the data resources or tools. Entity profile data includes current and/or historical attribute data associated with the user (e.g., user preferences and/or biographical data such as skills, work experiences, and education history) or another entity associated with the user (such as a company or a computing resource).

The tools 918 include various types of software and/or hardware components that facilitate operation of the automated agent 902 and/or the interaction of the automated agent 902 with the AI services 914 and/or the data resources 916. Examples of tools 918 include but are not limited to application programming interfaces (APIs) 918A, search tools 918B, functions 918C, or any other software and/or hardware component that provide access, retrieval, processing, or manipulation of data or information for the automated agent 902.

In operation, the distributed multi-agent system 905 creates and initializes an instance of the automated agent 902 in response to one or more inputs, signals, or events obtained from the environment 901, in cooperation with one or more applications 904, if applicable, and using one or more AI services 914, data resources 916, and/or tools 918. The automated agent 902 receives input expressed as structured language and/or conversational natural language, such as text, speech, or gesture. The input indicates a request, a command, a query, feedback, or any other type of input. The input is capable of being associated with context data, such as a timestamp, a geographic location, a device, network, or session identifier, a topic, a goal, or any other information that is capable of affecting the interpretation of the input by the automated agent 902 or the response generated by the automated agent 902 to the input.

To generate a response to the input, the automated agent 902 invokes one or more sub-agents of the distributed multi-agent system 905. In some examples, a planner sub-agent of the distributed multi-agent system 905 is invoked to generate a plan for responding to the input using as input a workflow, a profile, and a context model obtained from one or more of the memory layers. In some examples, the plan includes a plurality of actions that need to be performed (e.g., in sequence or in parallel), where each action has an associated action sub-agent. In some examples, each action sub-agent operates in a similar manner as the planner sub-agent. An action sub-agent generates a sub-plan for performing its assigned action in a similar manner as the planner sub-agent generates the plan, in some examples. Thus, the distributed multi-agent system 905 is capable of providing hierarchical planning in which any plan is capable of being expanded to include a plurality of sub-plans, where each sub-plan is performed by a sub-agent and the output is returned to the planner agent or the calling sub-agent, as the case may be. At any level of the planning hierarchy, the respective agent 902 or sub-agent 906 coordinates the generation and execution of the respective plan and any sub-plans.

The examples shown in FIG. 9 and the accompanying description, above are provided for illustration purposes. This disclosure is not limited to the described examples.

Figure 10:
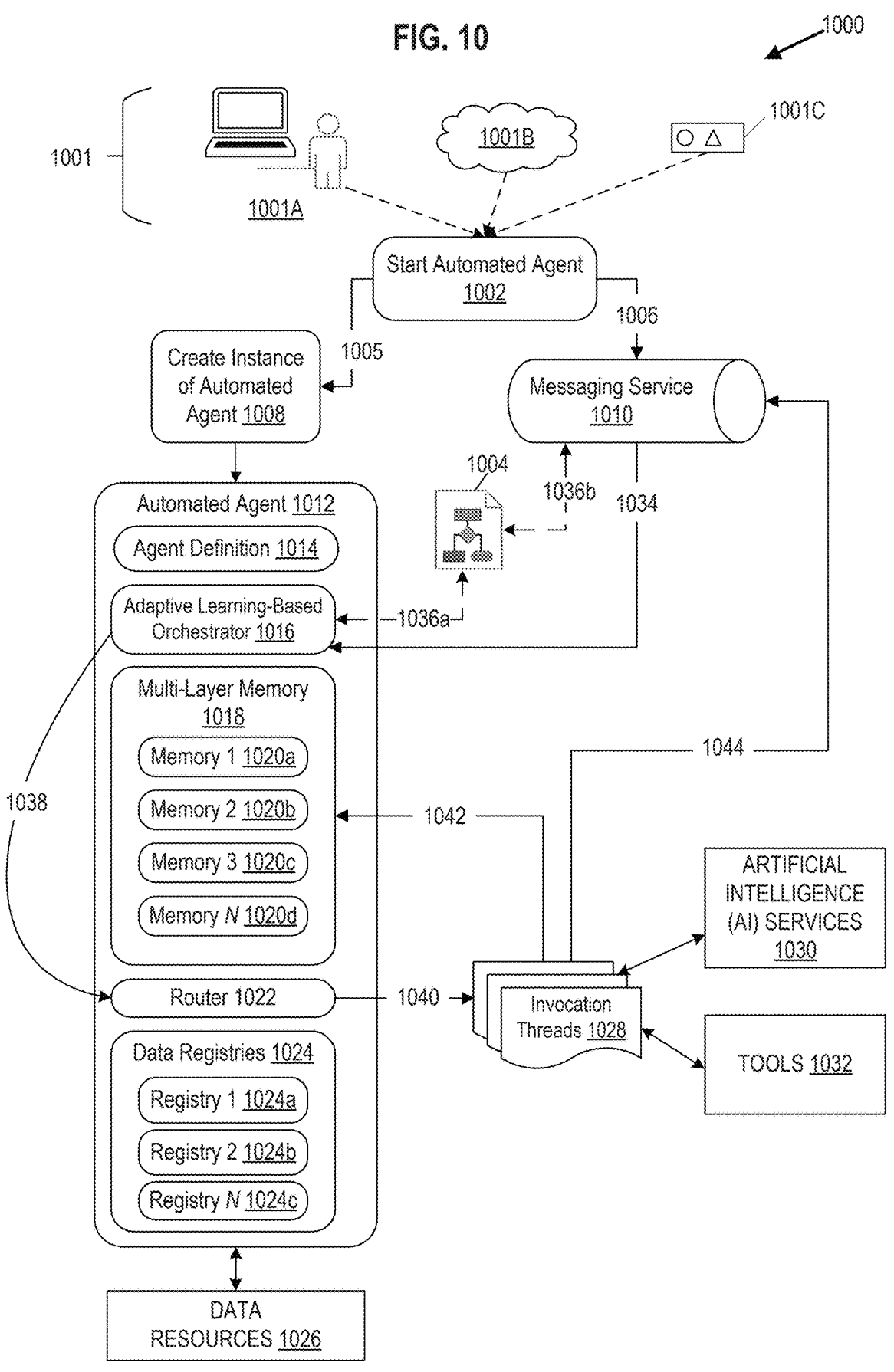
FIG. 10 is a component-based flow diagram of an example method for creating and configuring an agent using components of an agent system in accordance with some examples of the present disclosure.

FIG. 10 is a flow diagram of an example method for creating and configuring an automated agent using components of an agent system in accordance with some examples of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some examples, the method is performed by components of distributed multi-agent system 905, including components or flows shown in FIG. 10 that are not specifically shown in other figures and/or including components or flows shown in other figures that are not specifically shown in FIG. 10. Although shown in a particular sequence or order, unless otherwise specified, the order of the processes is modifiable. Thus the illustrated processes are performed in a different order, and/or some processes are performed in parallel, in some examples. Additionally, one or more processes are omitted in various examples. Thus, not all processes are required in every example. Other process flows are possible.

In FIG. 10, the example method is performed by components of an automated agent system 1000. The automated agent system 1000 includes one or more components of an environment 1001, such as a user device or system 201A, a network 201B, and one or more sensors 201C, one or more messaging services 1010, one or more data resources 1026, artificial intelligence (AI) services 1030, and tools 1032.

The one or more messaging services 1010 is or includes portions of communication service 908. In some examples, the one or more messaging services 1010 facilitates data exchange and message passing among the components of the automated agent system 1000. Examples of the one or more messaging services 1010 include asynchronous messaging capabilities, which are capable of being implemented using a publish and subscribe messaging protocol. In some examples, the one or more messaging services 1010 are implemented using, e.g., an agent framework or GAI application having dockerized endpoints such as REST (representational state transfer) or gRPC (remote procedure call) that are capable of messaging. Use of asynchronous messaging is often helpful for error handling by, for example, preventing infinite loops and enabling agent processes to be stopped at any time.

The one or more data resources 1026 include portions of data resources 916. In some examples, the data resources 1026 include various types of data or information that are used by the automated agent 1012, any sub-agent, any of the AI services 1030, or any of the tools 1032. Examples of data resources 1026 include but are not limited to workflows, registries, data stores, and/or any other data resource that provide knowledge, facts, rules, policies, preferences, or any other information related to one or more applications, the user, the environment 1001, and/or the domain of the automated agent 1012.

The artificial intelligence (AI) services 1030 include portions of AI services 914. In some examples, the AI services 1030 include various types of machine learning models and/or algorithms that enhance the capabilities and performance of the automated agent 902, such as but not limited to one or more large language models (LLMs), Bayesian inference learning (BIL) models, machine learning (ML) models, or any other AI service that provide, for instance, natural language understanding, natural language generation, dialog management, task execution, intent classification, entity extraction, information extraction, code generation, embedding generation models, similarity prediction, scoring, and/or any other function related to the operation of the automated agent 1012 or any sub-agent.

The tools 1032 include portions of tools 918. In some examples, the tools 1032 include various types of software and/or hardware components that facilitate operation of the automated agent 1012 and/or the interaction of the automated agent 1012 with the AI services 1030 and/or the data resources 1026. Examples of tools 1032 include but are not limited to application programming interfaces (APIs), search tools, functions, or any other software and/or hardware component that provide access, retrieval, processing, or manipulation of data or information for the automated agent 1012.

In the automated agent 1000, planner agents, such as adaptive machine learning-based orchestrator 1016, each are interwoven with a multi-layer memory structure 1018, which allows the planner agents to maintain their own state (where a state includes a pointer or reference to a portion of the multi-layer memory 1018). When a planner agent generates a plan, micro-prompts represent actions within the state of the plan.

One or more signals generated by the environment 1001 are capable of triggering a start automated agent process 1002. In some examples, a login to an application 904 generates a session identifier (ID). The session ID provides continuity across multiple interactions involving one or more of the components of the environment 1001. The start automated agent process 1002 is launched by, e.g., a sub-agent of the distributed multi-agent system 905, in response to a session ID. In some examples, if input from the environment 1001 satisfies a condition or threshold criteria, which is capable of being stored in and retrieved from the multi-layer memory 1018, the start automated agent process 1002 obtains or creates an agent identifier (e.g., the agent ID includes the session ID). The process 1002 passes the agent ID to a create instance of automated agent process 1008 via flow 1005 and also passes the agent ID to messaging service 1010 via flow 1006.

The process 1008 creates and launches an instance of an automated agent, e.g., automated agent 902, which is dynamically configured based on the signal(s) from the environment 1001 and/or context data obtained via the multi-layer memory 1018. The create instance of automated agent process 1008 includes one or more sub-processes that, e.g., load data into data registries 1024, initialize messaging service 1010, and create the instance of the automated agent based on the data loaded into the data registries 1024. For example, the process 1008 uses the agent ID obtained from the process 1002 to look up the sub-agents, models, micro-prompts, planners, skills, etc., that are accessible to that agent ID, and loads that information into the registries 1024. In some examples, the registry data is organized according to data type; e.g., a registry 1 1024a stores model identifiers of LLMs and/or other AI services 1030 or tools 1032 that are accessible to the agent ID, a registry 2 1024b stores micro-prompt identifiers of micro-prompts that are accessible to the agent ID, and one or more additional registries N 1024c store skill identifiers, planner identifiers, or identifiers of data resources 1026 that are accessible to the agent ID. Accessible to as used herein means that a particular instance of an automated agent (e.g., the instance identified by the agent ID) has permission to access and use the components identified in the registry. In some examples, whether the instance has permission is determined by querying one or more policies, portions of which are stored in data resources 1026 and/or multi-layer memory 1018. Since the registries are populated at the time of instance creation, the contents of the registries is dynamic and is capable of being changed or updated from one instance to the next, e.g., based on the then-current signals from the environment 1001 and/or data obtained from the multi-layer memory 1018 and/or data resources 1026.

Automated agent 1012 is a representation of the automated agent instance created by process 1008. The automated agent 1012 is defined by and includes an agent definition 1014, adaptive machine learning-based orchestrator 1016, multi-layer memory 1018, router 1022, and data registries 1024. In some examples, the agent definition 1014 includes information used to initialize the instance, such as an initial LLM prompt, an agent identifier of an agent that is configured to execute an initialization routine (e.g., an onboarding process), a user identifier, e.g., a user ID that identifies a profile page, an initial workflow identifier (e.g., an onboarding workflow), an action type (e.g., onboarding), and one or more action identifiers, which identify actions in the initial workflow. Examples of identifiers or IDs include unique identifiers, such as numeric or alphanumeric codes and URIs (uniform resource identifiers).

Adaptive machine learning-based orchestrator 1016 includes or invokes an AI service 1030, such as an LLM, that controls the operation of the automated agent 1012 during the instance created by process 1008. For example, the orchestrator 1016 generates and executes a plan that manages the execution of actions, workflows, and adaptive machine learning processes by automated agent 1012 to accomplish a goal, perform a task, or achieve an objective. The plan generated and executed by the orchestrator is based on one or more workflows 1004, which are accessible to the orchestrator 1016 via flows 236a, 236b, and messaging service 1010. The dashed lines in flows 236a and 236b indicate that the one or more workflows 1004 are capable of being dynamically retrieved, queried or updated during the operation of automated agent 1012. In the course of executing a plan, the orchestrator 1016 communicates requests for tools 1032 and/or AI services 1030 to router 1022.

Figure 11:
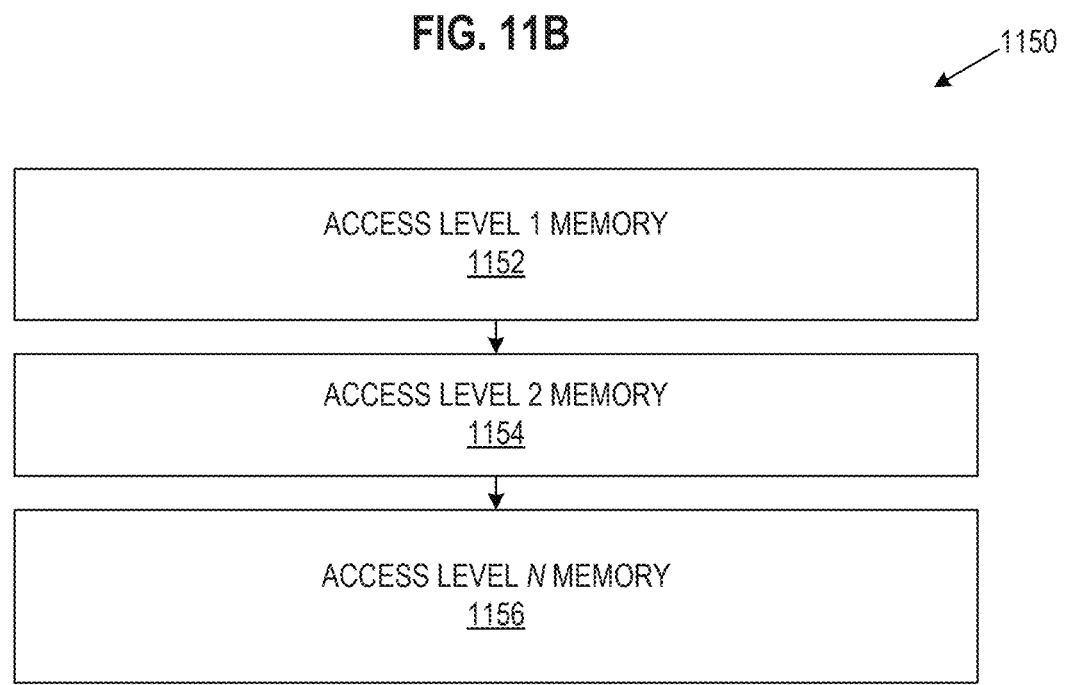
FIG. 11A is a component-based flow diagram of an example of a layered memory structure for an agent in accordance with some examples of the present disclosure.
FIG. 11B is a component-based flow diagram of an example of a layered memory structure for an agent in accordance with some examples of the present disclosure.

Multi-layer memory 1018 includes a multi-layer memory structure that includes, for example, memory 1 1020a, memory 2 1020b, memory 3, 1020c, and memory N 220d. In some examples, each of these memories or memory layers is configured to store different types of data. In some examples, memory 1 1020a is configured as a working memory, memory 2 1020b is configured as an episodic memory, memory 3 is configured as a long-term memory, and memory N 22d includes various types of collective memory, such as swarm collective memory, host collective memory, and global collective memory. Various types and configurations of multi-layer memory structures are shown in FIG. 11A, and FIG. 11B, described below. Each or any of the layers or memories of the multi-layer memory 1018 is configured to obtain data from one or more data resources 1026, such as content databases and/or embedding stores or vector databases. Because the memories or memory layers are integrated with the planners and workflows, the memory accesses occur in the context of those planners and respective workflows.

Router 1022 controls access to and invocation of tools 1032 and/or AI services 1030 by the automated agent 1012. In some examples, in operation, router 1022 receives requests for tools and/or AI services from orchestrator 1016 via flow 1038. Router 1022 validates the requests (e.g., by checking the message type of the request against a policy or directory of valid message types). If the request is valid, router 1022 checks to make sure the tool and/or AI services requested by the request is accessible to the automated agent 1012. For example, router 1022 queries one or more of the data registries 1024 to see if the tool and/or AI service identified in the request matches a tool and/or AI service listed in the registries 1024. If the request is valid and the requested tool or AI service is accessible to the automated agent 1012, the router 1022 invokes the requested tool or AI service via flow 1040, e.g., by including the tool or AI service identifier in an invocation thread 1028, along with any necessary arguments and micro-prompts.

When an AI service 1030 or tool 1032 completes its execution in response to an invocation thread 1028, portions of the tool or AI service response are stored in a memory or memory layer of multi-layer memory 1018 via flow 1042, e.g., via a memory path, which is identified by a reference or pointer embedded within the respective invocation thread 1028, in some examples. Alternatively or in addition, portions of the tool or AI service response are communicated back to orchestrator 1016 via flow 1044, messaging service 1010, and flow 1034.

The examples shown in FIG. 10 and the accompanying description, above are provided for illustration purposes. This disclosure is not limited to the described examples.

FIG. 11A is a flow diagram of an example of a layered memory structure for an automated agent in accordance with some examples of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some examples, the method is performed by components of distributed multi-agent system 905, including components or flows shown in FIG. 11A that are not specifically shown in other figures and/or including components or flows shown in other figures that are not specifically shown in FIG. 11A. Although shown in a particular sequence or order, unless otherwise specified, the order of the processes is modifiable. The illustrated processes are performed in a different order, and/or some processes are performed in parallel, in some examples. Additionally, one or more processes are omitted in some examples. Thus, not all processes are required in every example. Other process flows are possible.

The layered memory structure 1100 of FIG. 11A includes a working memory 1102, a long-term memory 1110, and a collective memory 1120. In the example of FIG. 11A, working memory 1102 is capable of storing and managing information such as task context 1104 and communications 1106. Context models, described above, are examples of task context 1104. Messages, such as inter-process messages and other communications between components of the computing system (e.g., computing system 900) are examples of communications 1106. Additionally or alternatively, working memory 1102 stores and manages other types of data alone or in combination with one or more of task context 1104 or communications 1106.

Long-term memory 1110, in the example of FIG. 11A, includes a knowledge memory 1112, a procedural memory 1114, and an episodic memory 1116. Additionally or alternatively, long-term memory 1110 includes other types of memory alone or in combination with one or more of knowledge memory 1112, procedural memory 1114, or episodic memory 1116.

Long-term memory 1110 is capable of storing and managing information such as compressed versions of data stored in working memory 1102. In some examples, episodic memory 1116 stores and manages, e.g., embeddings or other compressed forms of task context 1104, communications 1106, and/or other information stored in working memory. In some examples, if a user updates their online profile multiple times during the course of a time interval, those updates are summarized and stored in episodic memory 1116.

In some examples, long-term memory 1110 stores and manage learnings resulting from agent executions of adaptive machine learning processes. These learnings are grouped into different memory layers, such as knowledge memory 1112 and procedural memory 1114, in some examples. Portions of long-term memory 1110 that store and manage semantic information and procedural information are sometimes referred to as knowledge memory and procedural memory, respectively.

An example of semantic information is a synonym, definition or explanation of a word or phrase. For instance, the job title "senior software engineer" is sometimes associated by a particular user with a certain group of skills, such as Java, PYTHON, data science, neural networks, etc. The semantic information is customizable for each individual user. In some examples, two or more users who work for different companies have different, personalized meanings or definitions for "senior software engineer," and these multiple different meanings or definitions are stored and maintained in respective long-term memories 1110 associated with the respective users.

An example of procedural information is a sequence of steps associated with a particular task. In some examples, two or more users who are both recruiters each prefer a different sequence of steps for performing a job search or other recruiting task. These different task definitions, which are capable of being different in terms of the types of steps that are included and/or the order of the steps, are stored and maintained in respective long-term memories associated with the respective users.

The arrows between the working memory 1102, long-term memory 1110, and collective memory 1120 indicate one potential method of moving data between the memories 1102, 1110, 1120. In some examples, context data such as user preference and/or activity information is initially stored in working memory 1102, then moved from working memory 1102 to long-term memory 1110, then moved from long-term memory 1110 to collective memory 1120, in accordance with memory processing workflows. Other process flows are possible; e.g., some information is moved directly from working memory 1102 to collective memory 1120, in some examples.

Specialized agents (e.g., one or more sub-agents 906) are configurable to perform memory management operations, such as an operation to compress data obtained from working memory 1102 and store the compressed data in another memory layer (e.g., long-term memory 1110 or collective memory 1120), and/or an operation to search one or more of the memory layers for information and extract data that matches the search criteria from the respective memory layers in which the information matching the query is stored. In some examples, a specialized agent for a memory management operation is defined by a specialized memory management workflow that contains only the tasks required to perform the particular memory management operation and/or a specialized micro-prompt that, for example, contains an instruction that instructs an LLM to generate and output a plan that is executable to perform the particular memory management operation.

The examples shown in FIG. 11A and the accompanying description, above are provided for illustration purposes. This disclosure is not limited to the described examples.

FIG. 11B is a flow diagram of an example of a layered memory structure for an automated agent in accordance with some examples of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some examples, the method is performed by components of distributed multi-agent system 905, including components or flows shown in FIG. 11B that are not specifically shown in other figures and/or including components or flows shown in other figures that are not specifically shown in FIG. 11B. Although shown in a particular sequence or order, unless otherwise specified, the order of the processes is modifiable. The illustrated processes are performed in a different order, and/or some processes are performed in parallel, in some examples. Additionally, one or more processes are omitted in some examples. Thus, not all processes are required in every example. Other process flows are possible.

In the example of FIG. 11B, a multi-layered memory structure 1150 includes N memory layers, each of which is associated with a different access level. In some examples, access level refers to the ability of various systems, components, resources, models, users, processes, devices, etc. to read and/or write data to and/or from a particular memory layer of the multi-layered memory structure 1150. The assignment of access levels to the various systems, components, resources, models, users, processes, devices, etc., is customizable based on the requirements or design of a particular implementation of the computing system. In some examples, access level 1 memory 1152 has an associated access level 1 that is the most restrictive and therefore acts as a gateway for one or more other memory layers, such that permission is granted to read and/or write to access level 2 memory 1154 and/or access level N memory 1156 only to systems, components, resources, models, users, processes, devices, etc., that satisfy the access level 1 requirements. In some examples, access level N memory 1156 has an associated access level N that is least restrictive in that many different agents (and not just a single agent) are granted permission to access that memory.

The arrows between the access level 1 memory 1152, access level 2 memory 1154, and access level N memory 1156 indicate one potential method of moving data (e.g., context data) between the memories. In some examples, information is initially stored in access level 1 memory 1152, then moved from access level 1 memory 1152 to access level 2 memory 1154, then moved from access level 2 memory 1154 to access level N memory 1156. Other process flows are possible; e.g., some information is moved directly from access level 1 memory 1152 to access level N memory 1156, in some examples.

In some examples, specialized agents (e.g., one or more sub-agents 906) are configured to perform memory management operations, such as an operation to compress data obtained from access level 1 memory 1152 and store the compressed data in another memory layer (e.g., access level 2 memory 1154 and/or access level N memory 1156), and/or an operation to search one or more of the memory layers for information and extract data that matches the search criteria from the respective memory layers in which the information matching the query is stored. In some examples, a specialized agent for a memory management operation is defined by a specialized memory management workflow that contains only the tasks required to perform the particular memory management operation and/or a specialized micro-prompt that, for example, contains an instruction that instructs an LLM to generate and output a plan that is executable to perform the particular memory management operation.

Layered memory structures such as those shown in FIG. 11A and FIG. 11B are allocated or assigned to specific agents, in some examples. When an instance of an automated agent is created, such as described in connection with FIG. 10, a multi-layered memory structure (or a portion thereof) is allocated for use by that instance of the automated agent, and that memory structure is initialized, populated or updated at instance creation and/or during or as a result of execution of the automated agent in that instance. When a different instance of an automated agent is created, whether associated with the same user or a different user, a different multi-layered memory structure (or a portion thereof) is allocated for use by that instance of the automated agent, and that memory structure is initialized, populated or updated at instance creation and/or during or as a result of execution of the automated agent in that instance.

The examples shown in FIG. 11B and the accompanying description, above are provided for illustration purposes. This disclosure is not limited to the described examples.

Multi-layer memory structures such as the examples shown in FIG. 11A and/or FIG. 11B are capable of being implemented using, e.g., one or more storage trees, storage stacks, and/or path templates with, for example, a higher-order resolver, where the path templates are resolved at runtime. Multi-layer memory structures such as the examples shown in FIG. 11A and/or FIG. 11B are capable of being queried using, e.g., argument names and/or strings and a semantic search or a RAG (retrieval-augmented generation) approach. In some examples, policies specify whether the contents of one memory layer overrides another memory layer in a given instance, task, or workflow. In some examples, a policy (e.g., a corporate policy) instructs the query to use information obtained from a collective memory instead of information obtained from a personal or private memory, in the context of an action whose output is accessible to a team of agents. In some examples, memory is queried across all layers and then the most relevant portions of the retrieved information are selected and extracted from the query results and mapped to their respective arguments in the action call. An LLM or other type of model or tool is capable of being used to map the relevant portions of the retrieved information to their respective arguments. In some examples, the information retrieved by querying is included in an LLM prompt (e.g., a micro-prompt) that has been specially configured to cause an LLM to perform the specific task of function calling, and then the prompt is passed to the LLM which maps the information to arguments and generates the function call.

In some examples, memory structures and/or processes described with reference to FIG. 11A and/or FIG. 11B are used to determine and manage memory operations using an order of precedence. In some examples, an order of precedence is determined by querying a policy or a registry associated with an agent. In some examples, a first order of precedence is specified for an agent that is included in a group of agents that collectively performs a task, and a second order of precedence is specified for an agent that is not part of a group of agents. In some examples, the order of precedence is implemented as weight values that are applied to data retrieved from different memory layers. In some examples, data retrieved from working memory is weighted more highly than data retrieved from episodic or long-term memory or collective memory depending on its relevance to the current task, objective, goal, or intent. In some examples, data retrieved from episodic or long-term memory or collective memory is weighted more highly than data retrieved from working memory depending on its relevance to the current task, objective, goal, or intent. In some examples, order of precedence is determined using access levels. Agents that are part of a group are capable of accessing collective memory associated with an individual agent but not capable of accessing other memory layers associated with that agent, while the individual agent itself is capable of accessing all of its respective memory layers, in some examples.

The examples shown in FIG. 11B and the accompanying description, above are provided for illustration purposes. This disclosure is not limited to the described examples.

Figure 12:
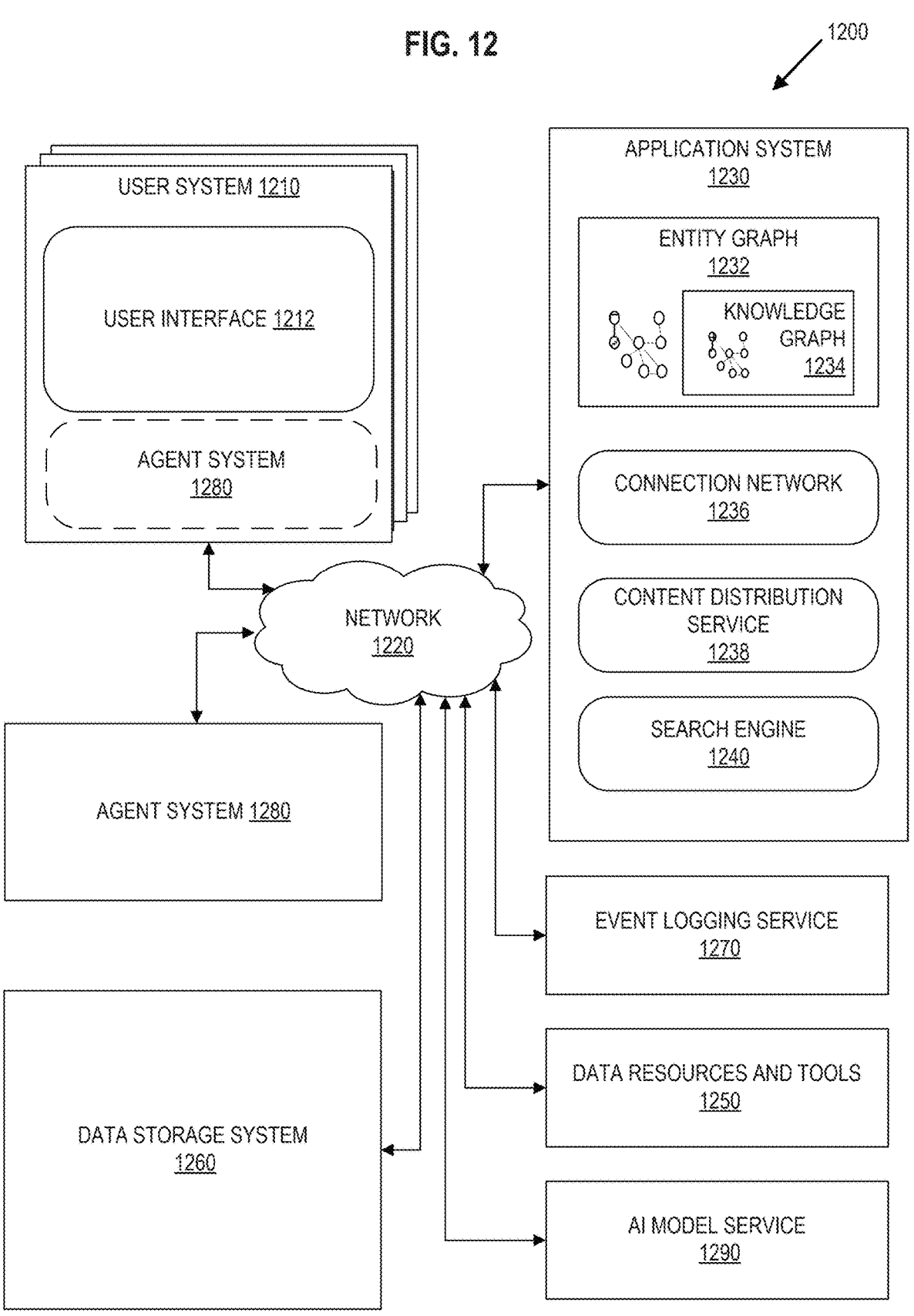
FIG. 12 is a block diagram of a computing system that includes an agent system in accordance with some examples of the present disclosure.

FIG. 12 is a block diagram of a computing system that includes an agent system in accordance with some examples of the present disclosure.

In the example of FIG. 12, a computing system 1200 includes one or more user systems 1210, a network 1220, an application system 1230, data resources and tools 1250, an agent system 1280, a data storage system 1260, an event logging service 1270, and an AI model service 1290.

All or at least some components of agent system 1280 are implemented at the user system 1210, in some examples. For example, portions of agent system 1280 are implemented directly upon a single client device such that communications involving applications running on user system 1210 and agent system 1280 occur on-device without the need to communicate with, e.g., one or more servers, over the Internet. Dashed lines are used in FIG. 12 to indicate that all or portions of agent system 1280 are capable of being implemented directly on the user system 1210, e.g., the user's client device. In some examples, both user system 1210 and agent system 1280 are implemented on the same computing device, in some examples. In other examples, all or portions of agent system 1280 are implemented on one or more servers and in communication with user systems 1210 via network 1220. Components of the computing system 1200 including the agent system 1280 are described in more detail herein.

A user system 1210 includes one or more computing devices. Examples of computing devices include a personal computing device, a server, a mobile computing device, a wearable electronic device, or a smart appliance. The user system 1210 includes one or more software applications that a computing device is capable of executing alone or in combination with one or more other computing devices. Examples of software applications include an operating system or a front end of an online system. Many different user systems 1210 are capable of being connected to network 1220 at the same time or at different times. In some examples, different user systems 1210 contain similar components as described in connection with the illustrated user system 1210. In some examples, many different end users of computing system 1200 interact with many different instances of application system 1230 through their respective user systems 1210, at the same time or at different times.

User system 1210 includes a user interface 1212. User interface 1212 is installed on user system 1210 or accessible to user system 1210 via network 1220. In some examples, user interface 1212 includes a front end portion of an automated agent (e.g., automated agent 902) and/or agent system 1280.

User interface 1212 includes, for example, a graphical display screen that includes graphical user interface elements. Examples of graphical user interface elements include an input box or other input mechanism and a slot. A slot as used herein refers to a space on a graphical display such as a web page or mobile device screen, into which output, e.g., digital content such as search results, feed items, chat boxes, or threads, is loaded for display to the user. In some examples, user interface 1212 includes a scrollable arrangement of variable-length slots that simulates an online chat or instant messaging session and/or a scrollable arrangement of slots that contain content items or search results. The locations and dimensions of a particular graphical user interface element on a screen are specified using, for example, a markup language such as HTML (Hypertext Markup Language). On a typical display screen, a graphical user interface element is defined by two-dimensional coordinates. In other examples such as virtual reality or augmented reality examples, a slot is defined using a three-dimensional coordinate system. Example screen captures of user interface screens that are capable of being included in user interface 1212 are shown in the drawings and described herein.

User interface 1212 is capable of interacting with the agent system 1280 and/or one or more application systems 1230. For example, user interface 1212 enables the user of a user system 1210 to interact with the automated agent 902 to create, edit, send, view, receive, process, and organize workflows, tasks, plans, search queries, search results, content items, news feeds, and/or portions of online dialogs. In some examples, user interface 1212 enables the user to input requests (e.g., queries) for various different types of information, to initiate user interface events, and to view or otherwise perceive output such as data and/or digital content produced by, e.g., an application system 1230, agent system 1280, content distribution service 1238 and/or search engine 1240. In some examples, user interface 1212 includes a graphical user interface (GUI), a conversational voice/speech interface, a virtual reality, augmented reality, or mixed reality interface, and/or a haptic interface. User interface 1212 includes a mechanism for entering search queries and/or selecting search criteria (e.g., facets, filters, etc.), selecting GUI user input control elements, and interacting with digital content such as search results, entity profiles, posts, articles, feeds, and online dialogs, in some examples. Some examples of user interface 1212 include web browsers, command line interfaces, and mobile app front ends. User interface 1212 as used herein includes application programming interfaces (APIs) in some examples.

Network 1220 includes an electronic communications network. Network 1220 is implemented on any medium or mechanism that provides for the exchange of digital data, signals, and/or instructions between the various components of computing system 1200. Examples of network 1220 include, without limitation, a Local Area Network (LAN), a Wide Area Network (WAN), an Ethernet network or the Internet, or a terrestrial, satellite or wireless link, or a combination of any number of different networks and/or communication links.

Application system 1230 includes, for example, one or more online systems that provide social network services, general-purpose search engines, specific-purpose search engines, messaging systems, content distribution platforms, e-commerce software, enterprise software, or any combination of any of the foregoing or other types of software. Application system 1230 includes any type of application system that provides or enables the retrieval of and interactions with one or more forms of digital content, including machine-generated content via user interface 1212. In some examples, portions of agent system 1280 are components of application system 1230. In some examples, an application system 1230 includes one or more of an entity graph 1232 and/or knowledge graph 1234, a user connection network 15315, a content distribution service 1238, and/or a search engine 1240. In other examples, application system 1230 interacts with agent system 1280 to control a physical machine or device, such as a vehicle or a robot.

In some examples, a front end portion of application system 1230 operates in user system 1210, for example as a plugin or widget in a graphical user interface of a web application, mobile software application, or as a web browser executing user interface 1212. In an example, a mobile app or a web browser of a user system 1210 transmits a network communication such as an HTTP request over network 1220 in response to user input that is received through a user interface provided by the web application, mobile app, or web browser, such as user interface 1212. A server running application system 1230 receives the input from the web application, mobile app, or browser executing user interface 1212, performs one or more operations using the input, and returns output to the user interface 1212 using a network communication such as an HTTP response, which the web application, mobile app, or browser receives and processes at the user system 1210.

In the example of FIG. 12, an application system 1230 includes an entity graph 1232 and/or a knowledge graph 1234. Entity graph 1232 and/or knowledge graph 1234 include data organized according to graph-based data structures that are searchable or traversable via queries and/or indexes to determine relationships between entities. In some examples, entity graph 1232 and/or knowledge graph 1234 is used to compute various types of relationship weights, affinity scores, similarity measurements, and/or statistics between, among, or relating to entities.

Entity graph 1232, knowledge graph 1234 includes a graph-based representation of data stored in data storage system 1260, described herein. For example, entity graph 1232, knowledge graph 1234 represents entities, such as users, organizations (e.g., companies, schools, institutions), content items (e.g., job postings, announcements, articles, comments, and shares), and computing resources (e.g., databases, models, applications, and services), as nodes of a graph. Entity graph 1232, knowledge graph 1234 represents relationships, also referred to as mappings or links, between or among entities as edges, or combinations of edges, between the nodes of the graph. In some examples, mappings between different pieces of data used by an application system 1230 are represented by one or more entity graphs. In some examples, the edges, mappings, or links indicate relationships, online interactions, or activities relating to the entities connected by the edges, mappings, or links. In some examples, if a user clicks on a search result, an edge is created connecting the user entity with the search result entity in the entity graph, where the edge is tagged with a label such as "viewed." If a user viewing a list of search results skip over a search result without clicking on the search result, an edge is not created between the user entity and the search result entity in the entity graph, in some examples.

Portions of entity graph 1232, knowledge graph 1234 are automatically re-generated or updated from time to time based on changes and updates to the stored data, e.g., updates to entity data and/or activity data. In some examples, entity graph 1232, knowledge graph 1234 refers to an entire system-wide entity graph or to only a portion of a system-wide graph. In some examples, entity graph 1232, knowledge graph 1234 refers to a subset of a system-wide graph, where the subset pertains to a particular user or group of users of application system 1230.

Knowledge graph 1234 includes a graph-based representation of data stored in data storage system 1260, described herein. Knowledge graph 1234 represents relationships, also referred to as links or mappings, between entities or concepts as edges, or combinations of edges, between the nodes of the graph. In some examples, mappings between different pieces of data used by application system 1230 or across multiple different application systems are represented by the knowledge graph 1234.

In some examples, knowledge graph 1234 is a subset or a superset of entity graph 1232. In some examples, knowledge graph 1234 includes multiple different entity graphs 1232 that are joined by cross-application or cross-domain edges. In some examples, knowledge graph 1234 joins entity graphs 1232 that have been created across multiple different databases or across different software products. In some examples, the entity nodes of the knowledge graph 1234 represent concepts, such as product surfaces, verticals, or application domains. In some examples, knowledge graph 1234 includes a platform that extracts and stores different concepts that is used to establish links between data across multiple different software applications. Examples of concepts include topics, industries, and skills. As with other portions of entity graph 1232, knowledge graph 1234 is usable to compute various types of relationship weights, affinity scores, similarity measurements, and/or statistical correlations between or among entities and/or concepts.

In the example of FIG. 12, application system 1230 includes a user connection network 1236. User connection network 1236 includes, for instance, a social network service, professional social network system and/or other social graph-based applications. Content distribution service 1238 includes, for example, a feed, chatbot or chat-style system, or a messaging system, such as a peer-to-peer messaging system that enables the creation and exchange of messages between users of application system 1230 and the application system 1230. Search engine 1240 includes a search engine that enables users of application system 1230 to input and execute search queries to retrieve information from one or more sources of information, such as user connection network 1236, entity graph 1232, knowledge graph 1234, one or more data stores of data storage system 1260, or one or more data resources and tools 1250.

In the example of FIG. 12, application system 1230 includes a content distribution service 1238. The content distribution service 1238 includes a data storage service, such as a web server, which stores digital content items, and transmits digital content items to users via user interface 1212. In some examples, content distribution service 1238 processes requests from, for example, application system 1230 and/or agent system 1280, and distributes digital content items to user systems 1210 in response to requests.

A request includes, for example, a network message such as an HTTP (HyperText Transfer Protocol) request for a transfer of data from an application front end to the application's back end, or from the application's back end to the front end, or, more generally, a request for a transfer of data between two different devices or systems, such as data transfers between servers and user systems. A request is formulated, e.g., by a browser or mobile app at a user device, in connection with a user interface event such as a login, click on a graphical user interface element, an input of a search query, or a page load. In some examples, content distribution service 1238 is part of application system 1230. In other examples, content distribution service 1238 interfaces with application system 1230 and/or agent system 1280, for example, via one or more application programming interfaces (APIs).

In the example of FIG. 12, application system 1230 includes a search engine 1240. Search engine 1240 includes a software system designed to search for and retrieve information by executing queries on one or more data stores, such as databases, connection networks, and/or graphs. The queries are designed to find information that matches specified criteria, such as keywords and phrases contained in user input and/or system-generated queries. For example, search engine 1240 is used to retrieve data in response to user input and/or system-generated queries, by executing queries on various data stores of data storage system 1260 and/or data resources and tools 1250, or by traversing entity graph 1232, knowledge graph 1234.

Data resources and tools 1250 include computing resources, such as data stores, databases, embedding-based retrieval mechanisms, code generators, etc., that are capable of being used to operate an agent or agent system. Data resources and tools 1250 include computing resources that are internal to application system 1230 or external to application system 1230. Examples of data resources and tools 1250 include entity graphs, knowledge graphs, indexes, databases, networks, applications, models (e.g., large language models and/or other artificial intelligence models or machine learning models), taxonomies, data services, web pages, vectors (e.g., data stores that store embeddings), and searchable digital catalogs. Each data resource or tool 1250 enables an agent or agent system to access the data resource or tool, for example by providing an application programming interface (API). Each data resource or tool 1250 includes a monitoring service that periodically generates, publishes, or broadcasts availability and/or other performance metrics associated with the data resource, in some examples. A data resource or tool 1250 provides a set of APIs that are used by an agent or agent system to access the data resource or tool, obtain output from the data resource, and/or obtain performance metrics for the data resource or tool, in some examples.

Data storage system 1260 includes data stores and/or data services that store digital data received, used, manipulated, and produced by application system 1230 and/or agent system 1280, including contextual data, state data, prompts and/or prompt templates for generative artificial intelligence models or large language models, user inputs, system-generated outputs, metadata, attribute data, activity data. Databases or data stores that are capable of being used in some of the described examples include but are not limited to vector databases, graph databases, relational databases, and key-value stores.

In the example of FIG. 12, data storage system 1260 includes various data stores that store, for example, entity data, context data, prompts, embeddings, etc. A data store includes include a volatile memory such as a form of random access memory (RAM) and/or persistent memory, which can be available on user system 1210 or another device (e.g., one or more servers) for storing state data generated at the user system 1210 or an application system 1230. In some examples, a separate, personalized version of each or any data store is created for each user such that data is not shared between or among the separate, personalized versions of the data stores.

In some examples, data storage system 1260 includes multiple different types of data storage and/or a distributed data service. In some examples, data service refers to a physical, geographic grouping of machines, a logical grouping of machines, or a single machine. In some examples, a data service includes a data center, a cluster, a group of clusters, or a machine. Data stores of data storage system 1260 are capable of storing data produced by real-time and/or offline (e.g., batch) data processing. A data store configured for real-time data processing is referred to as a real-time data store, in some examples. A data store configured for offline or batch data processing is referred to as an offline data store, in some examples. Data stores are capable of being implemented using databases, such as key-value stores, relational databases, and/or graph databases. Data is written to and read from data stores using query technologies, e.g., SQL or NoSQL.

Data storage system 1260 resides on one or more persistent and/or volatile storage devices that reside within the same local network as other devices of computing system 1200 and/or in a network that is remote relative to other devices of computing system 1200. Thus, although depicted as being included in computing system 1200, portions of data storage system 1260 are part of computing system 1200 or accessed by computing system 1200 over a network, such as network 1220, in some examples.

Event logging service 1270 captures and records activity data generated during operation of application system 1230 and/or agent system 1280, including user interface events generated at user systems 1210 via user interface 1212, in real time, and formulates the user interface events and/or other network activity data into a data stream that is consumed by, for example, a stream processing system. Examples of network activity data include logins, page loads, dialog inputs, input of search queries or query terms, selections of facets or filters, clicks on search results or graphical user interface control elements, scrolling lists of search results, and social action data such as likes, shares, comments, and social reactions (e.g., "insightful," "curious," "like," etc.). For instance, when a user of application system 1230 via a user system 1210 enters input or clicks on a user interface element, such as a workflow element, or a user interface control element such as a view, comment, share, or reaction button, or uploads a file, or inputs a query, or scrolls through a feed, etc., event logging service 1270 fires an event to capture and store log data including an identifier, such as a session identifier, an event type, a date/timestamp at which the user interface event occurred, and possibly other information about the user interface event, such as the impression portal and/or the impression channel involved in the user interface event. Examples of impression portals and channels include, for example, device types, operating systems, and software platforms, e.g., web applications and mobile applications.

For instance, when a user enters input or reacts to system-generated output, such as a list of search results, event logging service 1270 stores the corresponding event data in a log. Event logging service 1270 generates a data stream that includes a record of real-time event data for each user interface event that has occurred. Event data logged by event logging service 1270 is pre-processed and anonymized as needed so that it is capable of being used as context data to, for example, configure one or more instructions for one or more artificial intelligence models (e.g., large language models), or to modify weights, affinity scores, or similarity measurements that are assigned by the agent system to search results or data resources.

Agent system 1280 includes any one or more of the components, features, or functions described herein with respect to an automated agent or agent system. For example, agent system 1280 includes components of automated agent 902, automated agent 1012, and/or distributed multi-agent system 905.

AI model service 1290 includes one or more artificial intelligence-based models, such as large language models and/or other types of machine learning models including discriminative and/or generative models, neural networks, probabilistic models, statistical models, transformer-based models, and/or any combination of any of the foregoing. AI model service 1290 enables automated agents and agent systems to access to these models, for example by providing one or more application programming interfaces (APIs). AI model service 1290 includes a monitoring service that periodically generates, publishes, or broadcasts latency and/ or other performance metrics associated with the models. In some examples, AI model service 1290 provides a set of APIs that are used by an agent or agent system to obtain performance metrics for large language models and/or other machine learning models.

While not specifically shown, it should be understood that any of user system 1210, application system 1230, data resources and tools 1250, data storage system 1260, event logging service 1270, agent system 1280, and AI model service 1290 includes an interface embodied as computer programming code stored in computer memory that when executed causes a computing device to enable bidirectional communication with any other of user system 1210, application system 1230, data resources and tools 1250, data storage system 1260, event logging service 1270, agent system 1280, and AI model service 1290 using a communicative coupling mechanism. Examples of communicative coupling mechanisms include network interfaces, inter-process communication (IPC) interfaces and application program interfaces (APIs).

Each of user system 1210, application system 1230, data resources and tools 1250, data storage system 1260, event logging service 1270, agent system 1280, and AI model service 1290 is implemented using one or more computing devices that are communicatively coupled to electronic communications network 1220. Any of user system 1210, application system 1230, data resources and tools 1250, data storage system 1260, event logging service 1270, agent system 1280, and AI model service 1290 are capable of being bidirectionally communicatively coupled by network 1220. User system 1210 as well as other different user systems (not shown) are bidirectionally communicatively coupled to application system 1230 and/or agent system 1280, in some examples.

Examples of users of user system 1210 include an administrator or end user of application system 1230 or agent system 1280. User system 1210 is configured to communicate bidirectionally with any of application system 1230, data resources and tools 1250, data storage system 1260, event logging service 1270, agent system 1280, and AI model service 1290 over network 1220.

Terms such as component, system, and model as used herein refer to computer implemented structures, e.g., combinations of software and hardware such as computer programming logic, data, and/or data structures implemented in electrical circuitry, stored in memory, and/or executed by one or more hardware processors.

The features and functionality of user system 1210, application system 1230, data resources and tools 1250, data storage system 1260, event logging service 1270, agent system 1280, and AI model service 1290 are implemented using computer software, hardware, or software and hardware, and include combinations of automated functionality, data structures, and digital data, which are represented schematically in the figures. User system 1210, application system 1230, data resources and tools 1250, data storage system 1260, event logging service 1270, agent system 1280, and AI model service 1290 are shown as separate elements in FIG. 15 for ease of discussion but, except as otherwise described, the illustration is not meant to imply that separation of these elements is required. The illustrated systems, services, and data stores (or their functionality) of each of user system 1210, application system 1230, data resources and tools 1250, data storage system 1260, event logging service 1270, agent system 1280, and AI model service 1290 are capable of being divided over any number of physical systems, including a single physical computer system, and are capable of communicating with each other in any appropriate manner.

Figure 14:
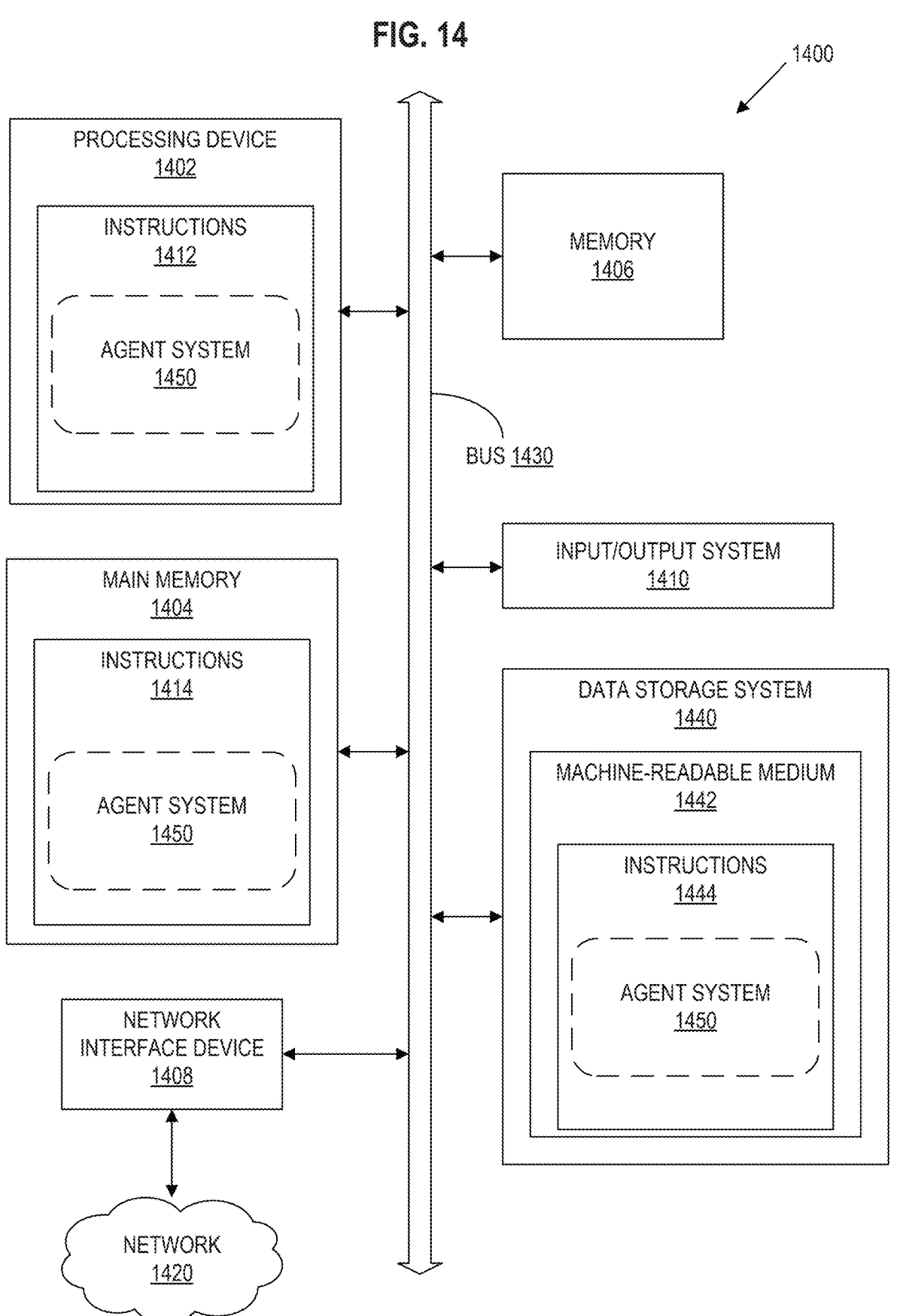
FIG. 14 is a block diagram of an example computer system including components of an agent system in accordance with some examples of the present disclosure.

In the example of FIG. 14, portions of agent system 1280 that are capable of being implemented on a front end system, such as one or more user systems, and portions of agent system 1280 that are capable of being implemented on a back end system such as one or more servers, are collectively represented as agent system 1450 for ease of discussion only. In some examples, portions of agent system 1280 are not required to be implemented all on the same computing device, in the same memory, or loaded into the same memory at the same time. In some examples, access to portions of agent system 1280 is limited to different, mutually exclusive sets of user systems and/or servers. In some examples, a separate, personalized version of agent system 1280 is created for each user of the agent system 1280 such that data is not shared between or among the separate, personalized versions of the agent system 1280. Certain portions of agent system 1280 are capable of being implemented on user systems while other portions of agent system 1280 are capable of being implemented on a server computer or group of servers. In some examples, one or more portions of agent system 1280 are implemented on user systems. Agent system 1280 is entirely implemented on user systems, e.g., client devices, in some examples. In some examples, a version of agent system 1280 is embedded in a client device's operating system or stored at the client device and loaded into memory at execution time.

The examples shown in FIG. 12 and the accompanying description, above are provided for illustration purposes. This disclosure is not limited to the described examples.

FIG. 13A is a block diagram of a machine learning modeling system that is capable of being used by and/or included in an agent system in accordance with some examples of the present disclosure.

Machine learning models are computer-implemented structures that are capable of generating predictive output in response to raw input. A machine learning model includes a probabilistic or statistical algorithm that is configured to perform a specific predictive function through a training process that involves iteratively exposing the models to many samples of data and adjusting one or more model parameters until the models achieve a satisfactory prediction accuracy and reliability. The predictive accuracy and reliability of a machine learning model in relation to a particular task is dependent upon the training process and the data used in the training.

Machine learning systems include components and processes that perform data generation, model training, model evaluation (e.g., calibration and validation), and application. Data preparation includes obtaining and aggregating model input data. The preparation of training data includes labeling the aggregated data, in some examples. Training data includes structured data, unstructured data, text, multimodal data, or any combination of any of the foregoing. Model training includes setting values of hyperparameters, determining performance metrics, adjusting weights of the machine learning model in response to the training data, evaluating the performance metrics, and parameter tuning. Application includes applying the trained machine learning model to the real-world environment, e.g., in a specific use case using data not included in the training data (e.g., unlabeled data). The application phase is referred to as inferencing or inference time, in some examples.

Figure 13D:
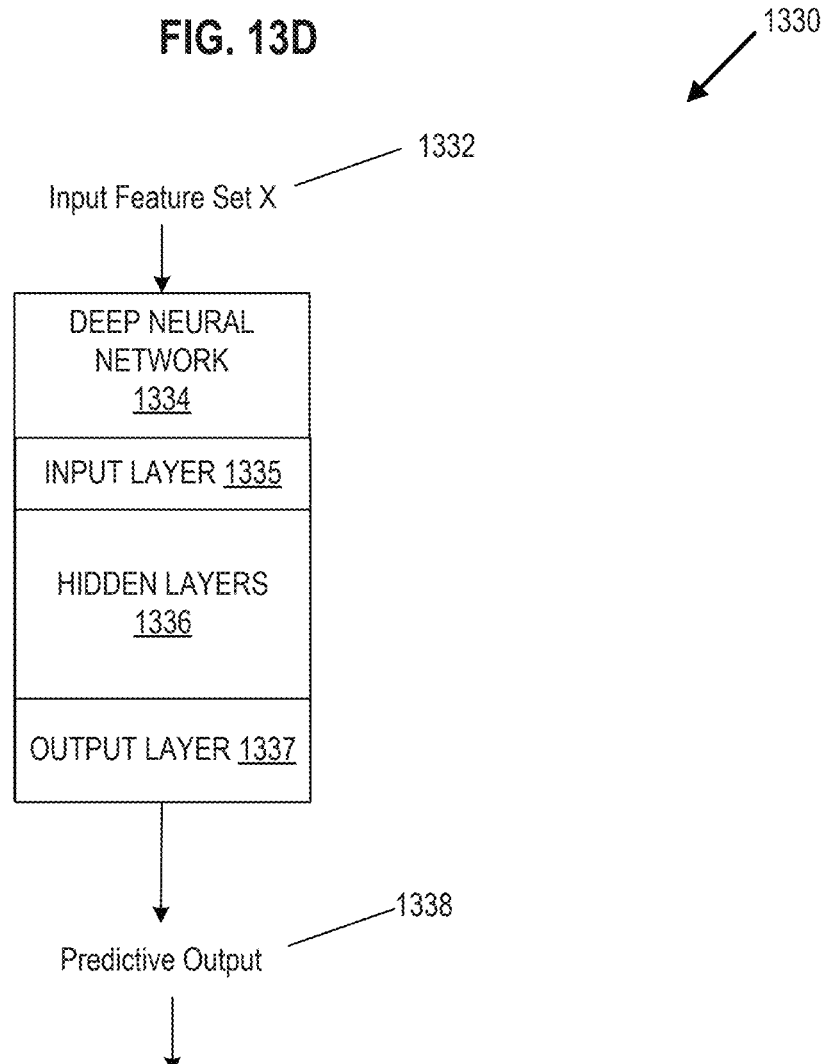

In FIG. 13A, a machine learning modeling system 1300 includes a machine learning model 1306, a modeling and calibration subsystem 1302, and a model validation subsystem 1304. The machine learning model 1306 is any type or combination of one or more machine learning models, such as any of the types of machine learning models shown in FIG. 13B, FIG. 13C, FIG. 13D, and FIG. 13E and/or any other types or combinations of machine learning models.

The modeling and calibration subsystem 1302 receives model input, such as input feature sets, embeddings, digital content, or prompts. The model input is engineered to train the machine learning model 1306 to perform one or more tasks, such as discriminative tasks like classification or scoring and/or generative tasks such as content generation tasks. Modeling and calibration subsystem 1302 includes a data set creation component 1303, a model training component 1305, and a model calibration component 1307.

Data set creation component 1303 divides the model input, e.g., input feature sets, into one or more training data sets and one or more validation data sets, e.g., training data set 1309 and validation data set 1311. Model training component 1305 and model calibration component 1307 cooperatively execute a training process. In some examples, the training process causes the machine learning model 1306 to develop, by iterative adjustments to weights or coefficients, a mathematical representation of the relationships between different items of data, such as relationships between different inputs (e.g., similarity estimates or estimates of user preferences), or relationships between inputs and categorical data such as classification labels, or relationships between inputs and outputs. The resulting trained model is used to generate predictive output (e.g., scores, labels, or other output) based on subsequent model input.

One or more different approaches are used to train the machine learning model 1306, for example, supervised machine learning, semi-supervised machine learning, or unsupervised machine learning. In supervised machine learning, the set of training data includes indications of expected model output coupled with respective model input; for example, ground-truth labeled data samples. In some examples, an instance of training data for supervised learning includes a model input (e.g., a set of features) and an associated expected output (e.g., a classification label), where the expected output is human curated or machine-generated. In some examples, an instance of training data for supervised machine learning includes a digital image and a title or caption for the image that describes the contents of the image. In unsupervised machine learning, the training examples are unlabeled. In unsupervised machine learning, a machine learning algorithm such as a clustering algorithm is used to identify similarities among data samples and create clusters or groupings of similar data using one or more similarity criteria. In some examples, unsupervised learning is used to group digital content items, such as images, articles, or videos, into topics, where the topics are determined based on the features of the content items themselves rather than supplied by labels. Semi-supervised machine learning combines supervised and unsupervised machine learning, using both labeled and unlabeled data to train machine learning models.

Model training component 1305 applies machine learning model 1306 to training data set 1309 iteratively and adjusts the value of one or more model parameters and/or feature coefficients of the machine learning model 1306 based on the processing of the training data set 1309 by the model 1306 until the difference between the predicted model output generated by the machine learning model 1306 and the expected model output evidenced by the training data set 1309 satisfies (e.g., meets or exceeds) model performance criteria 1308. When the model performance criteria 1308 are satisfied, modeling and calibration subsystem 1302 ends the model training process and produces a trained machine learning model 1306.

Model validation subsystem 1304 applies a model validation process to the trained machine learning model 1306 produced by modeling and calibration subsystem 1302. Model validation subsystem 1304 uses the validation data set 1311 to determine whether model validation criteria 1310 are satisfied (e.g., met or exceeded). In some examples, the validation data set 1311 is created by setting aside a portion of the training data set 1309 until after training, such that the validation data set 1311 is used to compare and evaluate the difference between the predictive output produced by the trained model to the expected model output evidenced by the set-aside portion of the training data set 1309.

A validated machine learning model 1306 is used for inferencing, e.g., to generate predictive output, e.g., labels, scores, or other content, in response to model input. Alternatively or in addition, the output produced by the validated machine learning model 1306 is stored for future use (e.g., for access or lookup by one or more downstream processes, systems, or services).

There are many different types and configurations of machine learning models. Illustrative, nonlimiting examples of some of the different types of machine learning models are shown in FIG. 13B, FIG. 13C, FIG. 13D, and FIG. 13E, described below. The Als, models, and AI model services described herein are capable of including or using any of the various types of machine learning models, including but not limited to one or more of the types of models shown in FIG. 13B, FIG. 13C, FIG. 13D, and FIG. 13E.

The examples shown in FIG. 13A and the accompanying description, above are provided for illustration purposes. This disclosure is not limited to the described examples.

FIG. 13B is a block diagram of a machine learning model that is capable of being used by and/or included in an agent system in accordance with some examples of the present disclosure.

In the example of FIG. 13B, a machine learning system 1312 includes a machine learning model 1315. Machine learning model 1315 is or includes a probabilistic or statistical machine learning model that uses a modeling function 1316 to model the relationship between model input 1314 (e.g., input feature set X) and model output (e.g., Y, P (Y|X)).

In some examples, the machine learning model 1315 is configured as a discriminative model such that the machine learning model 1315 produces output that indicates the probabilistic or statistical likelihood of an output Y given an input X. Some examples of the machine learning model 1315 are alternatively or additionally configured as a generative model. In some examples, a machine learning model performs both discriminative and generative tasks.

One illustrative example of a discriminative model is a logistic regression function. Mathematically, a simplified form of the logistic function is capable of being expressed as $$P(X) = f(x) = \frac{1}{1 + e^{-(\beta_0 + \beta_1 x)}},$$

where e is the exponential constant and $\beta_0$ and $\beta_1$ are feature coefficients. During training of the logistic regression model 1315, logistic regression estimates the values of the coefficients in the linear combination based on the feature values in the training data set. The machine learning model 1315 is configured (e.g., values of model parameters are adjusted) via training, calibration, and validation processes such as those described with reference to FIG. 13A.

The machine learning model 1315 includes a modeling function 1316. The modeling function 1316 includes feature coefficients 1317. The values of one or more of the feature coefficients 1317 are established via machine learning model training, calibration, and validation processes based on training data sets and/or validation data sets.

In the logistic regression example, the feature coefficients 1317 include a regression coefficient $\beta$ for each feature input x (e.g., $f(i) = \beta_0 + \beta_1 x_{1,i} + \ldots \beta_m x_{m,i}$), where $x_i$ is a particular item of the feature set and m is the number of feature inputs x in the input feature set X 1314. The regression coefficient indicates the relative effect of the particular feature input x of the feature set X on the predicted outcome P (Y|X), e.g., a predicted label or score, based on the values of the feature inputs x in the feature set X 1314. The values of the feature coefficients are initialized and adjusted during model training and calibration.

The machine learning model 1315 also includes model hyperparameters 1318. The values of hyperparameters 1318 are selected or tuned at a global level and generally are not modified based on specific instances of training data. In the logistic regression example, model hyperparameters 1318 include a penalty or regularization parameter (e.g., L1 or L2)

and the C or regularization strength parameter. The penalty or regularization parameter is tunable to adjust model generalization error and regulate overfitting. The C or regularization strength parameter regulates overfitting in conjunction with the penalty. The model hyperparameters 1318 is tuned using, for example, a hyperparameter tuning tool or hyperparameter optimization method.

Some examples of the machine learning model 1315 are configured as a binary classifier or as a scoring model. In a binary classification mode, the output of the machine learning model 1315 indicates whether the model input is or is not associated with a certain output (e.g., either 0 if the input is not mathematically likely to be associated with the output or 1 if the input is mathematically likely to be associated with the output), for a given set of input features. In a scoring mode, the output of the machine learning model 1315 includes a score, which corresponds to a probability of the predicted output (e.g., a numerical value between zero and 1, inclusive).

The model input 1314 (e.g., input feature set X) includes numerical features, categorical features, quantitative values, qualitative values, raw features, compressed representations of raw features (e.g., vector representations or embeddings, and/or other forms of digital content.

In response to an instance of features of feature set X, machine learning model 1315 computes and outputs an estimated output P (Y|X) 1319. The estimated output produced by machine learning model 1315 based on an instance of features of feature set X 1314 is in the form of a binary output or a score, in some examples. The output is stored in a data storage for subsequent lookup or provided to one or more downstream systems, processes, devices, frameworks, and/or services.

The machine learning model 1315 is configured and implemented as a network service, in some examples. In some examples, the machine learning model 1315 is configured using a machine learning library and an application programming interface (API), e.g., via an API call such as ML_library.model(p1, p2, . . . pn), where p indicates a parameter or argument of the call, such as a model hyperparameter or an input feature set identifier. Once configured, the machine learning model 1315 and/or its output is hosted on one or more servers and/or data storage devices for accessibility to one or more requesting processes, systems, devices, frameworks, or services.

The examples shown in FIG. 13B and the accompanying description, above are provided for illustration purposes. This disclosure is not limited to the described examples.

FIG. 13C is a block diagram of a machine learning model that is capable of being used by and/or included in an agent system in accordance with some examples of the present disclosure.

A generative artificial intelligence (GAI) model or generative model uses artificial intelligence technology, e.g., machine learning, neural networks, to machine-generate digital content based on model inputs and the previously existing data with which the model has been trained. Whereas discriminative models are based on conditional probabilities P (y|x), that is, the probability of an output y given an input x, generative models capture joint probabilities P (x, y), that is, the likelihood of x and y occurring together. A generative language model is a particular type of GAI model that is capable of generating content in response to model input. The model input includes a task description, also referred to as a prompt. The task description includes instructions (e.g., natural language instructions such as "please generate a summary of these search results") and/or examples of digital content (e.g., examples of summaries written using a particular writing style or tone). Portions of the task description are in the form of natural language text, such as a question or a statement, in some examples. Alternatively or in addition, a task description or prompt includes non-text forms of content, such as digital imagery and/or digital audio.

In the example of FIG. 13C, a machine learning system 1320 includes a machine learning model 1324. Machine learning model 1324 is or includes a probabilistic or statistical machine learning model that uses a modeling function to model the likelihood of cooccurrence of input feature set X and output Y; e.g., the likelihood of X and Y occurring together. The machine learning model 1324 is configured via training, calibration, and validation processes such as those described with reference to FIG. 13A. Some examples of the machine learning model 1324 are alternatively or additionally configured as a discriminative model. In some examples, a machine learning model performs both discriminative and generative tasks.

The machine learning model 1324 includes a modeling function 1325. The modeling function 1325 includes feature coefficients or weights 1326. The values of one or more of the feature coefficients is established via machine learning model training, calibration, and validation processes based on training data sets and/or validation data sets. The machine learning model 1324 also includes model hyperparameters 1327. The values of model hyperparameters 1327 are selected or tuned at a global level and generally are not modified based on specific instances of training data.

The model input 1322 (e.g., input feature set X) includes numerical features, categorical features, quantitative values, qualitative values, raw features, compressed representations of raw features (e.g., vector representations or embeddings), and/or other forms of digital content.

In response to an instance of model input 1322 (e.g., instance of feature set X), machine learning model 1324 computes and outputs an estimated output P(X,Y) 1328. The estimated output produced by machine learning model 1324 based on a model input 1322 is in the form of an input-output pair and a score or simply includes the highest scoring input-output pair. In some examples, the output is stored in a data storage for subsequent lookup or provided to one or more downstream systems, processes, devices, frameworks, and/or services.

The machine learning model 1324 is configured and implemented as a network service, in some examples. The machine learning model 1324 is configured using a machine learning library and an application programming interface (API), e.g., via an API call such as ML_library.model(p1, p2, . . . pn), where p indicates a parameter or argument of the call, such as a model hyperparameter or an input feature set identifier, in some examples. Once configured, the machine learning model 1324 and/or its output are hosted on one or more servers and/or data storage devices for accessibility to one or more requesting processes, systems, devices, frameworks, or services.

The examples shown in FIG. 13C and the accompanying description, above are provided for illustration purposes. This disclosure is not limited to the described examples.

FIG. 13D is a block diagram of a machine learning model that is capable of being used by and/or included in an agent system in accordance with some examples of the present disclosure.

A specific example of a machine learning model is a deep neural network. Some machine learning models, such as multi-task models, include multiple interconnected deep neural networks. In the example of FIG. 13D, a machine learning system 1330 includes a deep neural network 1334. The deep neural network 1334 is configured via training, calibration, and validation processes such as those described with reference to FIG. 13A. Some examples of the deep neural network 1334 are configured as a discriminative model and/or a generative model. In some examples, a deep neural network 1334 performs both discriminative and generative tasks.

In computer science, deep learning refers to a class of machine learning that uses computer-implemented neural networks to generate predictive output, where the neural networks have one or more internal (or hidden) layers between and in addition to an input layer and an output layer. Each layer in a deep neural network (or deep learning model) performs a set of computational operations on the input to that layer.

Each layer of the neural network includes a set of nodes that each apply an activation function to one or more portions of the input to that layer to produce an output. The activation function performs a nonlinear transformation of the input and sends its output to the next layer of the network. For example, if the output of the activation function is equal to or exceeds a threshold value, the node passes its output to the next layer, but if the output is less than the threshold value, the output passed to the next layer is zero or a null value. The type of activation function used at a node or layer is selected based on the particular predictive task for which the model is configured and/or based on the model architecture. Examples of activation functions include the SoftMax function (for multi-class classification), the sigmoid function (for internal layers), and rectifier functions (e.g., ramp, or Rectified Linear Unit (ReLU)).

The input layer of a deep neural network receives and processes the model input, which includes raw data and/or pre-processed data such as aggregations, derivations, embeddings or vector representations of raw data. In some examples, the output of a layer of the neural network is connected to and used as the input to one or more other layers, such that each layer of the deep learning model creates a different (e.g., progressively more highly processed) set of information relating to the original, raw input (e.g., producing a different representation of the raw input at each layer). Weights are applied to the output of each node of each layer before the output is propagated to the next layer. The weight values are adjusted so that the outputs of some nodes or layers influences the final output more or less than the outputs of other nodes or layers, in some examples. The output layer of the neural network produces the final predictive output, which is made accessible to one or more downstream models, applications, systems, operations, processes or services.

Backpropagation is an example of a method that is often used to train a neural network model. In a feedforward step, the training data is propagated from the input layer through the internal layers to the final output by computing each successive layer's outputs up to and including the final output. A loss function (or cost function, such as cross-entropy, log loss, or squared error loss, or a logistic function) is used to compute error for the final output, for example, based on a comparison of the difference between the output predicted by the model and the expected or target output to the error computed on a previous iteration. The model weights (or parameters or coefficients) are adjusted to reduce the error, iteratively, until the error falls within an acceptable range or the error stops changing by more than a threshold amount (e.g., the model converges). In backpropagation, these iterative weight adjustments are propagated backward from the output layer through the internal layers. The gradient of the loss function or gradient descent (e.g., stochastic gradient descent) is often used in backpropagation.

In some examples, recommendation systems use deep learning models to generate predictive output and use the predictive output to configure or control one or more downstream operations. In some examples, recommendation systems compute statistical or probabilistic predictions that are used to select, rank, or sort digital content items for presentation to users via electronic devices. Examples of downstream operations that are capable of using the predictive output of deep learning recommendation systems include news feeds, automated product recommendations, and automated connection (e.g., friend, follower, or contact) recommendations for online platforms such as social networks. Other examples include systems that support human decision making, such as systems that use artificial intelligence to generate recommendations for health care, financial services, training, education, and/or other fields or topics. Still other examples include control systems that use artificial intelligence to recommend courses of action to other components of automated systems in operational environments, such as "smart" vehicles, appliances, robots, and other automated devices.

In the example of FIG. 13D, the deep neural network 1334 includes an input layer 1335, one or more hidden layers 1336, and an output layer 1337. The input layer 1335 receives one or more batches of model input 1323 (e.g., input feature sets X). In some examples, the input layer 1335 includes a number of nodes that corresponds to the number of input features in a given input feature set X. The output of the input layer 1335 becomes the input to the one or more hidden layers 1336. The output of the one or more hidden layers 1336 becomes the input to the output layer 1337. The output layer 1337 outputs the final predictive output 1338. In some examples, each of the layers of the deep neural network 1334 is fully connected in the sense that the output of each node of each layer is connected to the input of each node of the next subsequent layer. In other examples, the deep neural network 1334 includes portions that are not fully connected.

The deep neural network 1334 is capable of being configured and implemented as a network service. In some examples, the deep neural network 1334 is configured using a machine learning library and an application programming interface (API), e.g., via an API call such as ML_library-.model(p1, p2, . . . pn), where p indicates a parameter or argument of the call, such as a model hyperparameter or an input feature set identifier. Once configured, the deep neural network 1334 and/or its output are hosted on one or more servers and/or data storage devices for accessibility to one or more requesting processes, systems, devices, frameworks, or services.

The input feature set X includes numerical features, categorical features, quantitative values, qualitative values, raw features, compressed representations of raw features (e.g., vector representations or embeddings), natural language, and/or other forms of digital content. Embedding refers to a numerical representation of a set of features, in some examples. An embedding encodes information, e.g., a set of features associated with an entity and/or attribute, relative to an embedding space. Embeddings and embedding spaces are generated by artificial intelligence (AI) models. An embedding is often expressed as a vector, where each dimension of the vector includes a numerical value that is an integer or a real number (e.g., a floating point value). The numerical value assigned to a given dimension of the vector conveys information about the data represented by the embedding, relative to the embedding space, also referred to as a vector space. The embedding space (or vector space) includes all of the possible values of each dimension of the vector. The embedding space is defined by the way in which the AI model used to generate the vector has been trained and configured, including the training data used to train the AI model. In some examples, train as used herein refers to an iterative process of applying an AI algorithm to one or more sets of training data, analyzing the output of the AI model in comparison to expected model output using a loss function (also referred to as a cost function or error function), adjusting values of one or more parameters and/or coefficients of the AI model, and repeating the process until the difference between the actual model output and the expected model output falls within an acceptable range of error or tolerance.

Embedding-based retrieval (EBR) is a method of searching for similar digital content, such as documents or portions of documents. Embedding-based retrieval involves converting digital data, e.g., sets of features, to embeddings and then using a similarity algorithm, such as nearest-neighbor search or cosine similarity, to identify embeddings that are similar to one another. Match or map refers to an exact match or an inexact match, in various examples. Match or map refers to a machine-determined predicted or estimated degree of relevance, similarity or compatibility between entities or data items that satisfies (e.g., meets or exceeds) a threshold level of relevance, similarity or compatibility, where the threshold level of relevance, similarity or compatibility is variable based on the requirements of a particular design or implementation. The threshold level of relevance, similarity, or compatibility is set lower or higher for different types of matching or mapping, in some examples.

In response to an instance of feature set X, deep neural network 1334 computes and outputs a predictive output 1338. The predictive output 1338 is stored in a data storage for subsequent lookup or provided to one or more downstream systems, processes, devices, frameworks, and/or services.

The deep neural network 1334 is configured and implemented as a network service, in some examples. The deep neural network 1334 is configured using a machine learning library and an application programming interface (API), e.g., via an API call such as ML_library.model(p1, p2, . . . pn), where p indicates a parameter or argument of the call, such as a model hyperparameter or an input feature set identifier, in some examples. Once configured, the machine learning model 1306 and/or its output are hosted on one or more servers and/or data storage devices for accessibility to one or more requesting processes, systems, devices, frameworks, or services.

The examples shown in FIG. 13D and the accompanying description, above are provided for illustration purposes. This disclosure is not limited to the described examples.

Figure 13E:
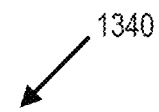

FIG. 13E is a block diagram of a machine learning model that is capable of being used by and/or included in an agent system in accordance with some examples of the present disclosure.

A specific example of a deep neural network is a sequence to sequence model, which takes sequential data such as words, phrases, or images (sequences of characters, tokens, or pixel values) or time series data as input and outputs sequential data. An example of a sequence to sequence model is an encoder-decoder model. In an encoder-decoder model, a first neural network known as an encoder transforms the model input into an encoded version of the model input, e.g., an embedding or vector. In some examples, an encoder transforms a sentence or an image into a sequence of numbers. A second neural network known as the decoder takes the output of the encoder (e.g., the encoded version of the model input) and decodes it. In some examples, a decoder transforms the sequence of numbers created and output by the encoder into a translated sentence or another form of output.

A specific example of an encode-decoder model is a transformer model. A transformer model is a deep neural network encoder-decoder model that uses a technique called attention or self-attention to detect relationships and dependencies among data elements in a sequence. Transformer models are capable of being used to perform various natural language processing (NLP) tasks and other machine learning tasks, such as generating content based on input attributes or tokens. In some examples, the attention mechanism facilitates the detection of relationships and dependencies between words and phrases.

In the example of FIG. 13E, a machine learning system 1340 includes a transformer model 1342. The transformer model 1342 is constructed using a neural network-based machine learning model architecture. In some examples, the neural network-based architecture includes one or more self-attention layers (e.g., multi-head attention layer 1345, masked multi-head attention layer 1355, and multi-head attention layer 1357) that allow the model to assign different weights to different features included in the model input. Alternatively, or in addition, the neural network architecture includes feed-forward layers (e.g., feed-forward layer 1347 and feed-forward layer 1359) and residual connections (e.g., add & norm layer 1346, add & norm layer 1348, add & norm layer 1356, add & norm layer 1358, add & norm layer 1360) that allow the model to machine-learn complex data patterns including relationships between different states, actions, and rewards in multiple different contexts. In some examples, transformer model 1342 is constructed using a transformer-based architecture that includes self-attention layers, feed-forward layers, and residual connections between the layers. The exact number and arrangement of layers of each type as well as the hyperparameter values used to configure the model are determined based on the requirements of a particular design or implementation of the user trajectory processing system.

As shown in FIG. 13E, transformer model 1342 feeds embedded subsequences 1350 into encoder 1344 and decoder 1354. For example, transformer model 1342 feeds inputs of embedded subsequences 1350 into multi-head attention layer 1345 of encoder 1344. In some examples, inputs of embedded subsequences 1350 are a series of tokens and the output of the encoder (e.g., encoder output representation 1352), is a fixed-dimensional representation for each of the tokens of embedded subsequences 1350 including an embedding for inputs of embedded subsequences 1350. Transformer model 1342 feeds encoder output representation 1352 and outputs of embedded subsequences 1350 into decoder 1354 which generates a sequence of tokens based on encoder output representation 1352 and the input embeddings. While a specific architecture of encoder 1344 and decoder 1354 is shown for simplicity, as explained above, the exact number and arrangement of layers of each type as well as the hyperparameter values used to configure the model are determined based on the requirements of a particular design or implementation. Therefore, in some examples, transformer model 1342 includes different numbers, arrangements, and types of layers, such that each input token of embedded subsequences 1350 is fed through the layers of transformer model 1342 and is dependent on other input tokens of embedded subsequences 1350.

Transformer model 1342 illustrates a generic encoder/decoder model for simplicity. In such a model, encoder 1344 encodes the input into a fixed-length vector (e.g., encoder output representation 1352) and decoder 1354 decodes the fixed-length vector into an output sequence. Encoder 1344 and decoder 1354 are trained together to maximize the conditional log-likelihood of the output given the input. Once trained, encoder 1344 and decoder 1354 are capable of generating output given an input sequence or scoring a pair of input-output sequences based on their probability of coexistence.

As shown in FIG. 13E, encoder 1344 includes multi-head attention layer 1345, add & norm layer 1346, feed-forward layer 1347, and add & norm layer 1348. Multi-head attention layer 1345 receives inputs of embedded subsequences 1350 and computes output representations for each of the input tokens of embedded subsequences 1350 based on the inputs of embedded subsequences 1350. For example, multi-head attention layer 1345 converts each input token of embedded subsequences 1350 into queries, keys, and values using query, key, and value matrices. Multi-head attention layer 1345 computes the output representation of the input tokens of embedded subsequences 1350 as the weighted sum of the values of all of the input tokens of embedded subsequences 1350. Multi-head attention layer 1345 computes the weights for the weighted sum by applying a compatibility function to the corresponding key and query for the value. For example, multi-head attention layer 1345 uses a scaled dot product on the key and query of an input token to determine a weight to apply to a value of the input token. Multi-head attention layer 1345 includes multiple attention blocks which each compute an output representation for the input token. Multi-head attention layer 1345 aggregates the output representations of these attention blocks to generate a final output representation for multi-head attention layer 1345.

Transformer model 1342 feeds the output representation generated by multi-head attention layer 1345 and residual connections from the inputs of embedded subsequences 1350 into add & norm layer 1346. By including these residual connections, transformer model 1342 ensures that it does not "forget" features of embedded subsequences 1350 during training. Forgetting in the context of machine learning refers to a phenomenon that occurs as the model continues to be sequentially trained on different datasets over time. Because the model continually adjusts the values of feature coefficients as it is trained on subsequent training datasets, these continuous adjustments of the feature coefficient values is capable of causing the influence of the datasets used earlier in training on those coefficient values to be lost or diluted.

Add & norm layer 1346 sums the output representation generated by multi-head attention layer 1345 and the residual connections from inputs of embedded subsequences 1350 and applies a layer normalization to the result. In some examples, the add & normal layers also apply a SoftMax function to generate action probabilities for the inputs of embedded subsequences 1350. For example, add & norm layer 1346 generates estimated probabilities $\hat{p}(a_k|s)$, where $a_k$ is the action policy and s is the state features.

Transformer model 1342 feeds the normalized output of add & norm layer 1346 into feed-forward layer 1347.

Feed-forward layer 1347 is a feed-forward network that receives the normalized output, feeds it through the hidden layers of feed-forward layer 1347, and then feeds the output of feed-forward layer 1347 into add & norm layer 1348. Feed-forward layer 1347 processes the information received from add & norm layer 1346 and updates the hidden layers of feed-forward layer 1347 based on the information (e.g., during training) and/or generate an output based on the hidden layers processing the information (e.g., during evaluation and/or inference). For example, during training, transformer model 1342 updates the weights of the hidden layers of feed-forward layer 1347 based on the inputs and the loss of the transformer system. Further details with regard to the loss of the transformer system as well as training objectives and metrics are discussed below. As an alternative example, during evaluation and/or inference, the weights of the hidden layers of feed-forward layer 1347 are used to determine the output representation 1352 of each of the input tokens of embedded subsequences 1350.

Transformer model 1342 feeds the output of feed-forward layer 1347 into add & norm layer 1348 as well as residual connections from the output of add & norm layer 1346. Add & norm layer 1348 sums the output of feed-forward layer 1347 with the residual connections from add & norm layer 1346 and applies a layer normalization to the result to generate encoder output representation 1352. Transformer model 1342 feeds encoder output representation 1352 into multi-head attention layer 1357 of decoder 1354 as explained below.

Masked multi-head attention layer 1355 receives outputs of embedded subsequences 1350 and computes representations for each of the output tokens of embedded subsequences 1350 based on masked outputs of embedded subsequences 1350. For example, masked multi-head attention layer 1355 computes representations for each of the output tokens of embedded subsequences 1350 based on previous output tokens while masking future output tokens. Masked multi-head attention layer 1355 therefore only computes representations using tokens that come before the token masked multi-head attention layer 1355 is trying to predict.

Transformer model 1342 feeds the representation generated by masked multi-head attention layer 1355 and residual connections from the outputs of embedded subsequences 1350 into add & norm layer 1356. Add & norm layer 1356 sums the representation generated by masked multi-head attention layer 1355 and the residual connections from outputs of embedded subsequences 1350 and applies a layer normalization to the result.

Transformer model 1342 feeds the normalized output of add & norm layer 1356 into multi-head attention layer 1357. Multi-head attention layer 1357 receives the normalized output of add & norm layer 1356 as well as encoder output representation 1352 from encoder 1344 and generates a representation based on both.

Transformer model 1342 feeds the representation generated by multi-head attention layer 1357 and residual connections from the output of add & norm layer 1356 into add & norm layer 1358. Add & norm layer 1358 sums the representation generated by multi-head attention layer 1357 and the residual connections from the output of add & norm layer 1356 and applies a layer normalization to the result.

Transformer model 1342 feeds the normalized output of add & norm layer 1358 into feed-forward layer 1359. Feed-forward layer 1359 is a feed-forward network that receives the normalized output, feeds it through the hidden layers of feed-forward layer 1359, and then feeds the output of feed-forward layer 1359 into add & norm layer 1369.

Feed-forward layer 1359 processes the information received from add & norm layer 1358 and updates the hidden layers of feed-forward layer 1359 based on the information (e.g., during training) and/or generate an output based on the hidden layers processing the information (e.g., during evaluation and/or inference). For example, during training, transformer model 1342 updates the weights of the hidden layers of feed-forward layer 1359 based on the inputs and the loss of the transformer system. Further details with regard to the loss of the transformer system as well as training objectives and metrics are discussed below. As an alternative example, during evaluation and/or inference, the weights of the hidden layers of feed-forward layer 1359 are used to determine the output of feed-forward layer 1359.

Transformer model 1342 feeds the output of feed-forward layer 1359 into add & norm layer 1360 as well as residual connections from the output of add & norm layer 1358. Add & norm layer 1360 sums the output of feed-forward layer 1359 with the residual connections from add & norm layer 1358 and applies a layer normalization to the result to generate an output.

Transformer model 1342 generates output probabilities 1362 from the output of add & norm layer 1360. For example, transformer model 1342 applies a linear transformation and a SoftMax function to the output of add & norm layer 1360 to generate a normalized vector of output probabilities 1362.

In some examples, such as during training, transformer model 1342 determines a loss for the system based on output probabilities 1362. In some examples, transformer model 1342 uses deep quantile regression for training. In such an example, output probabilities 1362 includes a mean prediction probability and estimations for the upper and lower bounds of the range of prediction such that output probabilities 626 includes an uncertainty range. In one example, the loss function of transformer model 1342 using deep quantile regression is represented by the following equation:

$$\mathcal{L}(\xi_i | \alpha) = \begin{cases} \alpha \xi_i \text{ if } \xi_i \geq 0, \\ (\alpha - 1)\xi_i \text{ if } \xi_i < 0 \end{cases},$$

where $\alpha$ is the required quantile (a value between 0 and 1 representing the desired quantile) and $\xi_i = y_i - f(x_i)$, where $f(x_i)$ is the mean predicted by output probabilities 1362, $y_i$ are the outputs of embedded subsequences 1350 and $x_i$ are the inputs of embedded subsequences 1350. The loss over the entirety of a dataset of embedded subsequences 1350 where embedded subsequences 1350 has a length of N is capable of being represented by the following equation:

$$\mathcal{L}(y, f | \alpha) = \frac{1}{N} \sum_{i=1}^{N} \mathcal{L}(y_i - f(x_i) | \alpha).$$

In such examples, output probabilities 1362 includes three values: a mean prediction, a lower bound quantile, and an upper bound quantile. In some examples, transformer model 1342 uses upper confidence bound or Thompson sampling. In some examples, transformer model 1342 determines model output 1364 based on the mean prediction, the lower bound quantile, and the upper bound quantile based on upper confidence bound and/or Thompson sampling.

In some examples, transformer model 1342 is trained to optimize the model parameters with trajectory-specific normalizations using cross-entropy loss. For example, transformer model 1342 uses a loss function represented by the following equation:

$$L(\theta) = \frac{1}{N_{traj}} \sum_{i}^{N_{traj}} \sum_{t=1}^{T_i} w_i \sum_{k} \log(\hat{p}(a_k^{(it)}|s^{(it)})),$$

where $N_{traj}$ is the trajectory count, $w_i$ is the normalization weight, $\alpha_k^{(it)}$ is the predicted action for the trajectory i at timestep t, and $s^{(it)}$ is the state of the online system for the trajectory i at timestep t. In some examples, transformer model 1342 uses trajectory-wise normalization. In some examples, the add & norm layers of transformer model 1342 normalize the weights according to the following equation:

$$w_i = \frac{1}{T_i},$$

where $T_i$ is the length of trajectory i. In some examples, transformer model 1342 uses global normalization. In some examples, the add & norm layers of transformer model 1342 normalize the weights according to the following equation: $w_i$=c, where c is a positive scalar. In some examples, the scalar c is predetermined.

Language models, including large language models and other generative models, are capable of being implemented using transformer models. A generative model is commonly constructed using a neural network-based machine learning model architecture. In some examples, the neural network-based architecture includes one or more input layers that receive task descriptions (or prompts), generate one or more embeddings based on the task descriptions, and pass the one or more embeddings to one or more other layers of the neural network. In other examples, the one or more embedding are generated based on the task description by a pre-processor, the embeddings are input to the generative language model, and the generative language model outputs digital content, e.g., natural language text or a combination of natural language text and non-text output, based on the embeddings.

The neural network-based machine learning model architecture of the generative model often includes one or more self-attention layers that allow the model to assign different weights to different portions of the model input (e.g., different words or phrases included in the model input). Alternatively or in addition, the neural network architecture includes feed-forward layers and residual connections that allow the model to machine-learn complex data patterns including relationships between different words or phrases in multiple different contexts. The language model or other type of generative model is capable of being constructed using a transformer-based architecture that includes self-attention layers, feed-forward layers, and residual connections between the layers. The exact number and arrangement of layers of each type as well as the hyperparameter values used to configure the model are determined based on the requirements of a particular design or implementation.

In some examples, the neural network-based machine learning model architecture of a generative model includes or is based on one or more generative transformer models, one or more generative pre-trained transformer (GPT) models, one or more bidirectional encoder representations from transformers (BERT) models, one or more large language models (LLMs), one or more XLNet models, and/or one or more other natural language processing (NL) models that significantly advance the state-of-the-art in various linguistic tasks such as machine translation, sentiment analysis, question answering and sentence similarity. In some examples, the neural network-based machine learning model architecture includes or is based on one or more predictive content neural models that receive digital content input and generate one or more outputs based on processing the digital content with one or more neural network models. Examples of predictive neural models include, but are not limited to, Generative Pre-Trained Transformers (GPT), BERT, and/or Recurrent Neural Networks (RNNs). In some examples, one or more types of neural network-based machine learning model architecture includes or is based on one or more multimodal neural networks capable of outputting different modalities (e.g., text, image, sound, etc.) separately and/or in combination based on digital content input. Accordingly, in some examples, a multimodal neural network is capable of outputting digital content that includes a combination of two or more of text, images, video or sound.

A generative language model is capable of being trained on a large dataset of natural language text. In some examples, training samples of natural language text extracted from publicly available data sources are used to train a generative language model. The size and composition of the dataset used to train the generative language model are variable according to the requirements of a particular design or implementation. In some examples, the dataset used to train the generative language model includes hundreds of thousands to millions or more different natural language text training samples. In some examples, a generative language model includes multiple generative language models trained on differently sized datasets. In some examples, a generative language model includes a comprehensive but low capacity model that is trained on a large data set and used for generating examples. The same generative language model also includes a less comprehensive but high capacity model that is trained on a smaller data set, such that the high capacity model is used to generate outputs based on data obtained from the low capacity model. In some examples, reinforcement learning is used to further improve the output of the generative language model. In reinforcement learning, ground-truth examples of desired model output are paired with respective prompts, and these prompt-output pairs are used to train or fine tune the generative language model.

Prompt engineering is a technique used to optimize the structure and/or content of a prompt input to a generative model. Some prompts include examples of outputs to be generated by the generative model (e.g., few-shot prompts), while other prompts include no examples of outputs to be generated by the generative model (e.g., zero-shot prompts). Chain of thought prompting is a prompt engineering technique where the prompt includes a request that the model explain reasoning in the output. For example, the generative model performs the task described in the prompt using a series of steps and outputs reasoning as to each step performed.

Supervised learning is a method of training (or fine-tuning) a machine learning model given input-output pairs, where the output of the input-output pair is known (e.g., an expected output, a labeled output, a ground truth). Other training methods including semi-supervised learning or federated learning are capable of being used to train a machine learning model or to fine-tune a pretrained machine learning model.

To train or fine tune a language model, a prompt is provided as input to the machine learning model. The prompt includes natural language instructions, queries, examples, etc. The machine learning model generates output by applying the weights and nodes of the machine learning model to the prompt. Error is determined by comparing the model output to a reference or expected output over many iterations. For example, changes in the similarity between the model output and the expected output are evaluated over time using a similarity metric or model performance metric. The error is used to adjust the value of weights in a weight matrix included in the machine learning model and/or to adjust the number of layers and/or arrangement of layers included in the machine learning model until an acceptable level of error is achieved.

A machine learning model is trained using a backpropagation algorithm, in some examples. The backpropagation algorithm operates by propagating the error through each of the algorithmic weights of the machine learning model such that the algorithmic weights are adjusted based on the amount of error. The error is calculated at each iteration, batch, and/or epoch. The error is computed using a loss function. An example loss function includes the cross-entropy error function. After a number of training iterations, the machine learning model iteratively converges, e.g., adjusts weight values over time until the model output achieves an acceptable level of accuracy or reliability (e.g., accuracy satisfies a defined tolerance or confidence level). The values of the weights of the trained model (e.g., after convergence) are stored such that the machine learning model is capable of being deployed during inference time.

The machine learning model 1342 is configured and implemented as a network service, in some examples. The machine learning model 1332 is configured using a machine learning library and an application programming interface (API), e.g., via an API call such as ML_library.model(p1, p2, . . . pn), where p indicates a parameter or argument of the call, such as a model hyperparameter or an input identifier. Once configured, the machine learning model 1342 and/or its output are hosted on one or more servers and/or data storage devices for accessibility to one or more requesting processes, systems, devices, frameworks, or services.

The examples shown in FIG. 13E and the accompanying description, above are provided for illustration purposes. This disclosure is not limited to the described examples.

FIG. 14 is a block diagram of an example computer system including components of an agent system in accordance with some examples of the present disclosure.

In FIG. 14, an example machine of a computer system 1400 is shown, within which a set of instructions for causing the machine to perform any of the methodologies discussed herein are capable of being executed. In some examples, the computer system 1400 corresponds to a component of a networked computer system (e.g., any one or more of the components shown in FIG. 1, FIG. 3, FIG. 4, FIG. 6, FIG. 9, or FIG. 12) that includes, is coupled to, or utilizes a machine to execute an operating system to perform operations corresponding to any one or more components shown in FIG. 1, FIG. 3, FIG. 4, FIG. 6, FIG. 9, or FIG. 12. For example, computer system 1400 corresponds to a portion of a computing system when the computing system is executing a portion of any one or more components shown in FIG. 1, FIG. 3, FIG. 4, FIG. 6, FIG. 9, or FIG. 12.

The machine is connected (e.g., networked) to other machines in a network, such as a local area network (LAN), an intranet, an extranet, and/or the Internet. The machine operates in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a wearable device, a server, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any of the methodologies discussed herein.

The example computer system 1400 includes a processing device 1402, a main memory 1404 (e.g., read-only memory (ROM), flash memory, dynamic random access memory (DRAM) such as synchronous DRAM (SDRAM) or Rambus DRAM (RDRAM), etc.), a memory 1403 (e.g., flash memory, static random access memory (SRAM), etc.), an input/output system 1410, and a data storage system 1440, which communicate with each other via a bus 1430.

Processing device 1402 represents one or more general-purpose processing devices such as a microprocessor, a central processing unit, or the like. In some examples, the processing device is a complex instruction set computing (CISC) microprocessor, reduced instruction set computing (RISC) microprocessor, very long instruction word (VLIW) microprocessor, or a processor implementing other instruction sets, or processors implementing a combination of instruction sets. In some examples, processing device 1402 includes a special-purpose processing device such as an application specific integrated circuit (ASIC), a field programmable gate array (FPGA), a digital signal processor (DSP), network processor, or the like. The processing device 1402 is to execute instructions 1412 for performing the operations and steps discussed herein.

In some examples of FIG. 14, agent system 1450 represents portions of automated agent 902 or distributed multi-agent system 905 or agent system 1280 while the computer system 1400 is executing those portions of automated agent 902 or distributed multi-agent system 905 or agent system 1280. Instructions 1412 include portions of agent system 1450 when those portions of the agent system 1450 are being executed by processing device 1402. Thus, the agent system 1450 is shown in dashed lines as part of instructions 1412 to illustrate that, at times, portions of the agent system 1450 are executed by processing device 1402. For example, when at least some portion of the agent system 1450 is embodied in instructions to cause processing device 1402 to perform the method(s) described herein, some of those instructions are read into processing device 1402 (e.g., into an internal cache or other memory) from main memory 1404 and/or data storage system 1440. In some examples, it is not required that all of the agent system 1450 be included in instructions 1412 at the same time and portions of the agent system 1450 are stored in another component of computer system 1400 at other times, e.g., when a portion of the agent system 1450 is not being executed by processing device 1402.

The computer system 1400 further includes a network interface device 1408 to communicate over the network 1420. Network interface device 1408 provides a two-way data communication coupling to a network. In some examples, network interface device 1408 includes an integrated-services digital network (ISDN) card, cable modem, satellite modem, or a modem to provide a data communication connection to a corresponding type of telephone line. In some examples, network interface device 1408 includes a local area network (LAN) card to provide a data communication connection to a compatible LAN. Wireless links are included, in some examples. Network interface device 1408 sends and receives electrical, electromagnetic, or optical signals that carry digital data representing various types of information.

The network link is capable of providing data communication through one or more networks to other data devices. In some examples, a network link provides a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 1400.

Computer system 1400 is capable of sending messages and receiving data, including program code, through the network(s) and network interface device 1408. In some examples, a server is capable of transmitting a requested code for an application program through the Internet and network interface device 1408. The received code is executed by processing device 1402 as it is received, and/or stored in data storage system 1440 or other non-volatile storage for later execution.

The input/output system 1410 includes an output device, such as a display, for example a liquid crystal display (LCD) or a touchscreen display, for displaying information to a computer user, or a speaker, a haptic device, or another form of output device. The input/output system 1410 includes an input device, for example, alphanumeric keys and other keys configured for communicating information and command selections to processing device 1402. An input device sometimes includes a cursor control, such as a mouse, a trackball, or cursor direction keys for communicating direction information and command selections to processing device 1402 and for controlling cursor movement on a display. An input device sometimes includes a microphone, a sensor, or an array of sensors, for communicating sensed information to processing device 1402. Examples of sensed information include voice commands, audio signals, geographic location information, haptic information, and/or digital imagery, for example.

The data storage system 1440 includes a machine-readable storage medium 1442 (also known as a computer-readable medium) on which is stored instructions 1444 or software embodying any of the methodologies or functions described herein. The instructions 1444 sometimes reside, completely or at least partially, within the main memory 1404 and/or within the processing device 1402 during execution thereof by the computer system 1400, the main memory 1404 and the processing device 1402 also constituting machine-readable storage media. In one example, the instructions 1444 include instructions to implement functionality corresponding to an automated agent or agent system (e.g., any one or more of the components shown in any one or more components shown in FIG. 1, FIG. 3, FIG. 4, FIG. 6, and/or portions of computing system 900 of FIG. 9 or agent system 1280 of FIG. 12).

Dashed lines are used in FIG. 14 to indicate that it is not required that the agent system be embodied entirely in instructions 1412, 1414, and 1444 at the same time. In one example, portions of the agent system are embodied in instructions 1414, which are read into main memory 1404 as instructions 1414, and portions of instructions 1412 are read into processing device 1402 as instructions 1412 for execution. In another example, some portions of the agent system are embodied in instructions 1444 while other portions are embodied in instructions 1414 and still other portions are embodied in instructions 1412.

While the machine-readable storage medium 1442 is shown in an example to be a single medium, the term "machine-readable storage medium" should be taken to include a single medium or multiple media that store the instructions. The term "machine-readable storage medium" shall also be taken to include any medium that is capable of storing or encoding a set of instructions for execution by the machine and that cause the machine to perform any of the methodologies of the present disclosure. The term "machine-readable storage medium" shall accordingly be taken to include, but not be limited to, solid-state memories, optical media, and magnetic media.

The examples shown in FIG. 14 and the accompanying description, above are provided for illustration purposes. This disclosure is not limited to the described examples.

Some portions of the preceding detailed description have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure refers to actions and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations described herein. This apparatus is specially constructed for the intended purposes, in some examples. In other examples, the apparatus includes a general-purpose computer selectively activated or reconfigured by a computer program stored in the computer. In some examples, a computer system or other data processing system including any one or more of the components shown in FIG. 1, FIG. 2A-2C, FIG. 3, FIG. 4, FIG. 6, FIG. 9, FIG. 10, FIG. 11A-11B, FIG. 12, and/or FIG. 13A-13E, carries out the above-described computer-implemented methods in response to its processor executing a computer program (e.g., a sequence of instructions) contained in a memory or other non-transitory machine-readable storage medium. Such a computer program is be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems are capable of being used. A more specialized apparatus is constructed, in some examples. Examples of structure for these systems are provided in the description. Aspects of this disclosure are not limited to any particular programming language. A variety of programming languages are usable to implement the various aspects of this disclosure.

Some examples of the present disclosure are provided as a computer program product, or software, which includes a machine-readable medium having stored thereon instructions, which is used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The techniques described herein are capable of being implemented with privacy safeguards to protect user privacy. Furthermore, the techniques described herein are capable of being implemented with user privacy safeguards to prevent unauthorized access to personal data and confidential data. The training of the AI models described herein is executed to benefit all users fairly, without causing or amplifying unfair bias.

According to some examples, the techniques for the models described herein do not make inferences or predictions about individuals unless requested to do so through an input. According to some examples, the models described herein do not learn from and are not trained on user data without user authorization. In instances where user data is permitted and authorized for use in AI features and tools, it is done in compliance with a user's visibility settings, privacy choices, user agreement and descriptions, and the applicable law. According to the techniques described herein, users are capable of having full control over the visibility of their content and who sees their content, as is controlled via the visibility settings. According to the techniques described herein, users are capable of having full control over the level of their personal data that is shared and distributed between different AI platforms that provide different functionalities.

According to the techniques described herein, users are capable of choosing to share personal data with different platforms to provide services that are more tailored to the users. In instances where the users choose not to share personal data with the platforms, the choices made by the users will not have any impact on their ability to use the services that they had access to prior to making their choice.

According to the techniques described herein, users are capable of having full control over the level of access to their personal data that is shared with other parties. According to the techniques described herein, personal data provided by users is capable of being processed to determine prompts when using a generative AI feature at the request of the user, but not to train generative AI models. In some examples, users are capable of providing feedback while using the techniques described herein, which is capable of being used to improve or modify the platform and products. In some examples, any personal data associated with a user, such as personal information provided by the user to the platform, is deleted from storage upon user request. In some examples, personal information associated with a user is permanently deleted from storage when a user deletes their account from the platform.

According to the techniques described herein, personal data is capable of being removed from any training dataset that is used to train AI models. In some examples, the techniques described herein utilize tools for anonymizing member and customer data. A user's personal data is capable of being redacted and minimized in training datasets for training AI models through delexicalization tools and other privacy enhancing tools for safeguarding user data. The techniques described herein are capable of minimizing use of any personal data in training AI models, including removing and replacing personal data. In examples of the techniques described herein, notices are communicated to users to inform how their data is being used and users are provided controls to opt-out from their data being used for training AI models.

According to some examples, tools are used with the techniques described herein to identify and mitigate risks associated with AI in all products and AI systems. In some examples, notices are provided to users when AI tools are being used to provide features.

Illustrative examples of the technologies disclosed herein are provided below. An example of the technologies includes any of the examples described herein, or any combination of any of the examples described herein, or any combination of any portions of the examples described herein.

In some aspects, the techniques described herein relate to an apparatus including: a processor; a first memory including an action store, wherein the action store includes a hierarchical arrangement of memory layers and a plurality of actions stored in one or more of the memory layers, and the action store stores first mappings among actions and second mappings among actions and memory layers, wherein the first mappings among actions are hierarchical and an action is executable by an agent; and a second memory including an instruction to cause the processor to create or update the first mappings, the second mappings, or the first mappings and the second mappings, in response to a signal received from the agent via a device, the signal indicating (i) input including a task, (ii) feedback relating to an execution of one of the actions by the agent, (iii) performance data associated with the action, or any combination of (i), (ii), (iii).

In some aspects, the techniques described herein relate to an apparatus, wherein the action includes metadata and the metadata includes an indication of a security level associated with action, or a performance metric associated with the action, or the indication of the security level and the performance metric, and wherein the instruction is to control access to the action according to the indication of the security level and a rule, or the performance metric and the rule, or the security level, the performance metric, and the rule.

In some aspects, the techniques described herein relate to an apparatus, wherein the first memory is indexed by computing an embedding of the action and mapping the embedding to the action stored in the action store.

In some aspects, the techniques described herein relate to an apparatus, wherein the memory layers include a first layer storing a first action and a second layer storing a second action, wherein a first security policy is associated with the first layer, a second security policy, different from the first security policy, is associated with the second layer, and wherein the instruction is to cause the processor to control access to the first layer according to the first security policy and control access to the second layer according to the second security policy.

In some aspects, the techniques described herein relate to an apparatus, wherein the instruction is to cause the processor to (i) move the first action from the first layer to the second layer, (ii) move the second action from the second layer to the first layer, (iii) combine a plurality of actions into the first action, (iv) expand the first action into a plurality of actions, or any combination of (i), (ii), (iii), (iv).

In some aspects, the techniques described herein relate to a computer-implemented method including: using an input to determine a task, wherein the input is obtained via a device and an agent accessible via the device; using the task to search an action store, wherein the action store includes a hierarchical arrangement of actions executable by the agent; in response to determining that the action store includes an action that corresponds to the task, providing access to the action to the agent; and triggering the agent to execute the action.

In some aspects, the techniques described herein relate to a method, further including: providing the input and a first instruction to a machine learning model, wherein the first instruction is to cause the machine learning model to determine the task; and receiving the task from the machine learning model in response to the first instruction.

In some aspects, the techniques described herein relate to a method, further including: providing the task and a second instruction to the machine learning model, wherein the second instruction is to cause the machine learning model to identify the action that corresponds to the task using embedding-based retrieval retrieval-augmented generation, or embedding-based retrieval and retrieval-augmented generation; and receiving the identified action from the machine learning model in response to the second instruction.

In some aspects, the techniques described herein relate to a method, wherein the second instruction is to instruct the machine learning model to determine requirements for performing the task and to determine whether the action is capable of performing the requirements.

In some aspects, the techniques described herein relate to a method, further including: in response to determining that the action is not capable of performing the requirements, providing the task and a third instruction to the machine learning model, wherein the third instruction is to cause the machine learning model to iteratively decompose the task into sub-tasks until the action is capable of performing the sub-tasks.

In some aspects, the techniques described herein relate to a method, further including: providing the task and a fourth instruction to the machine learning model, wherein the fourth instruction is to cause the machine learning model to identify a plurality of actions that correspond to the task, rank the plurality of actions according to a first criterion associated with the task, and select the action from the ranked plurality of actions according to a second criterion associated with the task; and receiving the selected action from the machine learning model in response to the fourth instruction.

In some aspects, the techniques described herein relate to a method, further including: in response to determining that a value of a performance metric associated with a first version of the action stored in a first layer of a multi-layer memory meets or exceeds a performance criterion, providing access to the agent to execute the first version of the action from the first layer of the multi-layer memory.

In some aspects, the techniques described herein relate to a method, wherein the agent is a robot or self-driving vehicle.

In some aspects, the techniques described herein relate to a method, further including: determining a mutability characteristic of the action, wherein the mutability characteristic is an indication of ability of the agent to self-mutate by executing the action; and using the mutability characteristic to control the access to the action by the agent.

In some aspects, the techniques described herein relate to a computer-implemented method including: receiving a signal via an agent, wherein the signal relates to a first execution of a task by the agent using an action store, wherein the action store includes a hierarchical arrangement of memory layers, and the action store includes a plurality of actions stored in one or more of the memory layers, and the action store stores first mappings between actions and second mappings between actions and memory layers, wherein the first mappings among actions are hierarchical, and an action is executable by the agent; using the signal to modify the action store; and providing the modified portion of the action store to a second execution of the task by the agent.

In some aspects, the techniques described herein relate to a method, further including: using the signal to create or update the first mappings, the second mappings, or the first mappings and the second mappings.

In some aspects, the techniques described herein relate to a method, further including: in response to the signal, (i) moving the action from a first layer of the memory layers to a second layer of the memory layers, (ii) moving the action from the second layer to the first layer, or any combination of (i) and (ii).

In some aspects, the techniques described herein relate to a method, further including: using the signal and a trajectory optimization mechanism to combine a plurality of actions into the action or expand the action into a plurality of actions.

In some aspects, the techniques described herein relate to a method, wherein the task includes detecting and blocking malicious access to a cloud service and the agent is fully autonomous security software executing on a user computing device.

In some aspects, the techniques described herein relate to a method, wherein the agent is a robot or self-driving vehicle.

In some aspects, the techniques described herein relate to a method, system, apparatus, or non-transitory computer readable medium comprising any combination of any of the aspects shown or described anywhere in this disclosure, including in any of (i) the preceding claims, (ii) the specification, (iii) the drawings, or (iv) any combination of (i), (ii), (iii).

Clause 1. An apparatus comprising: a processor; a first memory comprising an action store (128), wherein the action store (128) comprises a hierarchical arrangement of memory layers (132) and a plurality of actions stored in one or more of the memory layers, and the action store stores first mappings (134) among actions and second mappings (136) among actions and memory layers, wherein the first mappings among actions are hierarchical and an action is executable by an agent (902); and a second memory comprising an instruction to cause the processor to create or update the first mappings (134).the second mappings (136), or the first mappings (134) and the second mappings (136), in response to a signal received from the agent (902) via a device, the signal indicating (i) input comprising a task, (ii) feedback relating to an execution of one of the actions by the agent, (iii) performance data associated with the action, or any combination of (i), (ii), (iii).

Clause 2. The apparatus of clause 1, wherein the action comprises metadata and the metadata comprises an indication of a security level associated with action, or a performance metric associated with the action, or the indication of the security level and the performance metric, and wherein the instruction is to control access to the action according to the indication of the security level and a rule, or the performance metric and the rule, or the security level, the performance metric, and the rule.

Clause 3. The apparatus of clause 1 or clause 2, wherein the first memory is indexed by computing an embedding of the action and mapping the embedding to the action stored in the action store.

Clause 4. The apparatus of any preceding clause, wherein the memory layers comprise a first layer storing a first action and a second layer storing a second action, wherein a first security policy is associated with the first layer, a second security policy, different from the first security policy, is associated with the second layer, and wherein the instruction is to cause the processor to control access to the first layer according to the first security policy and control access to the second layer according to the second security policy.

Clause 5. The apparatus of clause 4, wherein the instruction is to cause the processor to (i) move the first action from the first layer to the second layer, (ii) move the second action from the second layer to the first layer, (iii) combine a plurality of actions into the first action, (iv) expand the first action into a plurality of actions, or any combination of (i), (ii), (iii), (iv).

Clause 6. A computer-implemented method comprising: using an input to determine a task, wherein the input is obtained via a device and an agent (902) accessible via the device; using the task to search an action store, wherein the action store comprises a hierarchical arrangement of actions executable by the agent (902); in response to determining that the action store comprises an action that corresponds to the task, providing access to the action to the agent (902); and triggering the agent (902) to execute the action.

Clause 7. The method of clause 6, further comprising: providing the input and a first instruction to a machine learning model, wherein the first instruction is to cause the machine learning model to determine the task; and receiving the task from the machine learning model in response to the first instruction.

Clause 8. The method of clause 7, further comprising: providing the task and a second instruction to the machine learning model, wherein the second instruction is to cause the machine learning model to identify the action that corresponds to the task using embedding-based retrieval retrieval-augmented generation, or embedding-based retrieval and retrieval-augmented generation; and receiving the identified action from the machine learning model in response to the second instruction.

Clause 9. The method of clause 8, wherein the second instruction is to instruct the machine learning model to determine requirements for performing the task and to determine whether the action is capable of performing the requirements.

Clause 10. The method of clause 9, further comprising: in response to determining that the action is not capable of performing the requirements, providing the task and a third instruction to the machine learning model, wherein the third instruction is to cause the machine learning model to iteratively decompose the task into sub-tasks until the action is capable of performing the sub-tasks.

Clause 11. The method of clause 7, further comprising: providing the task and a fourth instruction to the machine learning model, wherein the fourth instruction is to cause the machine learning model to identify a plurality of actions that correspond to the task, rank the plurality of actions according to a first criterion associated with the task, and select the action from the ranked plurality of actions according to a second criterion associated with the task; and receiving the selected action from the machine learning model in response to the fourth instruction.

Clause 12. The method of clause 7, further comprising: in response to determining that a value of a performance metric associated with a first version of the action stored in a first layer of a multi-layer memory meets or exceeds a performance criterion, providing access to the agent to execute the first version of the action from the first layer of the multi-layer memory.

Clause 13. The method of clause 7, wherein the agent is a fully autonomous physical robot or self-driving vehicle.

Clause 14. The method of clause 7, further comprising: determining a mutability characteristic of the action, wherein the mutability characteristic is an indication of ability of the agent to self-mutate by executing the action; and using the mutability characteristic to control the access to the action by the agent.

Clause 15. A computer-implemented method comprising: receiving a signal via an agent (902), wherein the signal relates to a first execution of a task by the agent (902) using an action store (128), wherein the action store comprises a hierarchical arrangement of memory layers (132), and the action store comprises a plurality of actions stored in one or more of the memory layers, and the action store stores first mappings (134) between actions and second mappings (136) between actions and memory layers, wherein the first mappings among actions are hierarchical, and an action is executable by the agent (902); using the signal to modify the action store; and providing the modified portion of the action store to a second execution of the task by the agent (902).

Clause 16. The method of clause 15, further comprising: using the signal to create or update the first mappings, the second mappings, or the first mappings and the second mappings.

Clause 17. The method of clause 15 or clause 16, further comprising: in response to the signal, (i) moving the action from a first layer of the memory layers to a second layer of the memory layers, (ii) moving the action from the second layer to the first layer, or any combination of (i) and (ii).

Clause 18. The method of any of clauses 15-17, further comprising: using the signal and a trajectory optimization mechanism to combine a plurality of actions into the action or expand the action into a plurality of actions.

Clause 19. The method of any of clauses 15-17, wherein the task comprises detecting and blocking malicious access to a cloud service and the agent is fully autonomous security software executing on a user computing device.

Clause 20. The method of any of clauses 15-17, wherein the agent is a fully autonomous physical robot or self-driving vehicle.

Clause 21. A method, system, apparatus, or non-transitory computer readable medium comprising any combination of any of the aspects shown or described anywhere in this disclosure, including in any of (i) the preceding claims, (ii) the specification, (iii) the drawings, or (iv) any combination of (i), (ii), (iii).

Aspects of the disclosure have been described with reference to specific examples thereof. The described examples are modifiable without departing from the spirit and scope of the disclosure reflected in the claims. The specification and drawings are illustrative and not restrictive.

What is claimed is:

1. An apparatus comprising:
a processor;
a first memory comprising an action store, wherein the action store comprises a hierarchical arrangement of memory layers and a plurality of actions stored in one or more of the memory layers, and the action store stores first mappings among the plurality of actions and second mappings among the plurality of actions and one or more of the memory layers, wherein the first mappings among the plurality of actions are hierarchical and an action of the plurality of actions is executable by an agent; and
a second memory comprising an instruction to cause the processor to update the first mappings or the second mappings in response to a signal received from a device, the signal relating to (i) a requested task, (ii) an execution of the action by the agent, (iii) performance data associated with the action, or any combination of (i), (ii), (iii);
wherein the memory layers comprise a first layer storing a first action and a second layer storing a second action, wherein a first security policy is associated with the first layer, a second security policy, different from the first security policy, is associated with the second layer, and wherein the instruction is to cause the processor to control access to the first layer according to the first security policy and control access to the second layer according to the second security policy.

2. The apparatus of claim 1, wherein the action comprises metadata and the metadata comprises an indication of a security level associated with the action, or a performance metric associated with the action, or the indication of the security level and the performance metric, and wherein the instruction is to control access to the action according to the indication of the security level and a rule, or the performance metric and the rule, or the security level, the performance metric, and the rule.

3. The apparatus of claim 1, wherein the first memory is indexed by computing an embedding of the action and mapping the embedding to the action stored in the action store.

4. The apparatus of claim 1, wherein the instruction is to cause the processor to (i) move the first action from the first layer to the second layer, (ii) move the second action from the second layer to the first layer, (iii) combine a plurality of actions into the first action, (iv) expand the first action into a plurality of actions, or any combination of (i), (ii), (iii), (iv).

5. A computer-implemented method comprising:
using an input to determine a task, wherein the input is obtained via a device and an agent accessible via the device;
using the task to search an action store, wherein the action store comprises a hierarchical arrangement of memory layers and a plurality of actions stored in one or more of the memory layers, wherein the memory layers comprise a first layer storing a first action and a second layer storing a second action, wherein a first security policy is associated with the first layer, a second security policy, different from the first security policy, is associated with the second layer, and wherein an instruction is to cause a processor to control access to the first layer according to the first security policy and control access to the second layer according to the second security policy;
in response to determining that the action store comprises an action that corresponds to the task, providing access to the action to the agent; and
triggering the agent to execute the action.

6. The method of claim 5, further comprising:
providing the input and a first instruction to a machine learning model, wherein the first instruction is to cause the machine learning model to determine the task; and
receiving the task from the machine learning model in response to the first instruction.

7. The method of claim 6, further comprising:
providing the task and a second instruction to the machine learning model, wherein the second instruction is to cause the machine learning model to identify the action that corresponds to the task using embedding-based retrieval, retrieval-augmented generation, or embedding-based retrieval and retrieval-augmented generation; and
receiving the identified action from the machine learning model in response to the second instruction.

8. The method of claim 7, wherein the second instruction is to instruct the machine learning model to determine requirements for performing the task and to determine whether the action is capable of performing the requirements.

9. The method of claim 8, further comprising:
in response to determining that the action is not capable of performing the requirements, providing the task and a third instruction to the machine learning model, wherein the third instruction is to cause the machine learning model to iteratively decompose the task into sub-tasks until the action is capable of performing the sub-tasks.

10. The method of claim 6, further comprising:
providing the task and a fourth instruction to the machine learning model, wherein the fourth instruction is to cause the machine learning model to identify a plurality of actions that correspond to the task, rank the identified plurality of actions according to a first criterion associated with the task, and select an action from the ranked plurality of actions according to a second criterion associated with the task; and
receiving the selected action from the machine learning model in response to the fourth instruction.

11. The method of claim 6, further comprising:
in response to determining that a value of a performance metric associated with a first version of an action stored in the first layer meets or exceeds a performance criterion, providing access to the agent to execute the first version of the action from the first layer.

12. The method of claim 6, wherein the agent is a robot or self-driving vehicle.

13. The method of claim 6, further comprising:

determining a mutability characteristic of the action, wherein the mutability characteristic is an indication of ability of the agent to self-mutate by executing the action; and using the mutability characteristic to control the access to the action by the agent.

14. A computer-implemented method comprising:

receiving a signal via an agent, wherein the signal relates to a first execution of a task by the agent using an action store, wherein the action store comprises a hierarchical arrangement of memory layers, and the action store comprises a plurality of actions stored in one or more of the memory layers, and the action store stores first mappings between actions and second mappings between the plurality of actions and the one or more of the memory layers, wherein the first mappings among actions are hierarchical, and an action is executable by the agent, wherein the memory layers comprise a first layer storing a first action and a second layer storing a second action, wherein a first security policy is associated with the first layer, a second security policy, different from the first security policy, is associated with the second layer, and wherein an instruction is to cause a processor to control access to the first layer according to the first security policy and control access to the second layer according to the second security policy;

using the signal to modify the action store; and providing a modified portion of the action store to a second execution of the task by the agent.

15. The method of claim 14, further comprising:

using the signal to create or update the first mappings, the second mappings, or the first mappings and the second mappings.

16. The method of claim 14, further comprising:

in response to the signal, (i) moving the first action from the first layer to the second layer of the memory layers, (ii) moving the second action from the second layer to the first layer, or any combination of (i) and (ii).

17. The method of claim 14, further comprising:

using the signal and a trajectory optimization mechanism to combine a plurality of actions into a third action or expand the third action into the plurality of actions.

18. The method of claim 14, wherein the task comprises detecting and blocking malicious access to a cloud service and the agent is security software executing on a user computing device.

19. The method of claim 14, wherein the agent is a robot or self-driving vehicle.

* * * * *